US012658696B2

(12) United States Patent
Tsunoda et al.

(10) Patent No.: US 12,658,696 B2
(45) Date of Patent: Jun. 16, 2026

(54) DC POWER SUPPLY SYSTEM

(71) Applicant: Mitsubishi Electric Corporation,
Tokyo (JP)

(72) Inventors: Yoshikazu Tsunoda, Tokyo (JP);
Takashi Kumagai, Tokyo (JP); **Atsushi
Hosokawa,** Tokyo (JP)

(73) Assignee: Mitsubishi Electric Corporation,
Tokyo (JP)

( * ) Notice: Subject to any disclaimer, the term of this
patent is extended or adjusted under 35
U.S.C. 154(b) by 0 days.

(21) Appl. No.: 18/992,924

(22) PCT Filed: Jul. 25, 2023

(86) PCT No.: PCT/JP2023/027159
§ 371 (c)(1),
(2) Date: Jan. 9, 2025

(87) PCT Pub. No.: WO2024/024774
PCT Pub. Date: Feb. 1, 2024

(65) Prior Publication Data
US 2026/0005514 A1    Jan. 1, 2026

(30) Foreign Application Priority Data

Jul. 26, 2022    (JP) ................................ 2022-118771

(51) Int. Cl.
H02J 1/102        (2026.01)
H02M 3/155        (2006.01)
(52) U.S. Cl.
CPC ............. H02J 1/102 (2013.01); H02M 3/155
(2013.01)

(58) Field of Classification Search
CPC ....................................................... H02J 1/102
(Continued)

(56) References Cited

U.S. PATENT DOCUMENTS

2019/0097452 A1* 3/2019 Mori ....................... H02J 1/102
2021/0399650 A1   12/2021 Ujimaru et al.

FOREIGN PATENT DOCUMENTS

JP        S5914963 B2    4/1984
JP        H10248257 A    9/1998
(Continued)

OTHER PUBLICATIONS

International Search Report (PCT/ISA/210) with translation and
Written Opinion (PCT/ISA/237) mailed on Oct. 3, 2023, by the
Japanese Patent Office as the International Searching Authority for
International Application No. PCT/JP2023/027159. (8 pages).

*Primary Examiner* — Daniel Kessie
*Assistant Examiner* — Dru M Parries
(74) *Attorney, Agent, or Firm* — Buchanan Ingersoll &
Rooney PC

(57)        ABSTRACT

A plurality of DC power supply apparatuses which are
CVCC power supplies have output sides connected in par-
allel to a load. In each of the plurality of DC power supply
apparatuses, an upper limit current maintained in a CC mode
is designed to be equal to or lower than a rated current.
Reference voltages of the plurality of DC power supply
apparatuses are set to different values. The plurality of DC
power supply apparatuses supply currents with transition
from a CV mode to a CC mode, in the descending order of
magnitude of the reference voltages, in correspondence with
output currents to the load.

20 Claims, 29 Drawing Sheets

100

(58) Field of Classification Search
USPC .......................................................... 307/52
See application file for complete search history.

(56)                            References Cited

FOREIGN PATENT DOCUMENTS

| | | |
|---|---|---|
| JP | 2006034047 A | 2/2006 |
| WO | 2020084822 A1 | 4/2020 |

* cited by examiner (a)

(b)

| CURRENT REGION | Iout (EACH 100(A)) | Vout (STANDARD 15.0(V)) | 10A OUTPUT Vr=15.10(V) | 10B OUTPUT Vr=15.05(V) | 10C OUTPUT Vr=15.00(V) | 10D OUTPUT Vr=14.95(V) | 10E OUTPUT Vr=14.90(V) |
|---|---|---|---|---|---|---|---|
| IRa | 0~100(A) | 15.10(V) | 0~100% | 0% | 0% | 0% | 0% |
| IRb | 100~200(A) | 15.05(V) | 100% | 0~100% | 0% | 0% | 0% |
| IRc | 200~300(A) | 15.00(V) | 100% | 100% | 0~100% | 0% | 0% |
| IRd | 300~400(A) | 14.95(V) | 100% | 100% | 100% | 0~100% | 0% |
| IRe | 400~500(A) | 14.90(V) | 100% | 100% | 100% | 100% | 0~100% |

FIG.6

| CURRENT REGION | Iout (EACH 100(A)) | Vout (STANDARD 15.0(V)) | CUMULATIVE ACTIVE TIME PERIOD(h) | 10A ACTIVE TIME PERIOD PLANNED VALUE Vr=15.10(V) | 10B ACTIVE TIME PERIOD PLANNED VALUE Vr=15.05(V) | 10C ACTIVE TIME PERIOD PLANNED VALUE Vr=15.00(V) | 10D ACTIVE TIME PERIOD PLANNED VALUE Vr=14.95(V) | 10E ACTIVE TIME PERIOD PLANNED VALUE Vr=14.90(V) |
|---|---|---|---|---|---|---|---|---|
| IRa | 0~100(A) | 15.10(V) | 15,000(h) | 15,000(h) | 0(h) | 0(h) | 0(h) | 0(h) |
| IRb | 100~200(A) | 15.05(V) | 6,000(h) | 6,000(h) | 6,000(h) | 0(h) | 0(h) | 0(h) |
| IRc | 200~300(A) | 15.00(V) | 51,000(h) | 51,000(h) | 51,000(h) | 51,000(h) | 0(h) | 0(h) |
| IRd | 300~400(A) | 14.95(V) | 57,000(h) | 57,000(h) | 57,000(h) | 57,000(h) | 57,000(h) | 0(h) |
| IRe | 400~500(A) | 14.90(V) | 2,520(h) | 2,520(h) | 2,520(h) | 2,520(h) | 2,520(h) | 2,520(h) |
| CUMULATIVE ACTIVE TIME PERIOD(TOTAL) | | | 131,520(h) | 131,520(h) | 116,520(h) | 110,520(h) | 59,520(h) | 2,520(h) |

FIG.18

| Iout | Vout (STANDARD 15.0(V)) | CUMULATIVE ACTIVE TIME PERIOD | 10A ACTIVE TIME PERIOD PLANNED VALUE Vr=15.10(V) | 10B ACTIVE TIME PERIOD PLANNED VALUE Vr=15.05(V) | 10C ACTIVE TIME PERIOD PLANNED VALUE Vr=15.00(V) | 10D ACTIVE TIME PERIOD PLANNED VALUE Vr=14.95(V) | 10E ACTIVE TIME PERIOD PLANNED VALUE Vr=14.90(V) |
|---|---|---|---|---|---|---|---|
| 0~93(A) | Vo=15.10(V) | 15,000(h) | 15,000(h) | 0(h) | 0(h) | 0(h) | 0(h) |
| 93~188(A) | Vo=15.05(V) | 6,000(h) | 6,000(h) | 6,000(h) | 0(h) | 0(h) | 0(h) |
| 188~284(A) | Vo=15.00(V) | 51,000(h) | 51,000(h) | 51,000(h) | 51,000(h) | 0(h) | 0(h) |
| 284~391(A) | Vo=14.95(V) | 57,000(h) | 57,000(h) | 57,000(h) | 57,000(h) | 57,000(h) | 0(h) |
| 391~500(A) | Vo=14.90(V) | 2,520(h) | 2,520(h) | 2,520(h) | 2,520(h) | 2,520(h) | 2,520(h) |
| CUMULATIVE ACTIVE TIME PERIOD(TOTAL) | | 131,520(h) | 131,520(h) | 116,520(h) | 110,520(h) | 59,520(h) | 2,520(h) |
| Icc(CHANGE) | | — | 93(A) | 95(A) | 96(A) | 107(A) | 109(A) |
| LIFE CONSUMPTION RATE | | — | 0.687 | 0.763 | 0.804 | 1.495 | 1.680 |
| LIFE CONSUMPTION TIME PERIOD | | 90,345(h) MAXIMUM VALUE (<131,520(h)) | 90,354(h) | 88,904(h) | 88,858(h) | 88,982(h) | 4,233(h) |

| Iout | 10A OUTPUT | 10B OUTPUT | 10C OUTPUT | 10D OUTPUT | 10E OUTPUT | EMPTY SLOT |
|---|---|---|---|---|---|---|
| 0~100(A) | 0%~100% | 0% | 0% | 0% | 0% | — |
| 100~200(A) | 100% | 0%~100% | 0% | 0% | 0% | — |
| 200~300(A) | 100% | 100% | 0%~100% | 0% | 0% | — |
| 300~400(A) | 100% | 100% | 100% | 0%~100% | 0% | — |
| 400~500(A) | 100% | 100% | 100% | 100% | 0%~100% | — |

↓ LAPSE OF 130,000 (h) (LIFE DESIGN 131,520(h))

(b)

| Iout | 10A OUTPUT | 10B OUTPUT | 10C OUTPUT | 10D OUTPUT | 10E OUTPUT | EMPTY SLOT |
|---|---|---|---|---|---|---|
| 0~100(A) | 0%~100% | 0% | 0% | 0% | 0% | — |
| 100~200(A) | 100% | 0%~100% | 0% | 0% | 0% | — |
| 200~300(A) | 100% | 100% | 0%~100% | 0% | 0% | — |
| 300~400(A) | 100% | 100% | 100% | 0%~100% | 0% | — |
| 400~500(A) | 100% | 100% | 100% | 100% | 0%~100% | — |
| CUMULATIVE ACTIVE TIME PERIOD | 130,000(h) | 115,173(h) | 109,243(h) | 58,832(h) | 2,490(h) | —h |

10F ATTACHMENT (c)

| Iout | 10A OUTPUT | 10B OUTPUT | 10C OUTPUT | 10D OUTPUT | 10E OUTPUT | 10F OUTPUT |
|---|---|---|---|---|---|---|
| 0~100(A) | 0%~100% | 0% | 0% | 0% | 0% | 0%~100% |
| 100~200(A) | 100% | 0%~100% | 0% | 0% | 0% | 100% |
| 200~300(A) | 100% | 100% | 0%~100% | 0% | 0% | 100% |
| 300~400(A) | 100% | 100% | 100% | 0%~100% | 0% | 100% |
| 400~500(A) | 100% | 100% | 100% | 100% | 0%~100% | 100% |
| CUMULATIVE ACTIVE TIME PERIOD | 130,000(h) | 115,173(h) | 109,243(h) | 58,832(h) | 2,490(h) | 0(h) |

10A REMOVAL (d)

| Iout | EMPTY SLOT | 10B OUTPUT | 10C OUTPUT | 10D OUTPUT | 10E OUTPUT | 10F OUTPUT |
|---|---|---|---|---|---|---|
| 0~100(A) | — | 0% | 0% | 0% | 0% | 0%~100% |
| 100~200(A) | — | 0%~100% | 0% | 0% | 0% | 100% |
| 200~300(A) | — | 100% | 0%~100% | 0% | 0% | 100% |
| 300~400(A) | — | 100% | 100% | 0%~100% | 0% | 100% |
| 400~500(A) | — | 100% | 100% | 100% | 0%~100% | 100% |
| CUMULATIVE ACTIVE TIME PERIOD | — | 115,173(h) | 109,243(h) | 58,832(h) | 2,490(h) | 0(h) |

CORRESPONDING TO 10A

| Iout (OUTPUT FROM EACH 100(A)) | Vout (15V±5%) | 10A OUTPUT Vr=15.10(V) | 10B OUTPUT Vr=15.05(V) | 10C OUTPUT Vr=15.00(V) | 10D OUTPUT Vr=14.95(V) | 10E OUTPUT Vr=14.90(V) | 10F OUTPUT Vr=14.85(V) |
|---|---|---|---|---|---|---|---|
| 0~100(A) | 15.10(V) | 0%~100% | 0% | 0% | 0% | 0% | 0% |
| 100~200(A) | 15.05(V) | 100% | 0%~100% | 0% | 0% | 0% | 0% |
| 200~300(A) | 15.00(V) | 100% | 100% | 0%~100% | 0% | 0% | 0% |
| 300~400(A) | 14.95(V) | 100% | 100% | 100% | 0%~100% | 0% | 0% |
| 400~500(A) | 14.90(V) | 100% | 100% | 100% | 100% | 0%~100% | 0% |

→

(b)

| Iout (OUTPUT FROM EACH 100(A)) | Vout (15V±5%) | 10A OUTPUT Vr=15.10(V) | 10B OUTPUT Vr=15.05(V) | 10C OUTPUT Vr=15.00(V) | 10D OUTPUT Vr=14.95(V) | 10E OUTPUT Vr=14.90(V) | 10F OUTPUT Vr=14.85(V) |
|---|---|---|---|---|---|---|---|
| 0~100(A) | 15.10(V) | 0%~100% | 0% | 0% | 0% | 0% | 0% |
| 100~200(A) | 15.05(V) | 100% | 0%~100% | 0% | 0% | 0% | 0% |
| 200~300(A) | 14.95(V) | 100% | 100% | 0% | 0%~100% | 0% | 0% |
| 300~400(A) | 14.90(V) | 100% | 100% | 0% | 100% | 0%~100% | 0% |
| 400~500(A) | 14.85(V) | 100% | 100% | 0% | 100% | 100% | 0%~100% |

FAILURE

FIG.28
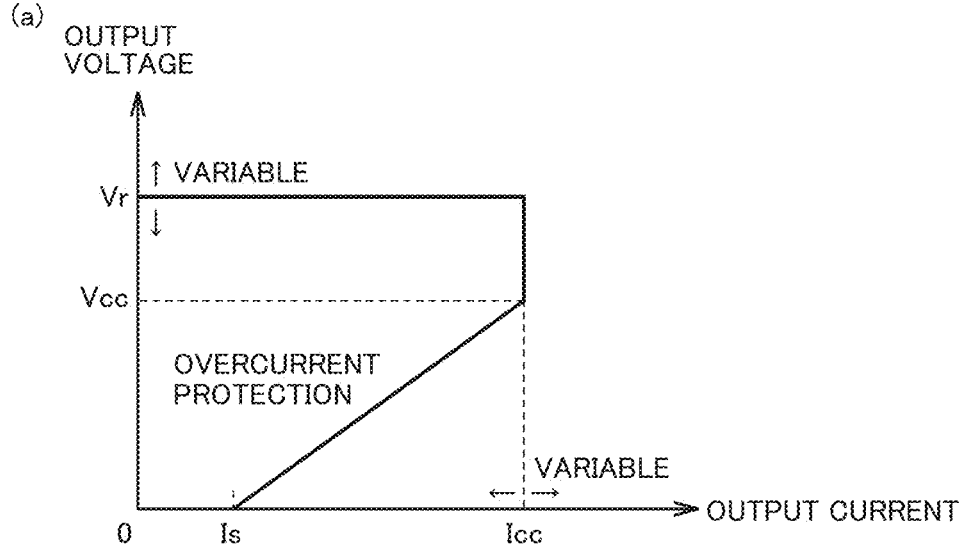
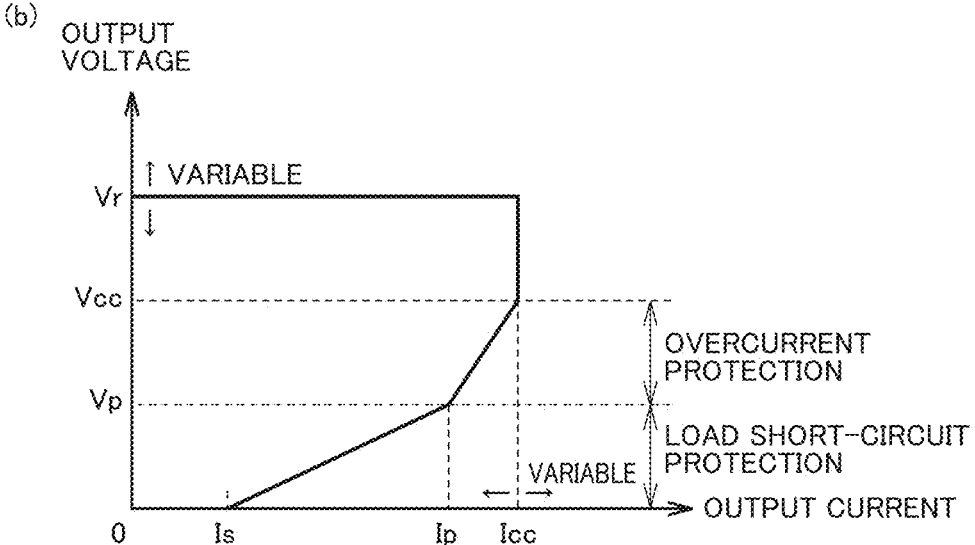

| Iout (EACH 100(A)) | Vout (STANDARD 15.0(V)) | VCR | | | | | |
|---|---|---|---|---|---|---|---|
| | | CUMULATIVE ACTIVE TIME PERIOD | +2 — 10A ACTIVE TIME PERIOD Vr=15.10(V) | +1 — 10B ACTIVE TIME PERIOD Vr=15.05(V) | 0 — 10C ACTIVE TIME PERIOD Vr=15.00(V) | −1 — 10D ACTIVE TIME PERIOD Vr=14.95(V) | −2 — 10E ACTIVE TIME PERIOD Vr=14.90(V) |
| 0~100(A) | 15.10(V) | 7,500(h) | 7,500(h) | 0(h) | 0(h) | 0(h) | 0(h) |
| 100~200(A) | 15.05(V) | 3,000(h) | 3,000(h) | 3,000(h) | 0(h) | 0(h) | 0(h) |
| 200~300(A) | 15.00(V) | 25,500(h) | 25,500(h) | 25,500(h) | 25,500(h) | 0(h) | 0(h) |
| 300~400(A) | 14.95(V) | 28,500(h) | 28,500(h) | 28,500(h) | 28,500(h) | 28,500(h) | 0(h) |
| 400~500(A) | 14.90(V) | 1,260(h) | 1,260(h) | 1,260(h) | 1,260(h) | 1,260(h) | 1,260(h) |
| CUMULATIVE ACTIVE TIME PERIOD(SUM) | | 65,760(h) | 65,760(h) | 58,260(h) | 55,260(h) | 29,760(h) | 1,260(h) |

↓ VCR CHANGE (b)

| Iout (EACH 100(A)) | Vout (STANDARD 15.0(V)) | VCR | | | | | |
|---|---|---|---|---|---|---|---|
| | | CUMULATIVE ACTIVE TIME PERIOD | −2 — 10A ACTIVE TIME PERIOD Vr=14.90(V) | −1 — 10B ACTIVE TIME PERIOD Vr=14.95(V) | 0 — 10C ACTIVE TIME PERIOD Vr=15.00(V) | +1 — 10D ACTIVE TIME PERIOD Vr=15.05(V) | +2 — 10E ACTIVE TIME PERIOD Vr=15.10(V) |
| 0~100(A) | 15.10(V) | 7,500(h) | 0(h) | 0(h) | 0(h) | 0(h) | 7,500(h) |
| 100~200(A) | 15.05(V) | 3,000(h) | 0(h) | 0(h) | 0(h) | 3,000(h) | 3,000(h) |
| 200~300(A) | 15.00(V) | 25,500(h) | 0(h) | 0(h) | 25,500(h) | 25,500(h) | 25,500(h) |
| 300~400(A) | 14.95(V) | 28,500(h) | 0(h) | 28,500(h) | 28,500(h) | 28,500(h) | 28,500(h) |
| 400~500(A) | 14.90(V) | 1,260(h) | 1,260(h) | 1,260(h) | 1,260(h) | 1,260(h) | 1,260(h) |
| CUMULATIVE ACTIVE TIME PERIOD(SUM) | | 65,760(h) | 1,260(h) | 29,760(h) | 55,260(h) | 58,260(h) | 65,760(h) |
| CUMULATIVE ACTIVE TIME PERIOD(TOTAL) | | 131,520(h) | 67,020(h) | 88,020(h) | 110,520(h) | 88,020(h) | 67,020(h) |

DC POWER SUPPLY SYSTEM

TECHNICAL FIELD

The present disclosure relates to a direct-current (DC) power supply system.

BACKGROUND ART

DC power feed in a zero emission building (ZEB), a power supply in a data center, motorization of mobility, and the like have recently brought attention to DC electric equipment, and demands for the DC electric equipment have increased. Therefore, a larger capacity, higher reliability, and a smaller size of a DC power supply system to supply electric power to the DC electric equipment have increasingly been demanded. In particular, for a larger capacity, a configuration in which a plurality of small-capacity DC power supplies operate in parallel has been adopted, in addition to a configuration in which a single large-capacity DC power supply is provided.

For example, Japanese Patent Laying-Open No. 2006-34047 (PTL 1) describes control in a configuration in which a plurality of power supply units (DC power supplies) where drooping characteristic portions thereof perform constant current operations are connected in parallel to an external load, the control being such that only a first power supply unit is started, a starting signal is transmitted to a power supply unit in a next stage when an output current of the first power supply unit attains to a constant current (maximum current), and thereafter power supply units are successively started stepwise. According to PTL 1, a reference voltage indicating a constant current value in accordance with drooping characteristics is transmitted together with the starting signal, so that loads are balanced among the power supply units in successive start of the power supply units.

CITATION LIST

Patent Literature

PTL 1: Japanese Patent Laying-Open No. 2006-34047

SUMMARY OF INVENTION

Technical Problem

According to the configuration in PTL 1, a current can be supplied to a load increased in capacity, without using a large-capacity power supply, reduction in size and improvement in efficiency of which tends to be difficult. Among a plurality of power supply modules, however, operations in coordination accompanied by transmission and reception of the starting signal described above and a reference voltage signal are performed. Therefore, control lines increase and there is a concern about complicated control.

The present disclosure was made to solve such problems, and an object of the present disclosure is to provide a DC power supply system to realize supply of electric power in conformity with variation in output current to a load, without control in coordination by transmission and reception of a signal or information among a plurality of DC power supplies connected in parallel.

Solution to Problem

In one aspect of the present disclosure, a DC power supply system is provided. The DC power supply system to supply a DC voltage and a DC current to a DC load includes a plurality of DC power supply apparatuses. The plurality of DC power supply apparatuses have output sides connected in parallel, the output sides being electrically connected to the DC load. Each of the plurality of DC power supply apparatuses is configured to be in an inactive state in which each of the plurality of DC power supply apparatuses does not output a current when the DC voltage supplied to the DC load is higher than a reference voltage set for each of the plurality of DC power supply apparatus, and on the other hand to be in an active state in accordance with a predetermined output characteristic when the DC voltage is equal to or lower than the reference voltage. The output characteristic is set such that, in each of the DC power supply apparatuses, when an output current is lower than an upper limit current set for each of the plurality of DC power supply apparatuses, each of the DC power supply apparatuses operates in a constant voltage mode in which feedback control of an output voltage for maintaining the output voltage at the reference voltage is carried out, whereas when the output current reaches the upper limit current, each of the DC power supply apparatuses operates in a constant current mode in which feedback control of the output current for maintaining the output current at the upper limit current is carried out. Furthermore, in each of the DC power supply apparatuses, the upper limit current is set to be equal to or lower than a rated current of that DC power supply apparatus. Among at least some of the plurality of DC power supply apparatuses, reference voltages are set to be different in value from one another within an allowable voltage range of the DC load.

Advantageous Effects of Invention

According to the present disclosure, in the DC power supply system to supply electric power to the load with the plurality of DC power supply apparatuses connected in parallel, in response to a current request from the load, the DC power supply apparatuses different in reference voltage successively output currents in accordance with the output characteristic, so that power supply in conformity with variation in output current to the load without control in coordination among the DC power supply apparatuses can be realized.

BRIEF DESCRIPTION OF DRAWINGS

FIG. 6 is a diagram showing a list of active time period planned values when each DC power supply apparatus operates in accordance with FIG. 5 in the DC power supply system according to the first embodiment.

FIG. 18 is a diagram of a list of cumulative active time periods of DC power supply apparatuses in the DC power supply system according to the fourth embodiment.

FIG. 23 is a conceptual diagram illustrating a configuration and exemplary maintenance works of a DC power supply system according to a sixth embodiment.

FIG. 25 is a diagram for illustrating operations of each DC power supply apparatus in the DC power supply system according to the seventh embodiment.

FIG. 28 is a conceptual diagram illustrating output characteristics of each DC power supply apparatus in a DC power supply system according to a ninth embodiment.

FIG. 32 is a conceptual diagram illustrating a specific example of the output characteristics of each DC power supply apparatus to which FIG. 31 is applied.

FIG. 37 is a diagram illustrating exemplary operations of the DC power supply system according to the tenth embodiment.

DESCRIPTION OF EMBODIMENTS

Figure 1:
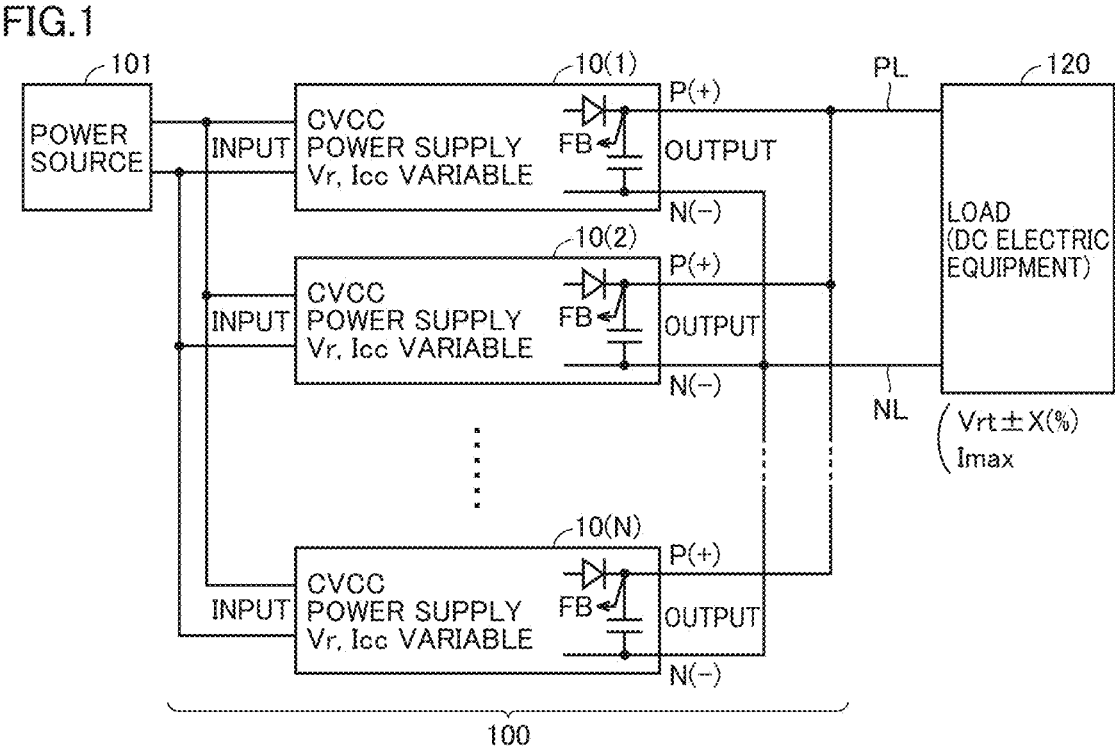
FIG. 1 is a block diagram illustrating a configuration of a DC power supply system according to the present embodiment.

An embodiment of the present disclosure will be described in detail below with reference to the drawings. The same or corresponding elements in the drawings have the same reference characters allotted and description thereof will not be repeated in principle.

First Embodiment

FIG. 1 shows a block diagram illustrating a configuration of a DC power supply system according to the present embodiment.

Referring to FIG. 1, a DC power supply system 100 according to the present embodiment includes N (N being an integer not smaller than two) DC power supply apparatuses 10(1) to 10(N). DC power supply apparatuses 10(1) to 10(N) can be implemented by power supply modules identical in specifications, and a circuit configuration, a capacity (a current capacity), and life design thereof are assumed as being equivalent. It is not essential, however, that the specifications are identical. For example, DC power supply apparatuses 10(1) to 10(N) may be different in capacity (current capacity).

DC power supply apparatuses 10(1) to 10(N) have input sides connected to a power source 101. As will be described later, in the present embodiment, DC power supply apparatuses 10(1) to 10(N) are assumed to perform DC/DC conversion by turn-on and -off of at least one semiconductor switching element (not shown). Therefore, power source 101 can be a DC power supply implemented by a power converter to convert an alternating-current (AC) voltage from an AC power supply into a DC voltage or a power storage element such as a battery.

Alternatively, power source 101 can also be implemented by an AC power supply by arranging a rectification circuit in an input stage of each of DC power supply apparatuses 10(1) to 10(N). Though FIG. 1 shows an exemplary configuration in which DC power supply apparatuses 10(1) to 10(N) have the input sides connected to common power source 101, the configuration may be such that a plurality of power sources 101 may be connected to sets of input sides of some of DC power supply apparatuses 10(1) to 10(N).

Each of DC power supply apparatuses 10(1) to 10(N) outputs DC power across DC output ends P(+) and N(−), with feedback (FB) control of any one of an output voltage and an output current. DC power supply apparatuses 10(1) to 10(N) have DC output ends P(+) and N(−) connected in parallel to power lines PL and NL for supply of electric power to a load 120.

Load 120 is DC electric equipment that requires a load current exceeding a supply current from one of DC power supply apparatuses 10(1) to 10(N). In addition, load 120 has a margin (±X %) to allow voltage fluctuation within a predetermined range for a specification voltage Vrt. In other words, an output voltage Vout from DC power supply system 100 to load 120 should be within an allowable voltage range of Vo=Vrt±X % in accordance with the margin. A maximum load current Imax to load 120 is determined in advance.

Load 120 is implemented by a resistive load, an inductive load, a capacitive load, or combination of a power converter for DC/AC conversion with AC electric equipment (a motor or the like), and implemented, for example, by equipment requiring DC power supply such as a load of a DC power distribution facility, air-conditioning, an interior light, an elevator, or a home electrical appliance. For example, at least two pieces of DC electric equipment are provided as load 120, and depending on the number of operating loads, an output current (load current) from DC power supply system 100 to load 120 varies.

Figure 2:
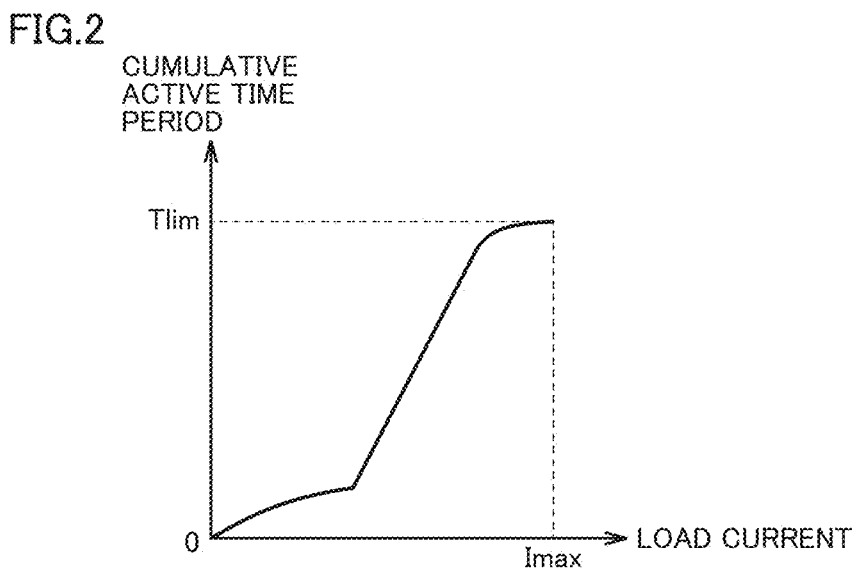
FIG. 2 shows a graph illustrating an exemplary power application profile assumed in a load shown in FIG. 1.

FIG. 2 shows an exemplary power application profile assumed in load 120.

The abscissa in FIG. 2 represents a load current supplied from DC power supply system 100 to load 120 and the ordinate represents a cumulative value of operation time period of load 120.

An expected value of a frequency of generation (distribution) of each load current value while the load current varies from 0 (A) to Imax (A) is determined in advance based on a frequency of operation expected for the at least two pieces of DC electric equipment described above. An active time period (Tlim×frequency of generation) at each load current value with respect to a limit active time period Tlim (for example, 131,520 (h) corresponding to an active time period planned value for fifteen years) comparable to designed life is calculated, and calculated active time periods are summed from 0 (A) as a cumulative active time period to thereby obtain the power application profile in FIG. 3.

Figure 3:
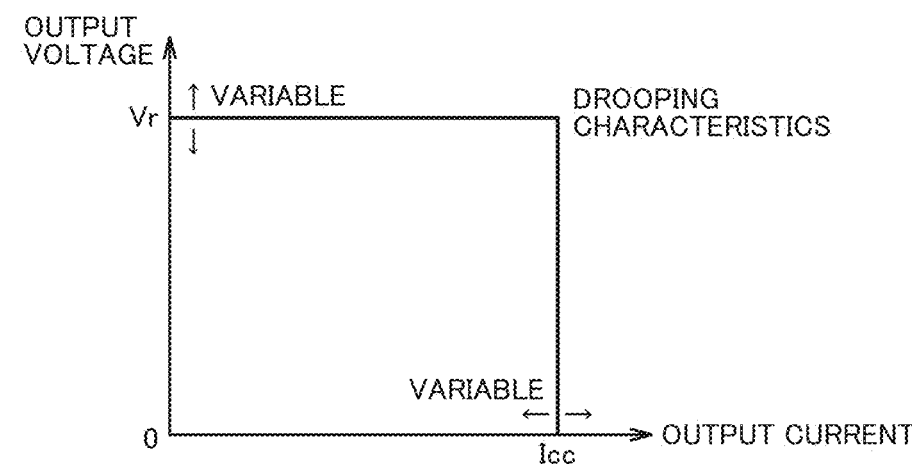
FIG. 3 is a conceptual diagram illustrating an output characteristic of each DC power supply apparatus shown in FIG. 1.

FIG. 3 shows a conceptual diagram illustrating an output characteristic of each of DC power supply apparatuses 10(1) to 10(N) shown in FIG. 1.

Referring to FIG. 3, when an output current is lower than an upper limit current Icc, each of DC power supply apparatuses 10(1) to 10(N) operates in a constant voltage (CV) mode under voltage feedback control to maintain an output voltage at a reference voltage Vr. When the output current exceeds upper limit current Icc, on the other hand, DC power supply apparatuses 10(1) to 10(N) operate in a constant current (CC) mode to restrict outputs therefrom such that the output currents therefrom do not increase any more. In other words, in the CC mode, current feedback control in which a current target value is set to upper limit current Icc is carried out so that the output voltage is no longer directly controlled. Therefore, the output voltage from the DC power supply apparatus lowers in accordance with electric power supplied to load 120.

Control characteristics of the output voltage-the output current shown in FIG. 3 are called drooping characteristics, and a DC power supply having such control characteristics is called a constant voltage constant current (CVCC) power supply. In the present embodiment, for each of DC power supply apparatuses 10(1) to 10(N), values of reference voltage Vr and upper limit current Icc in CVCC control can variably be set. In particular, among at least some of DC power supply apparatuses 10(1) to 10(N), reference voltages Vr are intentionally set to different values within an allowable range of variation in output voltage Vout to load 120.

Furthermore, in a general CVCC power supply, upper limit current Icc making transition from the CV mode to the CC mode is set to approximately 120% to 140% of a rated current value, and then each component of the power supply is designed to complete designed life (for example, Tlim in FIG. 3) in operations at the rated current value. In other words, in the normal CVCC power supply, the designed life in operations at a current value (upper limit current Icc) at which constant current control based on the drooping characteristics is carried out is not guaranteed, because the operations at that current value are operations in a region exceeding the rated current value.

In contrast, in each of DC power supply apparatuses 10(1) to 10(N) according to the present embodiment, upper limit current Icc at which constant current control is carried out is set to the rated current value or less. In other words, in DC power supply apparatuses 10(1) to 10(N), each component is designed to complete the designed life even in the operations at the current value at which constant current control based on the drooping characteristics is carried out. Thus, in the present embodiment, relation between the rated current value and the drooping characteristics (upper limit current Icc) in the DC power supply apparatuses (CVCC power supplies) connected in parallel is characteristically determined, unlike that of the conventional CVCC power supply.

Description of an embodiment with reference to specific exemplary numerical values of the number of DC power supplies connected in parallel and the output voltage and the output current therefrom will now proceed. An example where a condition of N=5 is set will mainly be described below.

Figure 4:
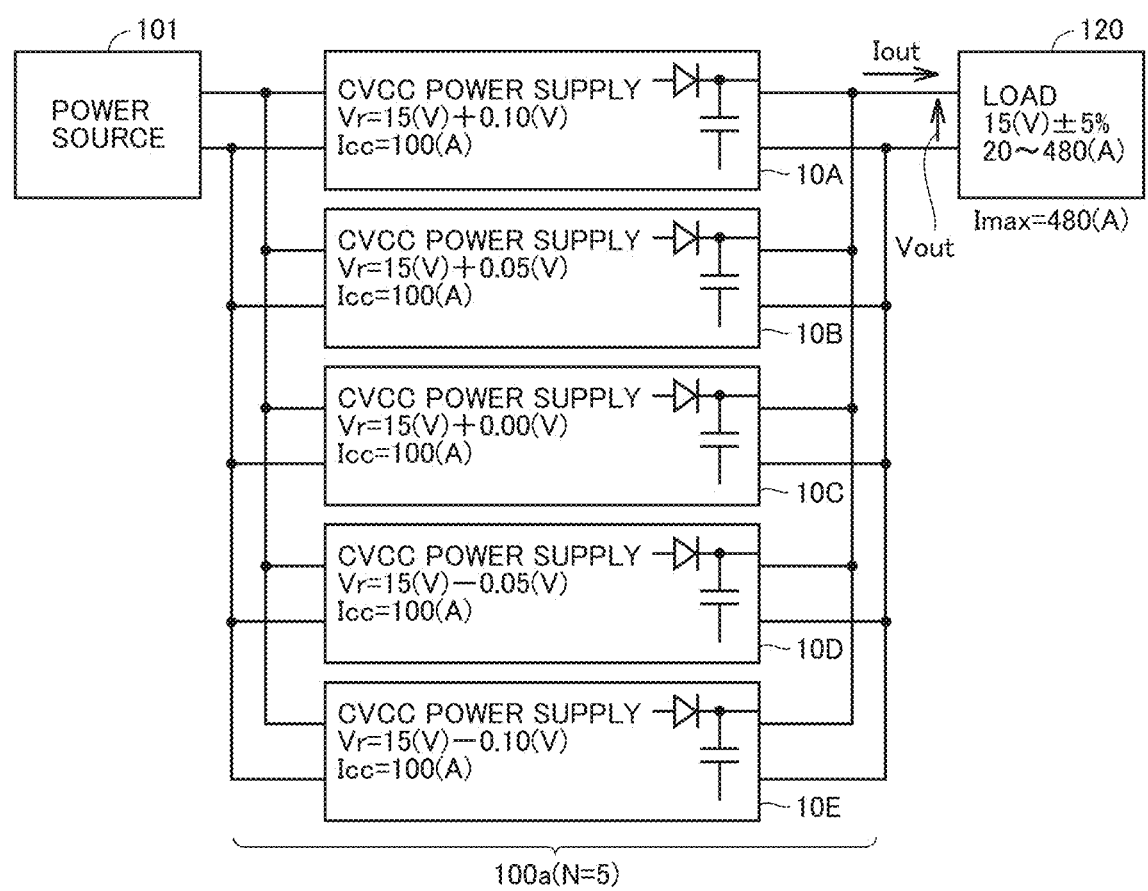
FIG. 4 is a block diagram illustrating a configuration of a DC power supply system according to a first embodiment.

FIG. 4 is a block diagram illustrating a configuration of a DC power supply system according to a first embodiment.

Referring to FIG. 4, a DC power supply system 100a according to the present embodiment includes five (N=5) DC power supply apparatuses 10A to 10E having at least output sides connected in parallel. A rated value (rated voltage) of the output voltage from each of DC power supply apparatus 10A to 10E and a rated value of a voltage (that is, specification voltage Vrt) supplied to load 120 are each set to 15 (V). Load 120 corresponds to the "DC load" and output voltage Vout and an output current Iout from DC power supply system 100a to load 120 correspond to the "DC voltage" and the "DC current" supplied to the "DC load," respectively.

In each of DC power supply apparatuses 10A to 10E, upper limit current Icc in FIG. 3 is controlled to Icc=100 (A), and the constant current is outputted in accordance with drooping characteristics (CC mode) in a state where the output current is set to 100 (A). As described above, upper limit current Icc is equal to or lower than the rated current of each of DC power supply apparatuses 10A to 10E, and each of DC power supply apparatuses 10A to 10E is designed to be operable up to a limit active time period Tlim (for example, 131520 (h)) in FIG. 2 in the state where the output current is set to 100 (A).

Load 120 allows power supply voltage fluctuation of ±5% from specification voltage Vrt=15 (V). In other words, the allowable voltage range of output voltage Vout from DC power supply system 100a to load 120 is 15 (V)±5% (14.25 to 15.75 (V)). In addition, it is assumed that maximum load current Imax is set to Imax=480 (A), and output current Iout from DC power supply system 100a to load 120 varies from 20 (A) to 480 (A). Within a range from 0 (A) to 480 (A) represented on the abscissa in FIG. 2, the power application profile as in FIG. 2 is determined in advance based on an operation time period assumed at each assumed current value.

Since Imax of load 120 is set to Imax=480 (A), five DC power supply apparatuses 10A to 10E of Icc=100 (A) are provided in parallel. In other words, as the sum of upper limit currents Icc of DC power supply apparatuses 10A to 10E is larger than maximum load current Imax, a maximum current of 480 (A) for load 120 can be supplied by parallel operations of DC power supply apparatuses 10A to 10E.

Reference voltages Vr of DC power supply apparatuses 10A to 10E are set to values different within the allowable voltage range of 15 (V)±5% described above. In the example in FIG. 4, reference voltages Vr of DC power supply apparatuses 10A to 10E are set to different values in increments of 0.05 (V). Specifically, Vr=15+0.10=15.10 (V) in DC power supply apparatus 10A and Vr=15+0.05=15.05 (V) in DC power supply apparatus 10B. Vr=15+0.00=15 (V) in DC power supply apparatus 10C. Furthermore, Vr=15−0.05=14.95 (V) in DC power supply apparatus 10D and Vr=15−0.10=14.90 (V) in DC power supply apparatus 10E.

Figure 5:
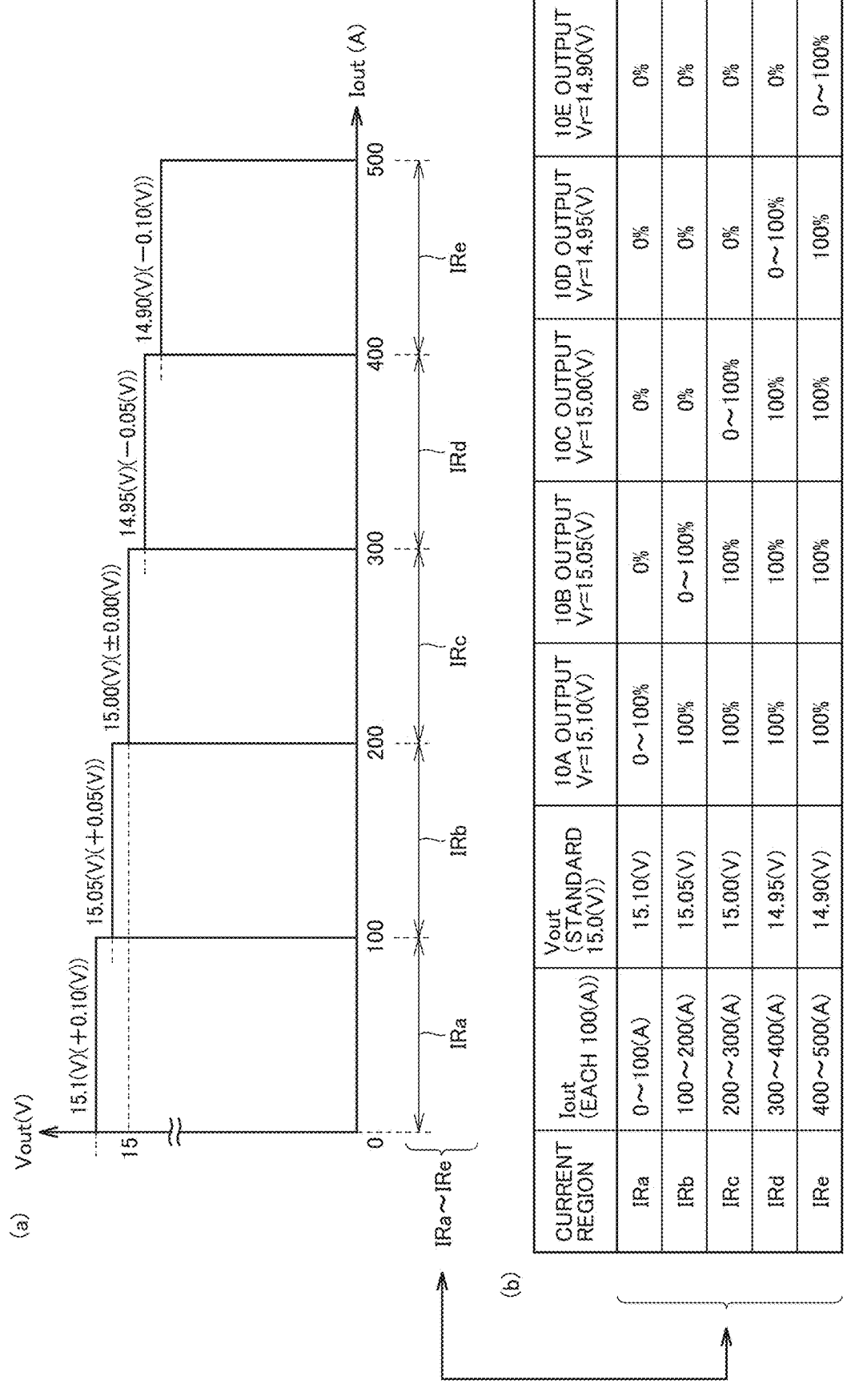
FIG. 5 is a conceptual diagram and a diagram for illustrating operations of each DC power supply apparatus in the DC power supply system according to the first embodiment.

FIG. 5 shows a conceptual diagram and a diagram for illustrating operations of DC power supply apparatus 100a.

The abscissa in FIG. 5(a) represents output current Iout (that is, the load current) from DC power supply system 100a to load 120 and the ordinate represents output voltage Vout from DC power supply system 100a to load 120. As operating states of DC power supply apparatuses 10A to 10E vary among current regions IRa to IRe of output currents Iout in accordance with the drooping characteristics of DC power supply apparatuses 10A to 10E which are the CVCC power supplies, output voltages Vout vary.

FIG. 5(b) shows a diagram illustrating operating states of DC power supply apparatuses 10A to 10E for each region of output current Iout.

Referring to FIG. 5(a) and FIG. 5(b), in current region IRa where output current Iout is from 0 to 100 (A), only DC power supply apparatus 10A (Vr=15.10 (V)) highest in reference voltage Vr outputs the current, whereas remaining DC power supply apparatuses 10B to 10E, output voltages from which are lower than 15.10 (V), do not supply the currents. Therefore, output voltage Vout from DC power supply system 100a is 15.10 (V), and output from DC power supply apparatus 10A is within a range from 0% to 100% (the output current=Icc=100 (A)). Though DC power supply apparatuses 10B to 10E are operating, on the other hand, outputs therefrom are 0% (the output currents=0 (A)). For each of DC power supply apparatuses 10A to 10E, the operating state in which the current is being supplied will also be referred to as an "active state" below, and the operating state in which the current is not being supplied (output being 0(%)) will also be referred to as an "inactive state" below. In current region IRa, DC power supply apparatus 10A is in the active state, whereas DC power supply apparatuses 10B to 10E are in the inactive state.

When output current Iout then reaches 100 (A), the output voltage from DC power supply apparatus 10A lowers in accordance with the drooping characteristics (Icc=100 (A)) shown in FIG. 3. When the output voltage lowers to 15.05 (V), DC power supply apparatus 10B, reference voltage Vr of which is 15.05 (V), also starts supply of the current. Thus, while DC power supply apparatus 10A is active at 15.05 (V)×100 (A), DC power supply apparatus 10B supplies the lacking current within the range of output from 0% to 100% (100 (A)) under a condition of output voltage Vout (=15.05 (V)). This operating state continues until the output voltage from DC power supply apparatus 10B lowers in accordance with the drooping characteristics, that is, until Iout attains to Iout=100×2=200 (A).

Therefore, in current region IRb where Iout is set to Iout=100 to 200 (A), output voltage Vout from DC power supply system 100a is set to 15.05 (V). Then, output from DC power supply apparatus 10A (Vr=15.10 (V)) attains to 100% (100 (A)), and output from DC power supply apparatus 10B (Vr=15.05 (V)) is within the range from 0% to 100% (100 (A)). DC power supply apparatuses 10C to 10E, reference voltages Vr of which are lower than 15.05 (V), on the other hand, do not supply the current but remains in the inactive state, and hence outputs therefrom are 0(%).

Similarly, when output current Iout reaches 200 (A), the output voltage from DC power supply apparatus 10B lowers in accordance with the drooping characteristics, so that DC power supply apparatus 10C of Vr=15.00 (V) starts supply of the current. In current region IRc in which Iout is set to Iout=200 to 300 (A) until the output voltage from DC power supply apparatus 10C lowers in accordance with the drooping characteristics, output voltages Vout from DC power supply apparatuses 10A and 10B attain to 15.00 (V). Furthermore, outputs from DC power supply apparatus 10A (Vr=15.10 (V)) and DC power supply apparatus 10B (Vr=15.05 (V)) attain to 100% (100 (A)), and output from DC power supply apparatus 10C (Vr=15.00 (V)) is within the range from 0% to 100% (100 (A)). DC power supply apparatuses 10D to 10E, reference voltages Vr of which are lower than 15.00 (V), on the other hand, do not supply the currents but remain in the inactive state.

Similarly, with increase in output current Iout, in current region IRd (Iout=300 to 400 (A)), DC power supply apparatus 10D of Vr=14.95 (V) further starts supply of the current. Therefore, output voltages Vout from DC power supply apparatuses 10A to 10C attain to 14.95 (V). Furthermore, outputs from DC power supply apparatuses 10A to 10C attain to 100% (100 (A)), and output from DC power supply apparatus 10D (Vr=14.95 (V)) is within the range from 0% to 100% (100 (A)). DC power supply apparatus 10E, reference voltage Vr of which is lower than 14.95 (V), on the other hand, does not supply the current but remains in the inactive state, and hence output is 0(%).

In current region IRe (Iout=400 to 500 (A)) where output current Iout has further increased, DC power supply apparatus 10E of Vr=14.90 (V) further starts supply of the current. Therefore, output voltages Vout from DC power supply apparatuses 10A to 10D attain to 14.90 (V). Furthermore, outputs from DC power supply apparatus 10A to 10D attain to 100% (100 (A)), and output from DC power supply apparatus 10E (Vr=14.90 (V)) is within the range from 0% to 100% (100 (A)). In other words, all of DC power supply apparatuses 10A to 10E are in the active state.

Control of such operating states allows supply of maximum load current Imax=480 (A) to load 120 by parallel operations of DC power supply apparatuses 10A to 10E within a range where lowering in output voltage Vout is not greater than 5% of specification value 15 (V).

In the drooping characteristics (FIG. 3) of the CVCC power supply, actually, the current under CC control generally slightly becomes higher than upper limit current Icc. For example, in the present example, the characteristic line in CC control in FIG. 3 is not a vertically extending straight line that connects 100 (A)×Vr and 100 (A)×0 (V) to each other, but is a diagonal straight line that connects 100 (A)×Vr and 105 (A)×0 (V) to each other. It is understood that, even under such a drooping characteristic line, the operating states of DC power supply apparatuses 10A to 10E different in reference voltage Vr can be controlled as in FIG. 5(b), with a boundary value being slightly different among current regions IRa to IRe.

FIG. 6 shows a list of active time period planned values when DC power supply apparatuses 10A to 10C operate in accordance with FIGS. 5(a) and (b) in the DC power supply system according to the first embodiment. FIG. 6 shows active time period planned values when DC power supply apparatuses 10A to 10E operate in accordance with the characteristics in FIGS. 5(a) and (b), under an assumed current profile (FIG. 2). In FIG. 6, Tlim in FIG. 2 is defined as Tlim=131520 (h) (approximately for fifteen years).

Referring to FIG. 6, in accordance with the assumed current profile (FIG. 2), Tlim=131520 (h) is allocated to cumulative active time periods in respective current regions (0 to 100 (A), 100 to 200 (A), 200 to 300 (A), 300 to 400 (A), and 400 (A) to 500 (A)) of output current Iout.

Furthermore, the active time period planned value of each of DC power supply apparatuses 10A to 10E for the cumulative active time period in each current region is calculated in each current region. In each current region, the active time period planned value of the DC power supply apparatus, output from which is 0% (inactive state), is 0 (h), and the active time period planned value of the DC power supply apparatus in the active state, output of which is 100% or from 0 to 100%, is calculated as a value equal to the cumulative active time period in the current region.

Consequently, the active time period planned value of each of DC power supply apparatuses 10A to 10E for Tlim=131520 (h) is calculated as a total value in the lowermost field in FIG. 6. In DC power supply system 100a according to the first embodiment, the active time period planned value of DC power supply apparatus 10A highest in reference voltage Vr is equal to Tlim, and DC power supply apparatus 10A is constantly in the active state. The active time period planned value of the DC power supply apparatus low in reference voltage Vr, on the other hand, is suppressed.

A case in which DC power supply apparatuses 10A to 10E are each activated for an even time period is assumed. As an average value of the active time period planned values of DC power supply apparatuses 10A to 10E in the lowermost field, (131520+116520+110520+58520+2520)/5=84120 (h) is obtained as an average active time period. In this case, an activation ratio of each of DC power supply apparatuses 10A to 10E is calculated as 84120/131520=64%.

In contrast, in the first embodiment, the activation ratio of DC power supply apparatus 10A that is constantly active is 100%. Of the DC power supply apparatuses connected in parallel, however, due to influence by the offset of the output voltage caused by variation in manufacturing or the like, the activation ratio of the DC power supply apparatus relatively consequently high in output voltage increases. Therefore, it is difficult to design for each DC power supply apparatus, life on which the average activation ratio described above is reflected, and hence each component is normally designed to secure life at the activation ratio of 100%. Therefore, it is understood also for DC power supply apparatus 10A, the activation ratio of which is 100% in the first embodiment, that life thereof is not shorter than in a conventional example.

As described above, in the DC power supply system according to the first embodiment, massively parallel operation that follows variation in output current Iout to load 120 can be achieved simply by connection in parallel of the output sides, without requiring transmission and reception of a control signal or information among the plurality of DC power supply apparatuses 10A to 10E connected in parallel.

As will be described later, regarding smoothing capacitors to be connected at output ends of DC power supply apparatuses 10A to 10E, smoothing capacitors as many as the DC power supply apparatuses are also connected in parallel, and hence a capacitance value for smoothing of output voltage Vout from DC power supply system 100a is readily secured. Sufficient tolerance also for abrupt change in power by load 120 can thus be held.

In general, in an example where a large-capacity electrolytic capacitor is employed for the smoothing capacitor, there is a concern about increase in ripple voltage and spike voltage in output voltage Vout due to increase in equivalent series resistance (ESR) caused by the end of life. In the DC power supply system according to the first embodiment, however, there is a difference in active time period among DC power supply apparatuses 10A to 10E as shown in FIG. 6, and hence the ESR increases only in at least one of a plurality of smoothing capacitors connected in parallel. Therefore, in the entire DC power supply system 100a, suppression of increase in ripple voltage and spike voltage in output voltage Vout can be expected.

Furthermore, each of DC power supply apparatuses 10A to 10E can promptly respond also to increase in load current because it is constantly operating even though it is not outputting the current depending on magnitude of the voltage. The DC power supply system with sufficient instantaneous current supply capability in response to fluctuation in voltage or current in load 120 can thus be configured.

It is determined in advance that the active time period of the DC power supply apparatus set to be high in reference voltage Vr becomes long. Therefore, maintenance also should only be performed preferentially from that DC power supply apparatus. Furthermore, even when the DC power supply apparatus relatively long in active time period reaches the end of its life, DC power supply system 100a can again normally operate simply by replacing only at least one of DC power supply apparatuses 10A to 10E and programming reference voltage Vr. Maintenance works at the site can thus be efficient and maintenance cost (price for equipment) can be reduced.

In the configuration in which a large number of DC power supply apparatuses are connected in parallel as in the present embodiment, each DC power supply apparatus can be small in capacity. In general, a size of a magnetic component increases at a ratio of a volume to the current. Therefore, with the parallel connection configuration in the present embodiment, the size as a whole can be reduced, and small-sized equipment high in space efficiency can be designed.

With reduction in size, each component can operate at a further higher frequency in relation to a skin effect and a proximity effect, and with adaptation to the higher frequency, the component can further be reduced in size. In particular, a small-sized component tends to be more stable in quality owing to a mass production effect, and also tends to be more readily available than a large-sized component. Furthermore, the small-sized component tends to be better in characteristics of the magnetic component, in particular, ferrite. By thus reducing the capacity of each DC power supply apparatus, a great effect also in manufacturing can be obtained.

Furthermore, the configuration in which DC power supply apparatuses identical in specifications are connected in parallel can be common in design of the DC power supply apparatuses, and hence higher efficiency in design and advantage in cost owing to increase in production volume by commonality can be enjoyed. Desire to increase electric power to be supplied to load 120 can also be fulfilled by additional connection of a DC power supply apparatus identical in specifications in parallel and programming of reference voltage Vr to a desired value, and hence adaptation to a larger capacity can also be more efficient.

An exemplary configuration of DC power supply apparatuses 10A to 10E and exemplary operations thereof will now be described.

Figure 7:
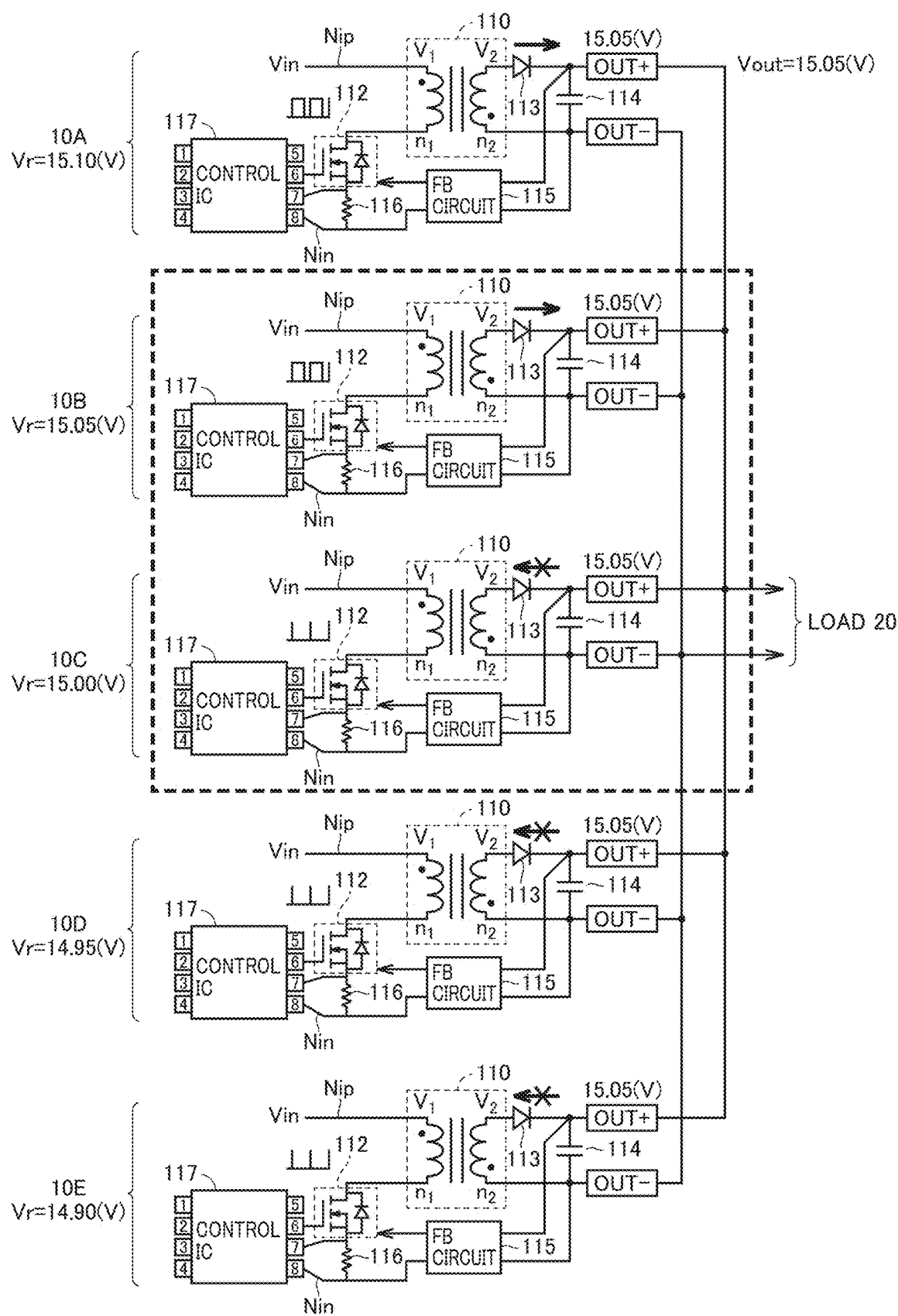
FIG. 7 is a circuit diagram illustrating a first exemplary configuration of a plurality of DC power supply apparatuses shown in FIG. 4 and exemplary operations thereof.

FIG. 7 shows as a first exemplary configuration, an example in which each of DC power supply apparatuses 10A to 10E is configured as a flyback DC power supply apparatus.

Referring to FIG. 7, each of DC power supply apparatuses 10A to 10E includes a transformer 110, a semiconductor switching element 112, a diode 113, a capacitor 114, a feedback (FB) circuit 115, a current detection resistor 116, and a control integrated circuit (IC) 117.

A primary winding of transformer 110, semiconductor switching element 112, and current detection resistor 116 are connected in series between input nodes Nip and Nin to which an input voltage Vin from power source 101 is applied. A secondary winding of transformer 110 has one end connected to a + side output end (OUT+) with diode 113 being interposed. The secondary winding of transformer 110 has the other end connected to a − side output end (OUT−). Capacitor 114 is connected between the + side output end (OUT+) and the − side output end (OUT−).

A pulsed voltage (AC voltage) produced in the primary winding of transformer 110 as a result of turn-on and -off of semiconductor switching element 112 is transmitted in reverse polarity to the secondary winding of transformer 110. The pulsed voltage (AC voltage) transmitted to the secondary winding is rectified by diode 113 and smoothened by capacitor 114, so that an output voltage (DC) is generated across the + side output end (OUT+) and the − side output end (OUT−).

A voltage across terminals of capacitor 114, that is, the output voltage from each of DC power supply apparatuses 10A to 10E, is divided by FB circuit 115 and inputted to control IC 117. Furthermore, a voltage across terminals of current detection resistor 116 is inputted to control IC 117. Control IC 117 can thus obtain detection values of the output voltage and the output current from the DC power supply apparatus. FB circuit 115 and current detection resistor 116 can be implemented by variable resistance elements.

Control IC 117 outputs a gate signal which is an on/off control signal for semiconductor switching element 112. Output from each of DC power supply apparatuses 10A to 10E is controlled based on an on period ratio (on duty ratio) of semiconductor switching element 112 controlled to turn on and off.

Reference voltage Vr and upper limit current Icc are programmed in control IC 117. Reference voltage Vr and upper limit current Icc are set in control IC 117, for example, by using a constant voltage generated in a bias circuit (not shown) provided on a circuit board of each of DC power supply apparatuses 10A to 10E. Furthermore, a configuration in which reference voltage Vr and upper limit current Icc are variably set by varying a voltage division ratio in FB circuit 115 and a resistance value of current detection resistor 116 in response to an operation onto a not-shown variable resistor or a not-shown dip switch can be implemented.

In the constant voltage (CV) mode, control IC 117 generates the gate signal for semiconductor switching element 112 in accordance with the on duty ratio set to bring an output voltage detection value detected by FB circuit 115 closer to reference voltage Vr.

In contrast, in the constant current (CC) mode, control IC 117 generates the gate signal for semiconductor switching element 112 in accordance with the on duty ratio controlled to maintain an output current detection value detected by current detection resistor 116 at upper limit current Icc. Any known method is applicable to on/off control of the semiconductor switching element in these CV mode and CC mode.

DC power supply apparatuses 10A to 10E are connected in parallel to load 120 by connection of the + side output ends (OUT+) to one another and connection of the − side output ends (OUT−) to one another. FIG. 7 further shows exemplary operations of DC power supply apparatuses 10A to 10E when Vout is set to Vout=15.05 (V), that is, in current region IRb (100 to 200 (A)) in FIG. 5(b).

DC power supply apparatus 10A of Vr=15.10 (V) operates in the CC mode, and the on duty ratio of semiconductor switching element 112 is controlled such that the output current is equivalent to upper limit current Icc (100 (A)).

DC power supply apparatus 10B of Vr=15.05 (V) operates in the CV mode, and the on duty ratio of semiconductor switching element 112 is controlled to maintain the DC voltage detected by FB circuit 115 at reference voltage Vr (15.05 (V)).

In DC power supply apparatus 10C of Vr=15.00 (V), FB circuit 115 detects the output voltage higher than reference voltage Vr. Therefore, the on duty ratio of semiconductor switching element 112 is set to 0 or minimized. For example, even when switching occurs, semiconductor switching element 112 is immediately turned off owing to a flyback operation. Therefore, DC power supply apparatus 10C supplies substantially no current, and DC power supply apparatus 10C is in the inactive state in which output is 0(%). In addition, as diode 113 is reverse biased, flow of the current back from the side of load 120 is also prevented.

DC power supply apparatus 10D of Vr=14.95 (V) and DC power supply apparatus 10E of Vr=14.90 (V) are also in the inactive state similarly to DC power supply apparatus 10C. Operations of DC power supply apparatuses 10A to 10E in current region IRb (100 to 200 (A)) in FIG. 5 (b) are thus realized.

When output current Iout to load 120 exceeds 200 (A) from the state in FIG. 7, in DC power supply apparatus 10B, the detection value of the output current becomes equal to or larger than upper limit current Icc, and hence transition from the CV mode to the CC mode is made. At this time, the on duty ratio of semiconductor switching element 112 attains to a maximum value under the CV mode and thereafter it is restricted under the CC mode. Since output power is thus short in DC power supply apparatus 10B, the output voltage becomes lower than 15.05 (V).

In response to output voltage Vout becoming lower than 15.05 (V), in DC power supply apparatus 10C, FB circuit 115 thus detects a voltage in the vicinity of Vr=15.00 (V). In DC power supply apparatus 10C, in the CV mode, the on duty ratio of semiconductor switching element 112 is thus controlled to maintain the output voltage at reference voltage Vr (15.00 (V)).

In contrast, under the condition of Vout=15.00 (V), DC power supply apparatus 10D of Vr=14.95 (V) and DC power supply apparatus 10E of Vr=14.90 (V) are in the state in which they supply substantially no current (inactive state). It is thus understood that the operating states of DC power supply apparatuses 10A to 10E in current region IRc (200 to 300 (A)) in FIG. 5(b) are realized.

Figure 8:
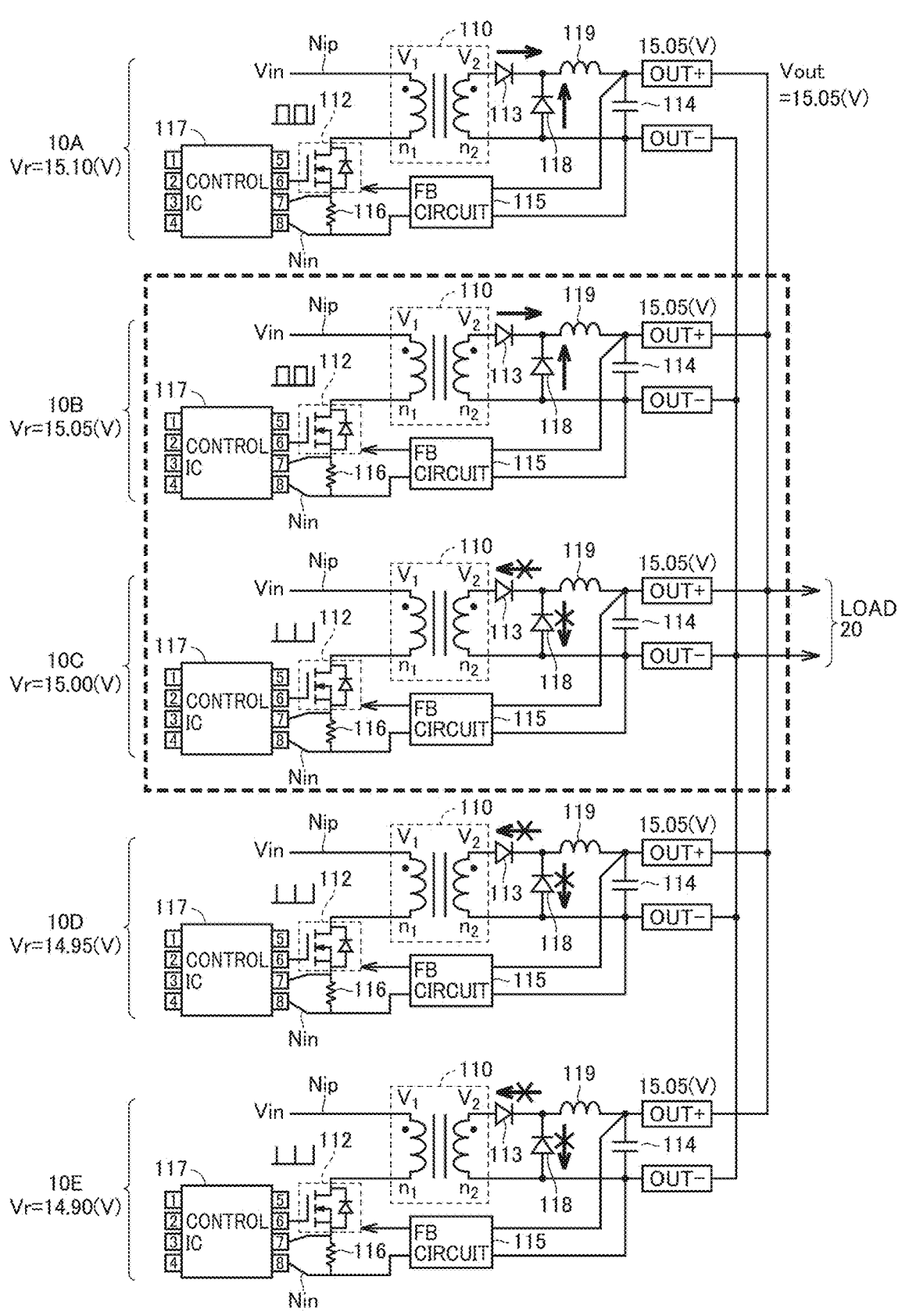
FIG. 8 is a circuit diagram illustrating a second exemplary configuration of the plurality of DC power supply apparatuses shown in FIG. 4 and exemplary operations thereof.

FIG. 8 shows as a second exemplary configuration, an exemplary configuration in which each of DC power supply apparatuses 10A to 10E is implemented as a forward DC power supply apparatus.

Referring to FIG. 8, each of DC power supply apparatuses 10A to 10E further includes a flywheel diode 118 and a reactor 119 in addition to the flyback configuration in FIG. 7. Reactor 119 is connected between a cathode of diode 113 and the + side output end (OUT+). The primary winding and the secondary winding of transformer 110 are wound to be identical in polarity, unlike the flyback configuration (FIG. 7).

Flywheel diode 118 is connected to continuously form a current loop including reactor 119 and capacitor 114 also during a non-conducting period of diode 113. The forward configuration is more suitable for a large current application than the flyback configuration, owing to arrangement of reactor 119. The flyback configuration, on the other hand, is a configuration more simplified than the forward configuration.

In FIG. 8 again, output from each of DC power supply apparatuses 10A to 10E is controlled based on the on duty ratio of semiconductor switching element 112. In other words, control operations in the CV mode and the CC mode are similar to those as described with reference to FIG. 7.

FIG. 8 also further shows exemplary operations of DC power supply apparatuses 10A to 10E when Vout is set to Vout=15.05 (V), that is, in current region IRb (100 to 200 (A)) in FIG. 5(b). When Vout is set to Vout=15.05 (V), DC power supply apparatuses 10A and 10B are in the active state as in FIG. 7. DC power supply apparatus 10A (Vr=15.10 (V)) operates in the CC mode, whereas DC power supply apparatus 10B (Vr=15.05 (V)) operates in the CV mode. DC power supply apparatuses 10C to 10D are in the inactive state, and as diode 113 and flywheel diode 118 are reverse biased, flow of the current back from load 120 is also prevented.

Thus, control (FIGS. 5(a) and (b)) of the operating states of DC power supply apparatuses 10A to 10E in the DC power supply system according to the first embodiment can be realized without being limited to the configuration of DC power supply apparatuses 10A to 10E. Furthermore, the configuration of DC power supply apparatuses 10A to 10E is not restricted as exemplified in FIGS. 7 and 8, but any configuration can be employed so long as CVCC control (FIG. 3) in accordance with reference voltage Vr and upper limit current Icc can be carried out.

As exemplified in FIGS. 7 and 8, by employing an insulating power supply to isolate the primary side (the side of power source 101) and the secondary side (the side of load 120) from each other by the transformer, in the DC power supply apparatus in a state in which it substantially does not output the current, the current outputted from the DC power supply apparatus in the active state is readily prevented from flowing back, and hence a more stable operation can be performed. In an example where a reference potential (ground) is identical between power source 101 and load 120, each DC power supply apparatus 10 can be configured as a non-insulating DC power supply apparatus. In other words, it is noted in the present embodiment for a confirmation purpose that each DC power supply apparatus may be of any of an insulating type and a non-insulating type so long as it is the CVCC power supply to which the life design described above is applied and that any circuit configuration is applicable.

It is noted for the confirmation purpose that, in an example where power source 101 is implemented by an AC power supply, a rectification circuit is arranged in the input stage so that an AC/DC converter is also applicable to DC power supply apparatuses 10A to 10E.

Second Embodiment

A modification of the output characteristics (CVCC control) of the DC power supply apparatuses that operate in parallel will be described in a second embodiment.

Figures 9, 10:
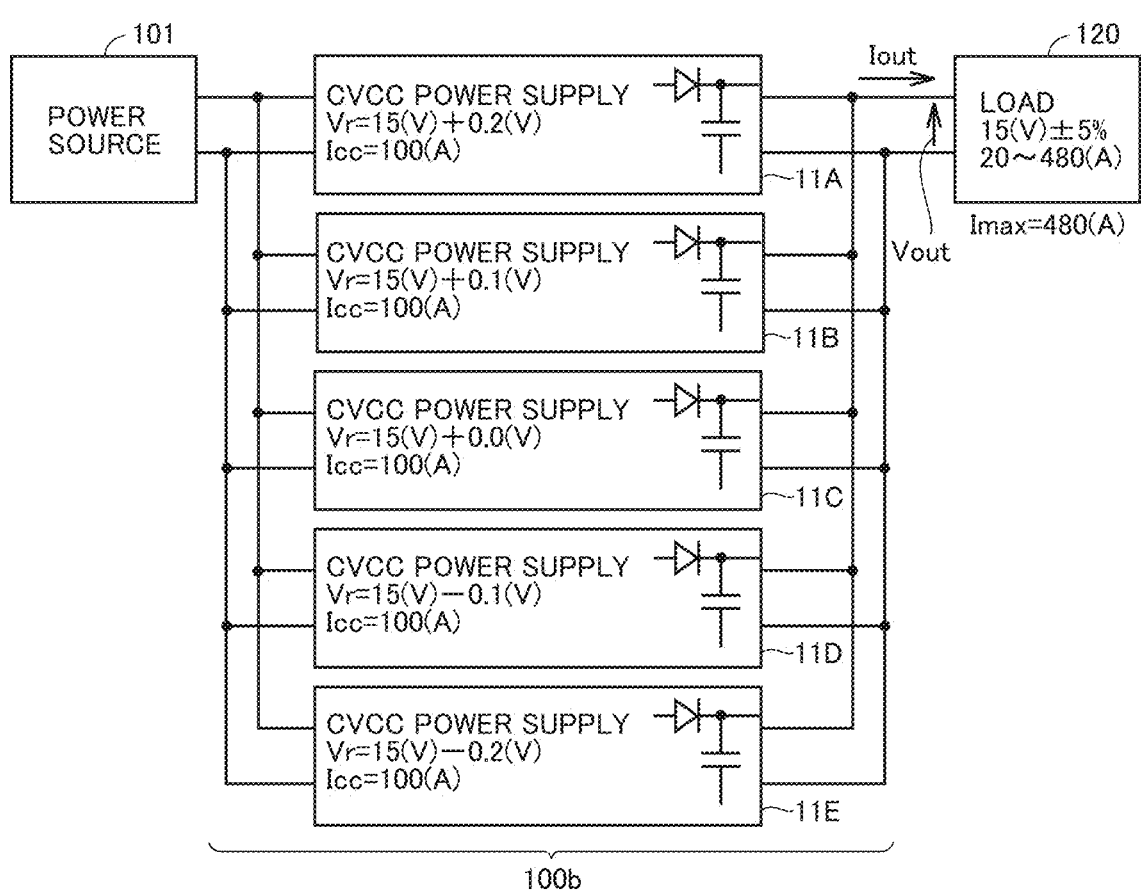
FIG. 9 is a conceptual diagram illustrating output characteristics of each DC power supply apparatuses in a DC power supply system according to a second embodiment.
FIG. 10 is a block diagram illustrating a configuration of the DC power supply system according to the second embodiment.

FIG. 9 is a conceptual diagram illustrating output characteristics of each DC power supply apparatus in a DC power supply system according to the second embodiment.

As shown in FIG. 9, in the second embodiment, in the drooping characteristics of each DC power supply apparatus, a region exhibiting derating characteristics (a derating region below) where the output voltage is lowered with increase in output current in transition from the CV mode to the CC mode is provided. Specifically, when the output current becomes higher than a criterion current I1 lower by ΔI than upper limit current Icc, a target voltage value in voltage feedback control is lowered from reference voltage Vr at a constant rate. A rate of voltage lowering with increase in current in accordance with the derating characteristics is expressed as −(ΔV/ΔI).

For example, control IC 117 in FIGS. 7 and 8 is implemented by a programmable digital IC such as a digital signal processor (DSP), so that the drooping characteristics having the derating characteristics shown in FIG. 9 can be realized by programming. Alternatively, a similar function can also be performed by an analog circuit such as an operational amplifier.

FIG. 10 is a block diagram illustrating a configuration of the DC power supply system according to the second embodiment.

As shown in FIG. 10, a DC power supply system 100b according to the second embodiment includes five (N=5) DC power supply apparatuses 11A to 11E having at least output sides connected in parallel, similarly to DC power supply system 100a (FIG. 4) according to the first embodiment. DC power supply apparatuses 11A to 11E in the second embodiment are different from DC power supply apparatuses 10A to 10E in the first embodiment in that the region exhibiting the derating characteristics described with reference to FIG. 9 is provided in the output characteristics (CVCC control). In addition, setting of reference voltages Vr of DC power supply apparatuses 11A to 11E is different from that of DC power supply apparatuses 10A to 10E in the first embodiment (FIG. 4). DC power supply apparatuses 11A to 11E are otherwise similar to DC power supply apparatuses 10A to 10E in the first embodiment. Since aspects in FIG. 10 are otherwise similar to those in the first embodiment (FIG. 4) inclusive of power source 101 and load 120, detailed description will not be repeated.

Figure 11:
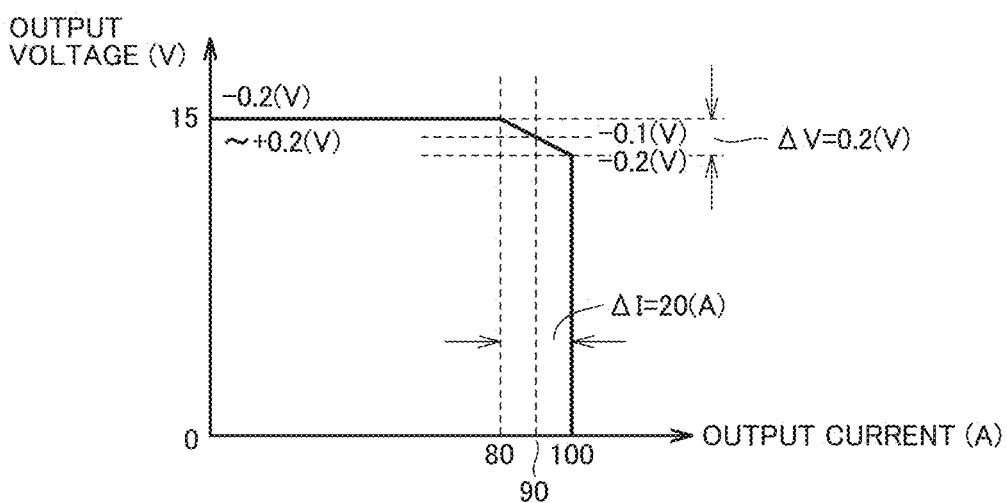
FIG. 11 is a conceptual diagram illustrating output characteristics of each DC power supply apparatus in FIG. 10.

FIG. 11 shows a conceptual diagram illustrating output characteristics of each of DC power supply apparatuses 11A to 11E in FIG. 10.

As shown in FIG. 11, the output characteristics of DC power supply apparatuses 11A to 11E correspond to setting of the derating characteristics, with ΔI=20 (A) and ΔV=0.2 (V) being set under the condition of Icc=100 (A) in FIG. 9.

Therefore, when the output current becomes higher than I1=80 (A), a target voltage in voltage feedback control lowers from reference voltage Vr at a constant rate of –0.01 (V/A). Therefore, operations in the CV mode of each of power supply apparatuses 11A to 11E are controlled such that, when the output current is set to 90 (A), the output voltage becomes lower than reference voltage Vr by 0.1 (V), and when the output current is set to 100 (A), the output voltage becomes lower than reference voltage Vr by 0.2 (V). Specifically, the voltage target value in voltage feedback control in the CV mode is gradually lowered from reference voltage Vr in accordance with the derating characteristics.

Referring again to FIG. 10, reference voltages Vr of DC power supply apparatuses 11A to 11E are set in increments of 0.1 (V) larger than those in FIG. 4, within the range of 15 (V)±5%.

Specifically, Vr is Vr=15+0.2=15.2 (V) in DC power supply apparatus 11A, and Vr is Vr=15+0.1=15.1 (V) in DC power supply apparatus 11B. Vr is Vr=15+0.0=15 (V) in DC power supply apparatus 11C. Furthermore, Vr is Vr=15–0.1=14.9 (V) in DC power supply apparatus 11D, and Vr is Vr=15–0.2=14.8 (V) in DC power supply apparatus 11E.

In the second embodiment, a difference (increments: 0.1 (V)) in reference voltage Vr among DC power supply apparatuses 11A to 11E is set to be smaller than a voltage width ΔV (0.2 (V) here) in the derating characteristic region of the drooping characteristics. By setting the difference (increments) in reference voltage Vr to half ΔV in the example in FIG. 10, the number of active DC power supply apparatuses increases stepwise.

Figure 12:
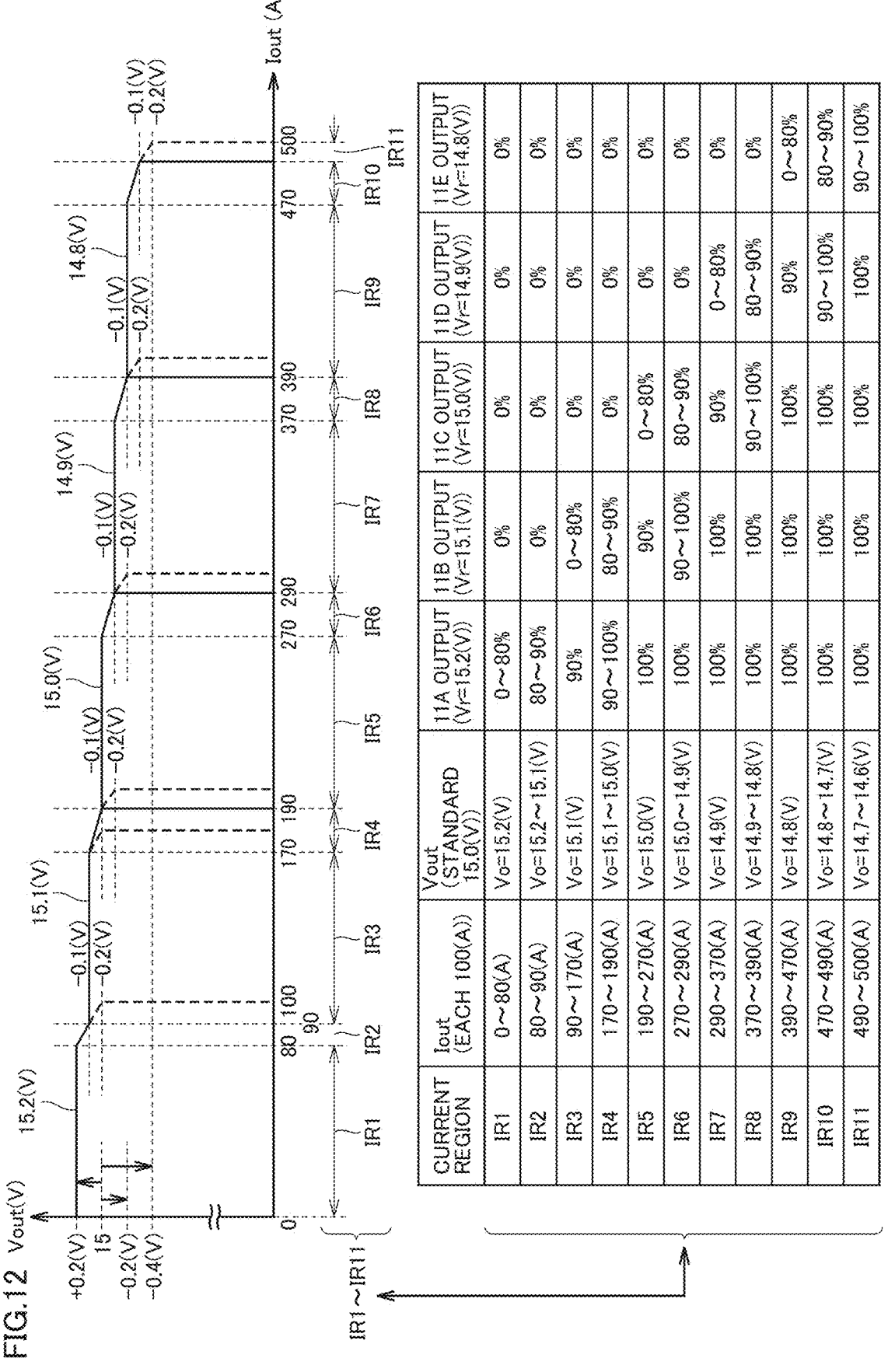
FIG. 12 is a conceptual diagram and a diagram for illustrating operations of the DC power supply system according to the second embodiment.

FIG. 12 shows a conceptual diagram and a diagram for illustrating operations of the DC power supply system according to the second embodiment.

In FIG. 12(*a*), as in FIG. 5(*a*), the abscissa and the ordinate represent output current Iout (that is, the load current) and output voltage Vout from DC power supply system 100*b* to load 120, respectively. In the second embodiment, the derating characteristics are provided in the drooping characteristics, so that the current region of output current Iout is divided more finely than in the first embodiment (FIG. 5(*a*)).

Referring to FIG. 12(*a*), in a current region IR1 where output current Iout is from 0 to 80 (A), only DC power supply apparatus 11A (Vr=15.20 (V)) highest in reference voltage Vr outputs the current, whereas remaining DC power supply apparatuses 10B to 10E, the output voltages from which are lower than 15.20 (V), are in the inactive state and do not supply the currents.

As shown in FIG. 12(*b*), in current region IR1, the output from DC power supply apparatus 11A is within a range from 0% to 80% (the output current being 80 (A)). DC power supply apparatus 11B to 11E, on the other hand, are in the inactive state although they are operating, and in the inactive state where output is 0% (the output current=0 (A)).

Referring again to FIG. 12(*a*), when output current Iout becomes higher than 80 (A), the output voltage from DC power supply apparatus 11A lowers at a rate of 0.1 (V) with increase in current by 10 (A). In a current region IR2 where output current Iout is from 80 to 90 (A), the output voltage from DC power supply apparatus 11A thus lowers to 15.2-0.1=15.1 (V) at the above-mentioned rate.

As shown in FIG. 12(*b*), in current region IR2, the output from DC power supply apparatus 11A is within a range from 80 to 90% (the output current being from 80 to 90 (A)). DC power supply apparatuses 11B to 11E are in the inactive state where output is 0% (the output current=0 (A)), as in current region IR1.

Referring again to FIG. 12(*a*), when output voltage Vout lowers to 15.1 (V), with the output current from DC power supply apparatus 11A being restricted to 90 (A), DC power supply apparatus 11B (Vr=15.1 (V)) starts supply of the current. Thus, at Vout=15.1 (V), DC power supply apparatuses 11A and 11B are in the active state. This operating state continues until the output current from DC power supply apparatus 11B reaches 80 (A) in accordance with the output characteristics in FIG. 11.

Therefore, in a current region IR3 where the output current is from 90 to 170 (A), as shown in FIG. 12(*b*), the output from DC power supply apparatus 11A is fixed to 90% (the output current=90 (A)) and the output from DC power supply apparatus 11B is within the range from 0 to 80% (the output current=0 to 80 (A)). DC power supply apparatuses 11C to 11E, reference voltages Vr of which are lower than 15.1 (V), are in the inactive state where the output is 0% (the output current=(A)), as in current region IR1.

Referring to FIGS. 12(*a*) and (*b*), when output current Iout becomes higher than 170 (A), the output current from DC power supply apparatus 11A that operates in accordance with the derating characteristics in FIG. 11 becomes higher than 90(%). When the output voltage from DC power supply apparatus 11A lowers to 15.0 (V), the output current therefrom is set to upper limit current Icc=100 (A). DC power supply apparatus 11B also starts operating in accordance with the derating characteristics, and the output current therefrom also increases from 80(%).

Therefore, in a current region IR4 where output current Iout is from 170 to 190 (A), as output from DC power supply apparatus 11A is from 90 to 100% and output from DC power supply apparatus 11B is from 80 to 90%, the load current is secured and output voltage Vout lowers from 15.1 (V) to 15.0 (V).

When output voltage Vout lowers to 15.0 (V), output from DC power supply apparatus 11A becomes 100% (the output current=100 (A)) in accordance with the output characteristics in FIG. 11 and DC power supply apparatus 11C of Vr=15.0 (V) starts supply of the current. Under the condition of Vout=15.0 (V), the output current from DC power supply apparatus 11B is 90 (A). This state continues until the output current from DC power supply apparatus 11C reaches 80 (A) and the output voltage from DC power supply apparatus 11C becomes lower than 15.0 (V). At this time, Iout is calculated as Iout=100+90+80=270 (A).

Therefore, in a current region IR5 where output current Iout is from 190 to 270 (A), under the condition of output voltage Vout of 15.0 (V), output from DC power supply apparatus 11A is fixed to 100% (the output current=100 (A)) and output from DC power supply apparatus 11B is fixed to 90% (the output current=90 (A)). Furthermore, output from DC power supply apparatus 11C is within the range from 0 to 80% (the output current being from 0 to 80 (A)). DC power supply apparatuses 11D and 11E, reference voltages Vr of which are lower than 15.0 (V), are in the inactive state where output therefrom is 0% (the output current=0 (A)).

When output current Iout becomes higher than 270 (A), the output currents from DC power supply apparatuses 11B and 11C that operate in the derating characteristic region increase in increments of 10 (A) until output voltage Vout lowers by 0.1 (V). Output current Vout thus increases up to 290 (A). When output current Iout reaches 290 (A), output voltage Vout lowers to 14.9 (V) and hence DC power supply apparatus 10D further starts supply of the current.

Therefore, in a current region IR6 where output current Iout is from 270 to 290 (A), output from DC power supply apparatus 11A is fixed to 100%, output from DC power supply apparatus 11B is from 90 to 100%, and output from DC power supply apparatus 11C is from 80 to 90%, so that the load current is secured. Output voltage Vout, on the other hand, lowers from 15.0 (V) to 14.9 (V) owing to the derating characteristics.

Similarly in a region where output current Iout is higher than 290 (A), the operating state of DC power supply system 100b changes among a current region IR7 (output current Iout being from 290 to 370 (A)), a current region IR8 (output current Iout being from 370 to 390 (A)), a current region IR9 (output current Iout being from 390 to 470 (A)), a current region IR10 (output current Iout being from 470 to 490 (A)), and a current region IR11 (output current Iout being from 490 to 500 (A)).

Specifically, in current region IR7 (Iout=290 to 370 (A)), under the condition of output voltage Vout of 14.9 (V), outputs from DC power supply apparatuses 11A and 11B are fixed to 100% (the output current=100 (A)) and output from DC power supply apparatus 11C is fixed to 90% (the output current=90 (A)). Furthermore, output from DC power supply apparatus 11D is within the range from 0 to 80% (the output current being from 0 to 80 (A)). In DC power supply apparatus 11E, reference voltage Vr of which is lower than 14.9 (V), output is 0% (the output current=0 (A)).

In current region IR8 (Iout=370 to 390 (A)), outputs from DC power supply apparatuses 11A and 11B are fixed to 100%, output from DC power supply apparatus 11C is from 90 to 100%, and output from DC power supply apparatus 11D is from 80 to 90%, so that the load current is secured and output voltage Vout lowers from 14.9 (V) to 14.8 (V).

In current region IR9 (Iout=390 to 470 (A)), under the condition of output voltage Vout of 14.8 (V), outputs from DC power supply apparatuses 11A to 11C are fixed to 100% (the output current=100 (A)) and output from DC power supply apparatus 11D is fixed to 90% (the output current=90 (A)). Furthermore, output from DC power supply apparatus 11E is within the range from 0 to 80% (the output current being from 0 to 80 (A)). In other words, all of DC power supply apparatuses 11A to 11E are in the active state.

In current region IR10 (Iout=470 to 490 (A)), outputs from DC power supply apparatuses 11A to 11C are fixed to 100%, output from DC power supply apparatus 11D is from 90 to 100%, and output from DC power supply apparatus 11E is from 80 to 90%, so that the load current is secured and output voltage Vout lowers from 14.8 (V) to 14.7 (V)

In current region IR11 (Iout=490 to 500 (A)), outputs from DC power supply apparatuses 11A to 11D are fixed to 100% and output from DC power supply apparatus 11E is from 90 to 100%, so that the load current is secured and output voltage Vout lowers from 14.7 (V) to 14.6 (V).

Thus, also by parallel operations of DC power supply apparatuses 11A to 11E with the drooping characteristics provided with the derating characteristics, maximum load current Imax=480 (A) to load 120 can be supplied within the range where lowering in output voltage Vout is not greater than 5% of specification value 15 (V).

According to the DC power supply system according to the second embodiment, the derating characteristics are provided in the drooping characteristics of each of DC power supply apparatuses 11A to 11E. Therefore, in addition to the effect in the first embodiment, with smooth change in output voltage Vout with increase in output current Iout, DC power supply apparatuses 11A to 11C are successively activated as overlapping with each other. Sudden fluctuation in output voltage Vout supplied to load 120 is thus suppressed and stability of operations of the load is improved.

Furthermore, in each of DC power supply apparatuses 11A to 11E, before the output current increases to upper limit current Icc, the DC power supply apparatus in the next stage is activated to start supply of the current. The output current from the DC power supply apparatus on a side where reference voltage Vr is set to be high is thus suppressed as compared with that in the first embodiment. Consequently, each of DC power supply apparatuses 11A to 11E can be expected to secure life longer than the designed life designed on the assumption about continuous activation at upper limit current Icc. In particular, life of DC power supply apparatus 11A set to be highest in reference voltage Vr can thus be longer than in the first embodiment.

Though current-voltage characteristics in the derating characteristics of the drooping characteristics are exemplified as being linear, that is, the characteristics of lowering in output voltage at a constant rate with increase in current are exemplified in the second embodiment, the current-voltage characteristics are not limited as exemplified. In other words, the current-voltage characteristics in the derating characteristics in transition from the CV mode to the CC mode may be set as being curved, so long as the output current gradually lowers with increase in output current.

Third Embodiment

A system configuration to monitor active time periods of the plurality of DC power supply apparatuses that operate in parallel based on output from the DC power supply apparatuses will be described in a third embodiment.

Figure 13:
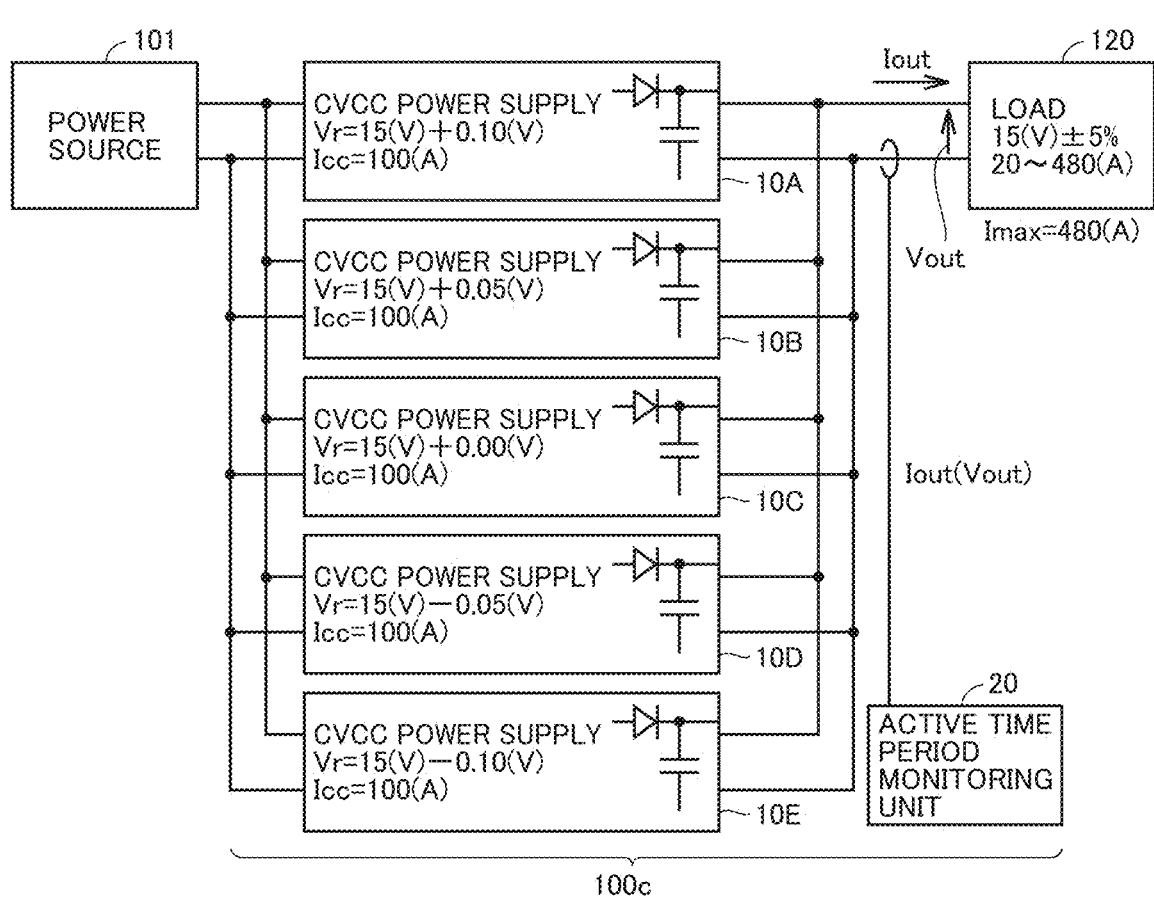
FIG. 13 is a block diagram illustrating a configuration of a DC power supply system according to a third embodiment.

FIG. 13 is a block diagram illustrating a configuration of a DC power supply system according to the third embodiment.

As shown in FIG. 13, a DC power supply system 100c according to the third embodiment is different in further including an active time period monitoring unit 20 in addition to the configuration of DC power supply system 100a (FIG. 4) according to the first embodiment. Since aspects of DC power supply system 100c are otherwise similar to those in the first embodiment (FIG. 4) inclusive of power source 101 and load 120, detailed description will not be repeated. Therefore, operating states of DC power supply apparatuses 10A to 10E are controlled as in FIGS. 5(a) and (b).

Figure 14:
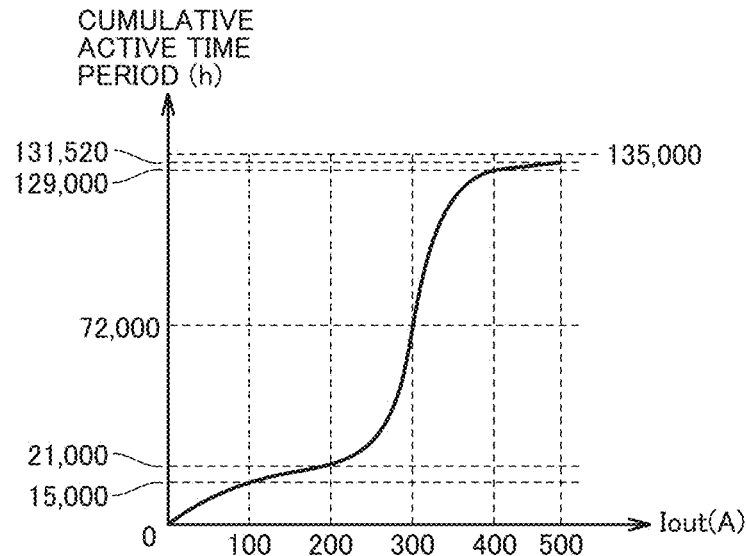
FIG. 14 is a conceptual diagram illustrating an exemplary power application profile assumed in the DC power supply system in FIG. 13.

FIG. 14 shows an exemplary power application profile assumed in DC power supply system 100c.

The power application profile in FIG. 14 corresponds to an example on which the active time period planned values of DC power supply apparatuses 10A to 10E shown in FIG. 6 are based. By thus assuming the power application profile, lives of DC power supply apparatuses 10A to 10E can be predicted based on calculation of the active time period planned values of DC power supply apparatuses 10A to 10E (FIG. 6).

As described with reference to FIGS. 5(a) and (b), on the other hand, in the present embodiment, whether or not DC power supply apparatuses 10A to 10E connected in parallel are supplying the current, that is, in which of the active state and the inactive state they are in, is determined based on output current Iout or output voltage Vout from the DC power supply system. Therefore, active time period monitoring unit 20 performs a function to sum the active time periods of DC power supply apparatuses 10A to 10E based on output current Iout or output voltage Vout from DC power supply system 100c. An example where active time period monitoring unit 20 estimates the active time periods of DC power supply apparatuses 10A to 10E based on output current Iout will be described.

Figure 15:
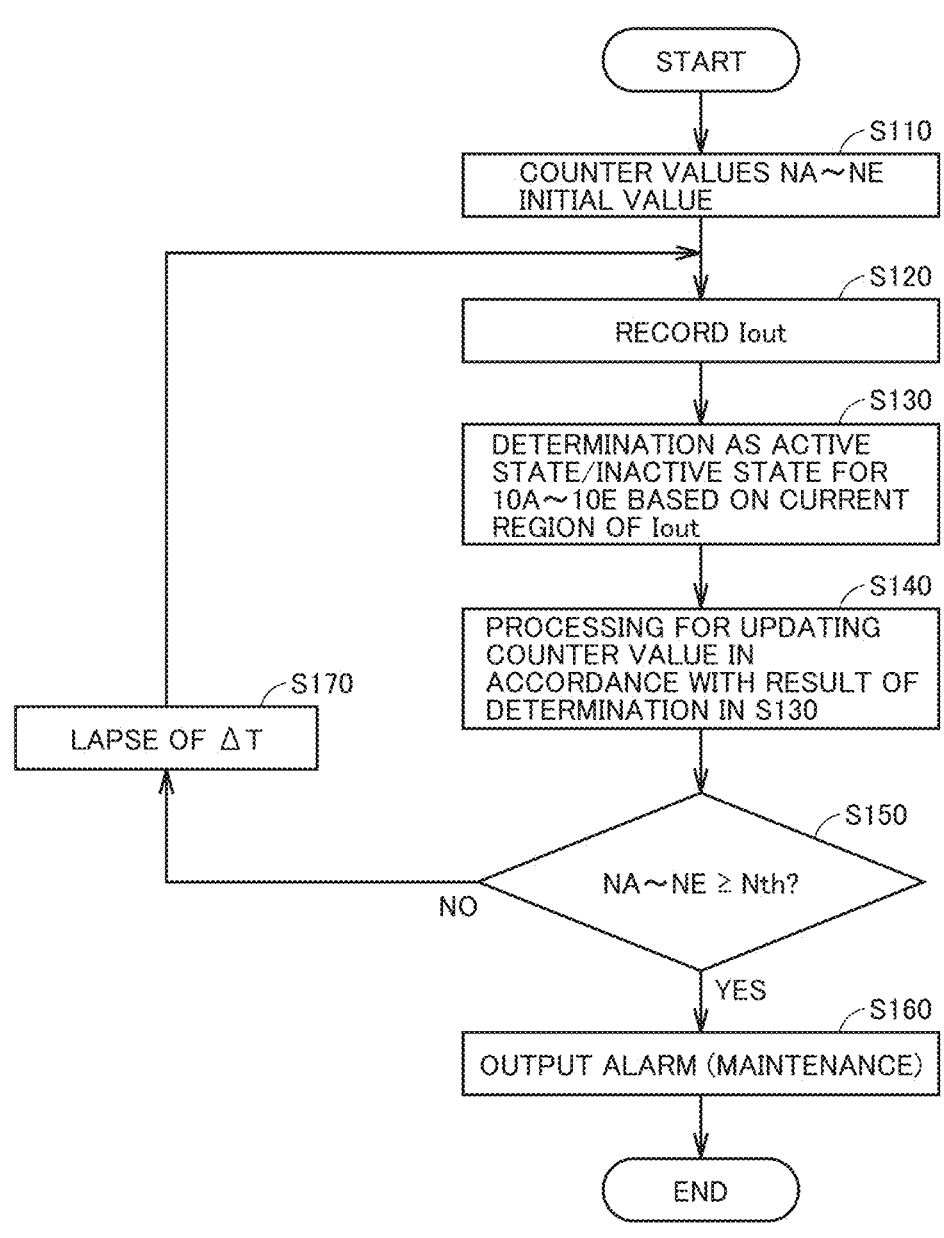
FIG. 15 is a flowchart illustrating an operation of an active time period monitoring unit shown in FIG. 13.

FIG. 15 shows a flowchart for illustrating operations of active time period monitoring unit 20. Active time period monitoring unit 20 can be implemented by a computing circuit (a microcomputer or the like) to perform computing processing with an output detection value from DC power supply system 100c.

In step S110, active time period monitoring unit 20 sets counter values NA to NE for counting the active time period of each of DC power supply apparatuses 10A to 10E to an initial value (zero), as an initial operation.

In step S120, active time period monitoring unit 20 records an output detection value (output current Iout here) outputted from DC power supply system 100c. Then, in step S130, in accordance with FIG. 5(b), in which of the active state and the inactive state each of DC power supply apparatuses 10A to 10E is in is determined based on the current region to which output current Iout recorded in S120 belongs. For example, when Iout recorded in S120 is Iout=150 (A), in light of FIG. 5(b), DC power supply apparatuses 10A and 10B are determined as being in the active state and DC power supply apparatuses 10C to 10E are determined as being the inactive state. In other words, the diagram in FIG. 5(b) corresponds to one example of the "corresponding information" for determination as to in which of the active state and the inactive state each of DC power supply apparatuses 10A to 10E is in for each range of output current Iout.

In step S140, active time period monitoring unit 20 updates the counter value in accordance with a result of determination in S130. Specifically, the counter value corresponding to the DC power supply apparatus determined as being in the active state is increased, whereas the counter value corresponding to the DC power supply apparatus determined as not being active is maintained. In the example where Iout is Iout=150 (A) described above, counter values NA and NB increase, whereas counter values NC to NE are maintained.

In step S150, active time period monitoring unit 20 determines each of counter values NA to NE updated in S140 as an alarm criterion value Nth. When at least one of counter values NA to NE reaches alarm criterion value Nth (NA to NE≥Nth), determination as YES is made in step S150 and the process proceeds to step S160. In step S160, an alarm encouraging maintenance or replacement of the DC power supply apparatus corresponding to the counter value that has reached alarm criterion value Nth is outputted. For example, when conditions of NA=Nth and NB to NE<Nth are satisfied, in step S160, the alarm aimed at DC power supply apparatus 10A is outputted.

When none of counter values NA to NE has reached alarm criterion value Nth (NA to NE<Nth), determination as NO is made in step S150, and after lapse of a certain time period ΔT in step S170, the process returns to step S120. In other words, while determination as NO is made in step S150, processing in steps S120 to S150 is repeated every ΔT.

When ΔT is relatively short (for example, approximately one second), an instantaneous value of output current Iout should only be recorded in step S120. When ΔT is relatively long, on the other hand, in step S120, a statistical value (an average value, a mode, or the like) of output current Iout during ΔT may be recorded.

Thus, according to the DC power supply system according to the third embodiment, in addition to the effect in the first embodiment, a power supply which should be maintained can be determined by knowing the active time period of each DC power supply apparatus. Since the DC power supply system can thus be maintained and managed without performing unnecessary maintenance, resource saving and reduction in maintenance cost can be achieved.

Furthermore, operation information including the active time period can be shared among three parties which are a user who uses load 120 and DC power supply system 100c, a maintenance company of DC power supply system 100c and load 120, and a manufacturer of DC power supply system 100c. Thus, the user can predict replacement of equipment before failure, and the maintenance company responsible for operation can propose fine-grained renewal of equipment or repair service to the user. Furthermore, the manufacturer can make plans for production of DC power supply system 100c with tendency of life consumption being reflected.

In conventional parallel operations by a plurality of DC power supply apparatuses, such a design concept that the DC power supply apparatuses output currents on average has been adopted. Therefore, it is difficult to determine deterioration of a specific DC power supply apparatus and such measures as replacement all DC power supply apparatuses tend to be required. As compared with the conventional example, the DC power supply system according to the third embodiment is advantageous in terms of the number of DC power supply apparatuses to be replaced (cost) and time required for works in maintenance.

In particular, in the DC power supply system according to the third embodiment, the active time period is grasped for each DC power supply apparatus, and the DC power supply apparatus to which the alarm is to be outputted, that is, the DC power supply apparatus close to the end of its life, can be maintained (replaced) at any time. Failure due to the end of life of each DC power supply apparatus can thus efficiently be prevented.

In order to obviate the need for maintenance, a large amount of techniques and cost have conventionally been spent for being maintenance-free, however, cost therefor does not have to be spent any more. According to the third embodiment, maintenance can readily be provided and spent cost is minimized. Therefore, total operation cost in the entire lifecycle of the DC power supply system can be reduced.

With such an advantage, the DC power supply system according to the third embodiment is suitable for a DC power distribution system in a data center, a building or the like which separately includes a system to monitor a state of supply of power, a DC power distribution facility for motive power of a factory, or other facilities where a power demand monitoring system is arranged.

As described above, active time period monitoring unit 20 can also monitor other outputs from DC power supply system 100c such as the active time periods of DC power supply apparatuses 10A to 10E based on output voltage Vout. In this case, in step S120 in FIG. 15, output voltage Vout is recorded. Furthermore, determination in step S130 in FIG. 15 can be made in accordance with the output voltage or predetermined relation (FIG. 5(b)) between the output voltage and DC power supply apparatuses 10A to 10E.

The third embodiment can also be combined with the second embodiment. In this case, determination in step S130 in FIG. 15 can be made in accordance with FIG. 12(b).

Fourth Embodiment

In the first and second embodiments, the example in which, while reference voltages Vr are set to different values among a plurality of power supply apparatuses that operate in parallel, upper limit current Icc in the CC mode is set to the common value is described. In a fourth embodiment, balancing of life among the plurality of DC power supply apparatuses is aimed by setting upper limit currents Icc to different values among the DC power supply apparatuses.

Figure 16:
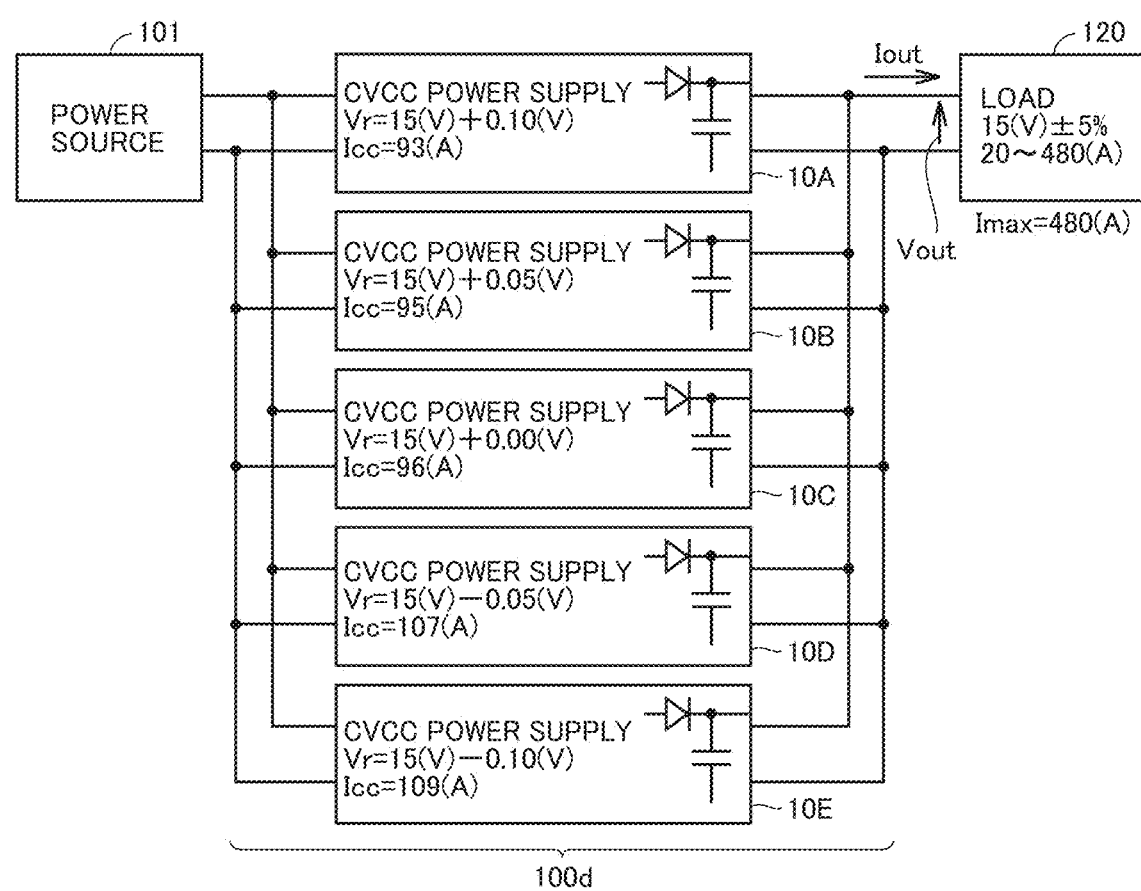
FIG. 16 is a block diagram illustrating a configuration of a DC power supply system according to a fourth embodiment.

FIG. 16 is a block diagram illustrating a configuration of a DC power supply system according to the fourth embodiment.

As shown in FIG. 16, though a DC power supply system 100d according to the fourth embodiment is similar in configuration to DC power supply system 100a (FIG. 4) according to the first embodiment, it is different from the first embodiment in setting of upper limit currents Icc of DC power supply apparatuses 10A to 10E. Since aspects of DC power supply system 100d are otherwise similar to those in the first embodiment (FIG. 4) inclusive of power source 101 and load 120, detailed description will not be repeated. The power application profile of DC power supply system 100d is also similar to that in the first to third embodiments, and for example, the cumulative active time period of each of DC power supply apparatuses 10A to 10E is similar to that in FIG. 6.

For example, upper limit current Icc can be set to lower by at least 1%, a maximum output current from the DC power supply apparatus longer in active time period and to increase by at least 1%, the maximum output current from the DC power supply apparatus shorter in active time period. Furthermore, upper limit currents Icc of DC power supply apparatuses 10A to 10E can be set to values within a range of ±10% of the reference (100 (A) here).

By way of example, in the example in FIG. 16, Icc=100−7=93 (A) is set in DC power supply apparatus 10A (Vr=15.10 (V)), and Icc=100−5=95 (A) is set in DC power supply apparatus 10B (Vr=15.05 (V)). Icc=100−4=96 (A) is set in DC power supply apparatus 10C (Vr=15.00 (V)). In contrast, Icc=100+7=107 (A) is set in DC power supply apparatus 10D (Vr=14.95 (V)) and Icc=100+9=109 (A) is set in DC power supply apparatus 10E (Vr=14.90 (V)).

Thus, the DC power supply apparatus longer in active time period by being set to be high in reference voltage Vr among DC power supply apparatuses 10A to 10E is set to be lower in upper limit current Icc. The sum of upper limit currents Icc of DC power supply apparatuses 10A to 10E is calculated as 93+95+96+107+109=500 (A), and it is set as in the first embodiment (100×5=500 (A)). In other words, output current Iout when all of DC power supply apparatuses 10A to 10E are active is secured as in the first embodiment.

Relation between the output current from the DC power supply apparatus and life thereof will now be described with reference to FIG. 17. The abscissa in FIG. 17 represents the output currents from DC power supply apparatuses 10A to 10E and the ordinate represents an amount of increase in temperature ΔT[K] by the current and a life coefficient kc which will be described later.

Figure 17:
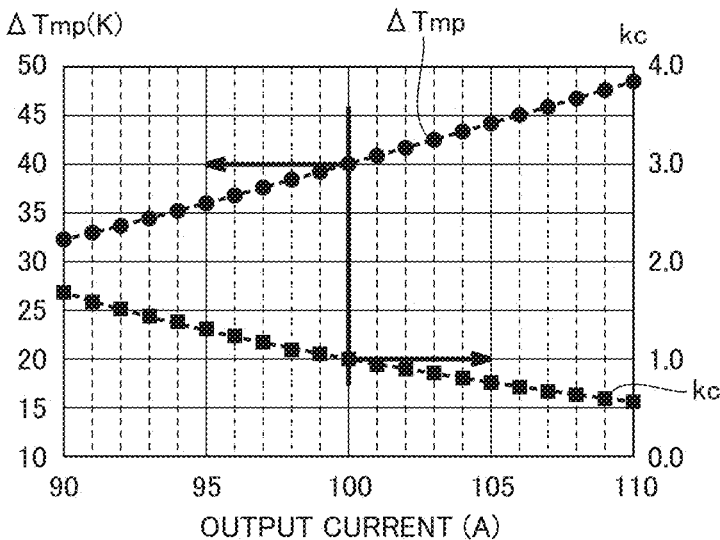
FIG. 17 shows a graph illustrating relation between an output current from a DC power supply apparatus and life thereof.

In FIG. 17, with amount of increase in temperature ΔT at the time when the output current=100 [A] is set being defined as ΔT=40 [K], influence on life in increase or lowering in output current from this reference condition is analyzed.

In FIG. 17, variation in amount of increase in temperature ΔT with change in output current is plotted with a circle. Amount of increase in temperature ΔT varies in accordance with a square of the output current.

Furthermore, in FIG. 17, life coefficient kc plotted with a quadrangle is calculated on the assumption that, in each DC power supply apparatus, life is twice longer with lowering in temperature by 10 (K) whereas life becomes shorter to (½) time with increase in temperature by 10 (K). Life coefficient kc represents life at each output current value, as a ratio to life when the output current is set to 100 (A). In other words, when Iout is set to 100 (A), kc is set to kc=1.0.

For example, with Icc being set to Icc=93 (A) in DC power supply apparatus 10A, amount of increase in temperature ΔT is calculated as $(93/100)^2$=0.8649 time larger than when Icc is set to Icc=100 (A), that is, approximately 34.6 (K). Therefore, kc is calculated as kc=2^((40−34.6)/10) =1.454.

Similarly, with Icc being set to Icc=109 (A) in DC power supply apparatus 10E, amount of increase in temperature ΔT is calculated as $(109/100)^2$=1.1881 time larger than when Icc is set to Icc=100 (A), that is, approximately 47.5 (K). Therefore, kc is calculated as=2^(40−47.5)/10)=0.594.

FIG. 18 shows a diagram of a list of cumulative active time periods of DC power supply apparatuses in the DC power supply system according to the fourth embodiment.

Referring to FIG. 18, in the fourth embodiment, with change in upper limit current Icc, a boundary value among current regions IRa to IRe slightly changes from that in the first embodiment (FIG. 6). The active time period planned value in each of current regions IRa to IRe, on the other hand, is equivalent to that in the first embodiment (FIG. 6). Therefore, the active time period planned values of DC power supply apparatuses 10A to 10E for Tlim=131520 (h) are similar to those in the first embodiment, that is, the values the same as in the lowermost field in FIG. 6.

Upper limit current Icc is different from 100 (A) in each of DC power supply apparatuses 10A to 10E. Therefore, as described with reference to FIG. 17, in the DC power supply apparatus that satisfies a condition of Icc>100 (A), with decrease in life coefficient kc from 1.0, damage to life is greater than the active time period planned value. In the DC power supply apparatus that satisfies a condition of Icc<100 (A), on the other hand, with increase in life coefficient kc from 1.0, damage to life is less than the active time period planned value.

In FIG. 17, with a reciprocal (1/kc) of the life coefficient being defined as a life consumption rate, difference in damage to life described above is reflected, by using a life consumption time period by which the active time period planned value is multiplied. Thus, in the DC power supply apparatus having kc>1.0 (that is, Icc<100 (A)), the life consumption time period is smaller than the active time period planned value, and in the DC power supply apparatus having kc<1.0 (that is, Icc>100 (A)), the life consumption time period is larger than the active time period planned value.

The life consumption time period of each of DC power supply apparatuses 10A to 10E is shown in the lowermost field in FIG. 18. In DC power supply apparatus 10A highest in reference voltage Vr and largest in active time period planned value, the life consumption time period is shorter than the active time period planned value, and life can be longer.

It is thus understood that difference between a maximum value and a minimum value of the life consumption time period among DC power supply apparatuses 10A to 10E is smaller than difference between a maximum value and a minimum value of the active time period planned value. Therefore, life can be balanced among DC power supply apparatuses 10A to 10E that operate in parallel, with reference voltage Vr being different thereamong.

The fourth embodiment can also be combined with the second embodiment, and upper limit current Icc can be set in DC power supply apparatuses 11A to 11E of DC power supply system 100b according to the second embodiment, as in the fourth embodiment. In the fourth embodiment, active time period monitoring unit 20 according to the third embodiment can also further be arranged.

According to the DC power supply system according to the fourth embodiment, in addition to the effect in the first or second embodiment, balance of life among the DC power supply apparatuses can be secured in such a manner that the upper limit current is suppressed in the DC power supply apparatus where high reference voltage Vr is set and a time period for output of the current is long, and in contrast, upper limit current Icc is increased in the DC power supply apparatus low in reference voltage Vr. Therefore, by avoiding use of a long-life component more than necessary, cost can be reduced.

Fifth Embodiment

In a fifth embodiment, an exemplary configuration for accommodation and exemplary maintenance (replacement) works, of a plurality of DC power supply apparatuses will be described.

Figure 19:
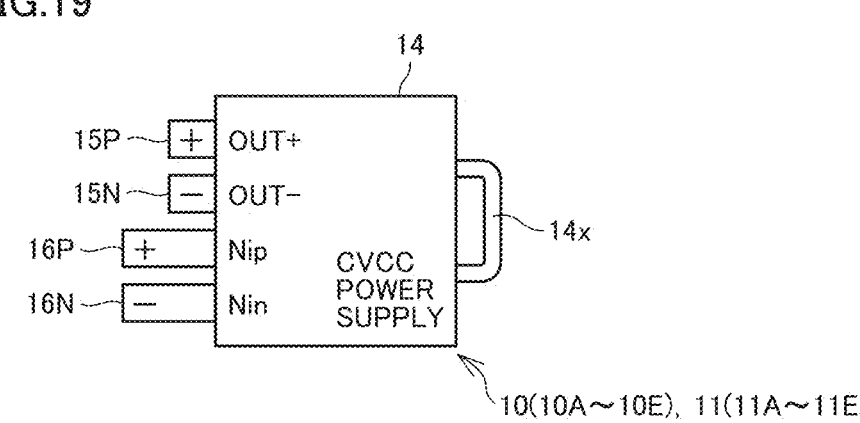
FIG. 19 is an external view of a DC power supply apparatus included in a DC power supply system according to a fifth embodiment.

FIG. 19 is an external view of a DC power supply apparatus included in a DC power supply system according to the fifth embodiment.

As shown in FIG. 19, in the DC power supply system according to the fifth embodiment, DC power supply apparatus 10 (collective denotation of 10A to 10E) or DC power supply apparatus 11 (collective denotation of 11A to 11E) is in such a shape that output connection terminals 15P and 15N and input connection terminals 16P and 16N for external connection are provided to protrude from a module portion 14.

For example, constituent components of a flyback or forward converter illustrated in FIGS. 7 and 8 are accommodated in module portion 14. As described above, components of a converter of any circuit configuration including a non-insulating configuration such as a chopper type are accommodated in module portion 14. A grip portion 14x is provided on a rear surface of module portion 14, that is, a side opposite to a surface where output connection terminals 15P and 15N and input connection terminals 16P and 16N are provided.

Input connection terminal 16P is electrically connected to input node Nip in FIGS. 7 and 8 and input connection terminal 16N is electrically connected to input node Nin in FIGS. 7 and 8.

Similarly, output connection terminal 15P is electrically connected to the + side output end (OUT+) in FIGS. 7 and 8 and output connection terminal 15N is electrically connected to the − side output end (OUT−) in FIGS. 7 and 8. Furthermore, input connection terminals 16P and 16N are configured to be longer in length of projection from a module surface than output connection terminals 15P and 15N.

Figure 20:
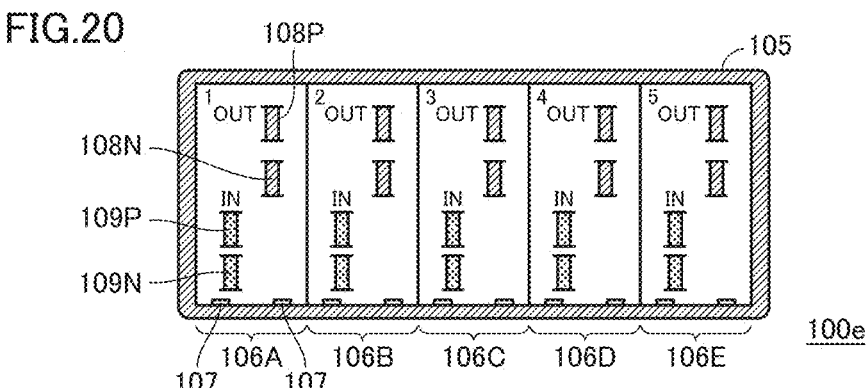
FIG. 20 is an external view of a power supply slot where the DC power supply apparatus shown in FIG. 19 is accommodated.

FIG. 20 is an external view of a power supply slot where the DC power supply apparatus shown in FIG. 19 is accommodated.

As shown in FIG. 20, a DC power supply system 100e according to the fifth embodiment is composed of a power supply slot 105 and N power supply apparatuses 10(11) attached to power supply slot 105. An example in which N is set to N=5, that is, DC power supply apparatuses 10A to 10E are attached to power supply slot 105 as in the first embodiment and the like will be described also in the fifth embodiment.

As shown in FIG. 20, slots 106A to 106E in number corresponding to N=5 are provided in power supply slot 105. Each of slots 106A to 106E is provided with a guide rail 107, connectors 108P and 108N for attachment by insertion of output connection terminals 15P and 15N, and connectors 109P and 109N for attachment by insertion of input connection terminals 16P and 16N. Though not shown, power supply slot 105 is electrically connected to power source 101 and load 120 through a wire or the like.

Connectors 108P and 108N are provided in a recessed shape to be fitted to projecting portions of output connection terminals 15P and 15N, so that electrical connection of connectors 108P and 108N to output connection terminals 15P and 15N is secured at the time of fitting. Similarly, connectors 109P and 109N are provided in a recessed shape to be fitted to projecting portions of input connection terminals 16P and 16N, so that electrical connection of connectors 109P and 109N to input connection terminals 16P and 16N is secured at the time of fitting.

In power supply slot 105, connectors 109P are electrically connected to one another and connectors 109N are electrically connected to one another among slots 106A to 106E. The output sides of DC power supply apparatuses 10A to 10E attached to respective slots 106A to 106E can thus be connected in parallel. Connectors 109P and 109N in slots 106A to 106E are electrically connected to power source 101 through wires in power supply slot 105.

DC power supply apparatuses 10A to 10E are attached to respective slots 106A to 106E by pressing of module portion 14 along guide rails 107 with the use of grip portion 14x. As electrical connection of output connection terminals 15P and 15N and input connection terminals 16P and 16N to connectors 108P and 108N and 109P and 109N is secured, DC power supply apparatuses 10A to 10E are attached to power supply slot 105.

At this time, owing to a difference in shape (specifically, the length of projection) between output connection terminals 15P and 15N and input connection terminals 16P and 16N, input connection terminals 16P and 16N are attached earlier and output connection terminals 15P and 15N are attached later than input connection terminals 16P and 16N.

When input connection terminals 16P and 16N are attached and DC power supply apparatuses 10A to 10E are electrically connected to power source 101, DC power supply apparatuses 10A to 10E automatically start operating so as to be able to output DC power (output voltage×output current) from the output ends, that is, output connection terminals 15P and 15N. In actual, depending on magnitude of the voltage on the output side, each of DC power supply apparatuses 10A to 10E that has started operating is in the active state or the inactive state.

DC power supply apparatuses 10A to 10E are configured as being removable from slots 106A to 106E even while output voltages Vout and output currents Iout are being outputted to load 120, that is, even during operation of DC power supply system 100e. For example, by pulling grip portion 14x to cancel fitting of output connection terminals 15P and 15N and input connection terminals 16P and 16N to connectors 108P and 108N and 109P and 109N, DC power supply apparatuses 10A to 10E are removed from slots 106A to 106E and electrically disconnected from power supply slot 105.

Combination of projecting output connection terminals 15P and 15N and input connection terminals 16P and 16N with recessed connectors 108P and 108N and 109P and 109N thus implements one example of the "fitting structure." The fitting structure is not limited to the examples in FIGS. 19 and 20. For example, as projections and recesses are provided in a surface where module portion 14 and slots 106A to 106E are in contact with each other, such a fitting structure that input connection terminals 16P and 16N are attached before output connection terminals 15P and 15N can also be achieved. Alternatively, a part in a projecting shape can also be provided on a side of slots 106A to 106E and a part in a recessed shape can also be provided on a side of module portion 14 of DC power supply apparatuses 10A to 10E.

Figure 21:
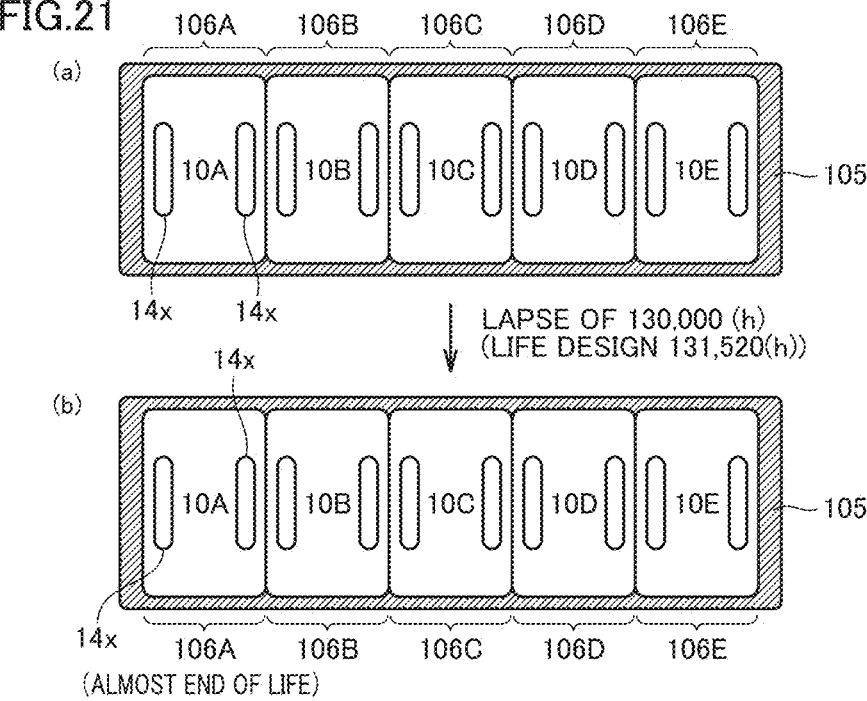
FIG. 21 is a conceptual diagram illustrating an exemplary situation before maintenance of the DC power supply system according to the fifth embodiment.

FIG. 21 shows a conceptual diagram illustrating an exemplary situation before maintenance of DC power supply system 100e according to the fifth embodiment.

As shown in FIG. 21(*a*), as DC power supply apparatuses 10A to 10E are attached to respective slots 106A to 106E in power supply slot 105, DC power supply system 100e starts operating.

FIG. 21(*b*) shows a state after lapse of 130000 (h) hours in the vicinity of Tlim (131520 (h)) since start of operations in FIG. 21(*a*), in accordance with the power application profile as in the first embodiment. As described with reference to FIG. 6, the active time period of DC power supply apparatus 10A set to be highest in reference voltage Vr is equivalent to the operation time period of DC power supply system 100e.

Therefore, it is understood in FIG. 21(*b*) that a cumulative active time period of DC power supply apparatus 10A has also attained to 130000 (h) and the end of designed life is near.

Figure 22:
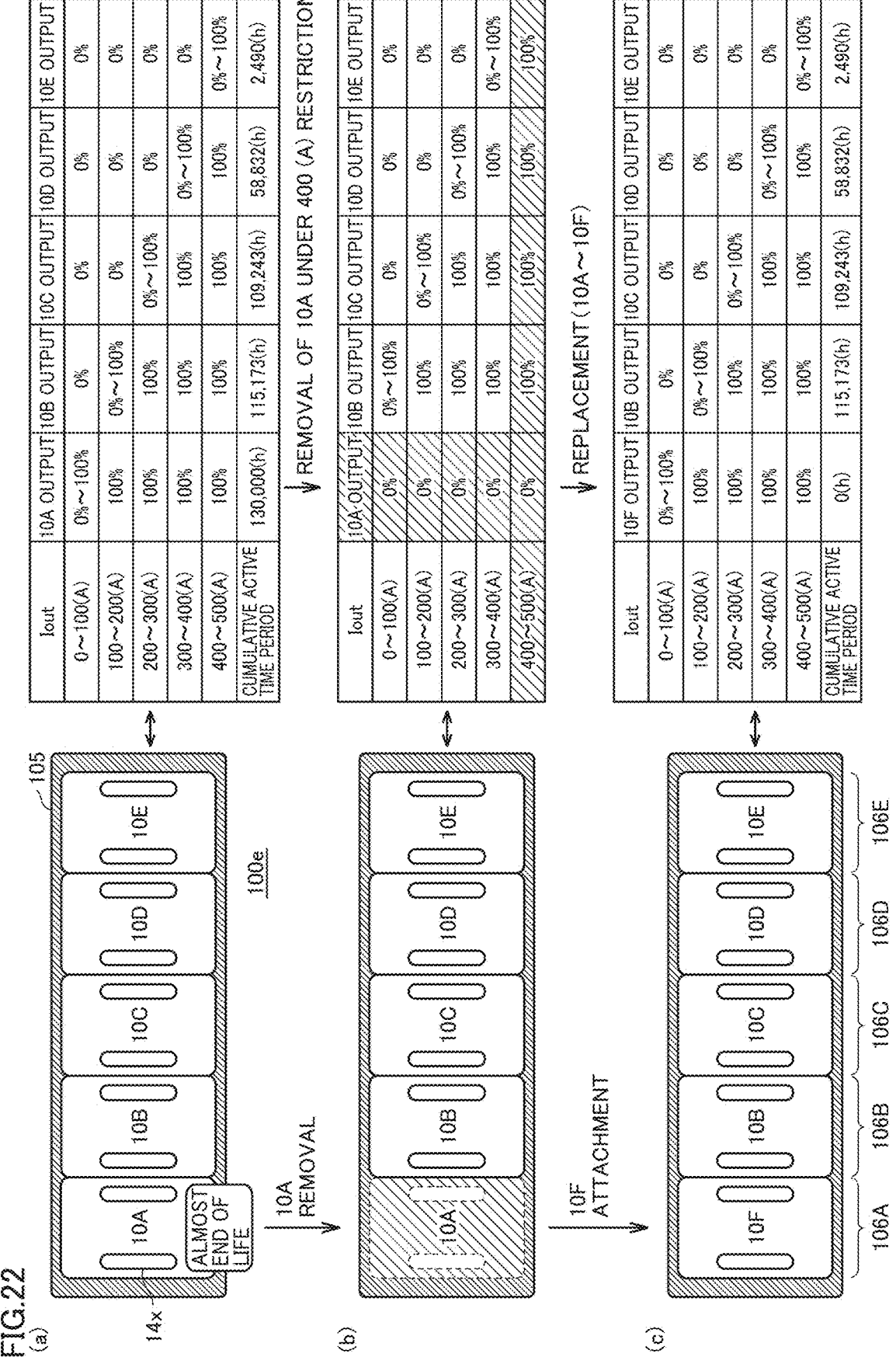
FIG. 22 is a conceptual diagram illustrating exemplary maintenance works for the DC power supply system according to the fifth embodiment.

FIG. 22 shows a conceptual diagram illustrating a configuration and maintenance works, of the DC power supply system according to the fifth embodiment.

FIG. 22(*a*) shows a state before maintenance works, in which DC power supply apparatuses 10A to 10E can be removed from any of slots 106A to 106E with the use of grip portion 14x. In FIG. 22(*a*), the active time period of DC power supply apparatus 10A has reached 130000 (h) as described with reference to FIG. 21(*b*), and hence maintenance works to replace DC power supply apparatus 10A are planned.

FIG. 22(*b*) shows a state in which DC power supply apparatus 10A has been removed. In this state, the output current from DC power supply apparatus 10A is zero, whereas outputs from DC power supply apparatuses 10B to 10E in each current region are equivalent to respective outputs from DC power supply apparatuses 10A to 10D in the state in FIG. 22(*a*). Therefore, in the state in FIG. 22(*b*), DC power supply apparatuses 10B to 10E can supply the current at 400 (A) at the maximum.

Therefore, removal works in FIG. 22(*b*) should be performed at timing when output current Iout to load 120 is lower than 400 (A). For example, maintenance works can be performed as being timed with lowering in load current, in consideration of past operation conditions of load 120.

FIG. 22(*c*) shows a state in which a new DC power supply apparatus 10F is attached to slot 106A from which DC power supply apparatus 10A was removed. For example, reference voltage Vr of DC power supply apparatus 10F can be set to a value equivalent (Vr=15.1 (V) here) to that of DC power supply apparatus 10A to be replaced. In the state in FIG. 22(*c*), DC power supply system 100e can supply output current Iout up to 500 (A) at the maximum to load 120 by parallel operations of five DC power supply apparatuses 10B to 10F as in FIG. 22(*a*). Thus, in DC power supply system 100e, a DC power supply apparatus close to the end of its life can be replaced by using timing when output current Iout is relatively low, without operations being stopped.

As described above, any DC power supply apparatus in the first, second, and fourth embodiments can be adopted as the plurality of DC power supply apparatuses to be attached to power supply slot 105 in the fifth embodiment. Further in combination with the third embodiment, active time period monitoring unit 20 can also be arranged.

As described above, according to the DC power supply system according to the fifth embodiment, in addition to the effects described in the first to fourth embodiments, at least one DC power supply apparatus close to the end of its life can be replaced without stop of supply of electric power to load 120, that is, by hot swapping. Therefore, maintenance can be carried out without causing inconvenience to the user, such as stop of supply of electric power to load 120.

Consequently, the DC power supply system according to the fifth embodiment is suitable for an important facility that has a dislike for stop of power supply, such as a data center, a communication infrastructure facility, and a production facility. Even if a DC power supply apparatus fails before the end of its life, completion of maintenance in a short period of time by removal of the same from power supply slot 105 and attachment of a new DC power supply apparatus can be expected.

As shown in FIG. 19, each of DC power supply apparatuses 10A to 10E is configured to normally start by attachment of input connection terminals 16P and 16N before output connection terminals 15P and 15N.

When output connection terminals 15P and 15N are attached with the output voltage being too low even after start of DC power supply apparatuses 10A to 10E, due to a difference in output voltage from other DC power supply apparatuses, there is a concern about instantaneous generation of a great abnormal current for charging of capacitor 114 in FIGS. 7 and 8. A terminal or the like may deteriorate due to an insufficient area of electrical contact on the output side under the influence by this abnormal current.

Therefore, output connection terminals 15P and 15N are preferably further provided with a configuration to avoid the abnormal current as described above. For example, an entry prevention pin (not shown) for prevention of insertion into connectors 108P and 108N when the voltage is low can be attached to tip ends of output connection terminals 15P and 15N. The entry prevention pin can be configured to be drawn in, for example, when a voltage at the + side output end (OUT+) with which contact is made attains to a predetermined voltage or higher, to allow insertion of output connection terminals 15P and 15N in connectors 108P and 108N.

When the voltage at the + side output end (OUT+) is lower than the predetermined voltage, on the other hand, the entry prevention pin is not drawn in, to thereby prevent insertion of output connection terminals 15P and 15N into connectors 108P and 108N. For example, the entry prevention pin can be implemented by a solenoid locking mechanism. By providing such an entry prevention pin, generation of the abnormal current at the time of attachment of the DC power supply apparatus in maintenance (replacement) works can be prevented.

Sixth Embodiment

In a sixth embodiment, a configuration in which the number of slots is increased for maintenance works as compared with the fifth embodiment will be described.

FIG. 23 is a conceptual diagram illustrating a configuration and maintenance works of a DC power supply system according to the sixth embodiment. FIG. 23(*a*) shows a configuration of a DC power supply system 100*f* according to the sixth embodiment in comparison to FIG. 22(*a*).

As shown in FIG. 23(*a*), DC power supply system 100*f* according to the sixth embodiment is different from DC power supply system 100*e* according to the fifth embodiment shown in FIG. 21(*a*) in that power supply slot 105 further includes a slot 106X to which a DC power supply apparatus is not attached, in addition to slots 106A to 106E to which DC power supply apparatuses 10A to 10E are attached, respectively, during operation. Slot 106X corresponds to the "spare slot."

Slot 106X is similar in configuration to slots 106A to 106E, and DC power supply apparatus 10 (11) according to the present embodiment can be attached thereto. Since aspects of DC power supply system 100*f* according to the sixth embodiment are otherwise similar to those of DC power supply system 100*e* according to the fifth embodiment, detailed description will not be repeated.

In FIG. 23(*a*), no DC power supply apparatus is attached to slot 106X, and DC power supply system 100*f* starts operating by parallel operations of DC power supply apparatuses 10A to 10E attached to slots 106A to 106E. The operating states of DC power supply apparatuses 10A to 10E in each current region at output current Iout and output voltage Vout to load 120 are similar to those described in the first embodiment.

In FIG. 23(*b*), as in FIG. 22(*a*), the active time period of DC power supply apparatus 10A set to be highest in reference voltage Vr has reached 130000 (h) in the vicinity of Tlim (131520 (h)) corresponding to designed life, and hence maintenance works to replace DC power supply apparatus 10A are planned.

As shown in FIG. 23(*c*), in the maintenance works for DC power supply system 100*f*, before DC power supply apparatus 10A to be replaced is removed from slot 106A, new DC power supply apparatus 10F is attached to empty slot 106X. As in the fifth embodiment, reference voltage Vr of DC power supply apparatus 10F can be set to a value (Vr=15.1 (V) here) equivalent to that of DC power supply apparatus 10A to be replaced. Therefore, as shown in the diagram in FIG. 23(*c*), DC power supply apparatus 10F in each current region is equivalent to DC power supply apparatus 10A to be replaced. In this state, five DC power supply apparatuses 10A to 10D and 10F except for DC power supply apparatus 10E lowest in reference voltage Vr can supply output currents Iout up to 500 (A) at the maximum to load 120.

Thereafter, as shown in FIG. 23(*d*), as in FIG. 22(*c*), DC power supply apparatus 10A is removed from slot 106A. In a state following replacement in FIG. 23(*d*), five DC power supply apparatuses 10B to 10F can supply output currents Iout up to 500 (A) at the maximum to load 120.

Thus, the DC power system according to the sixth embodiment can supply output current Iout higher than 400 (A) in the state in FIG. 23(*c*), unlike FIG. 22(*b*). Consequently, even while load 120 operates at the maximum current, maintenance works in FIGS. 23(*c*) and (*d*) can be performed. In other words, regardless of the operation condition of load 120, maintenance works by replacement of the DC power supply apparatus can be performed at any timing.

Seventh Embodiment

In a seventh embodiment, a redundant design in which an extra DC power supply apparatus for the maximum current of load 120 is connected in parallel will be described.

Figure 24:
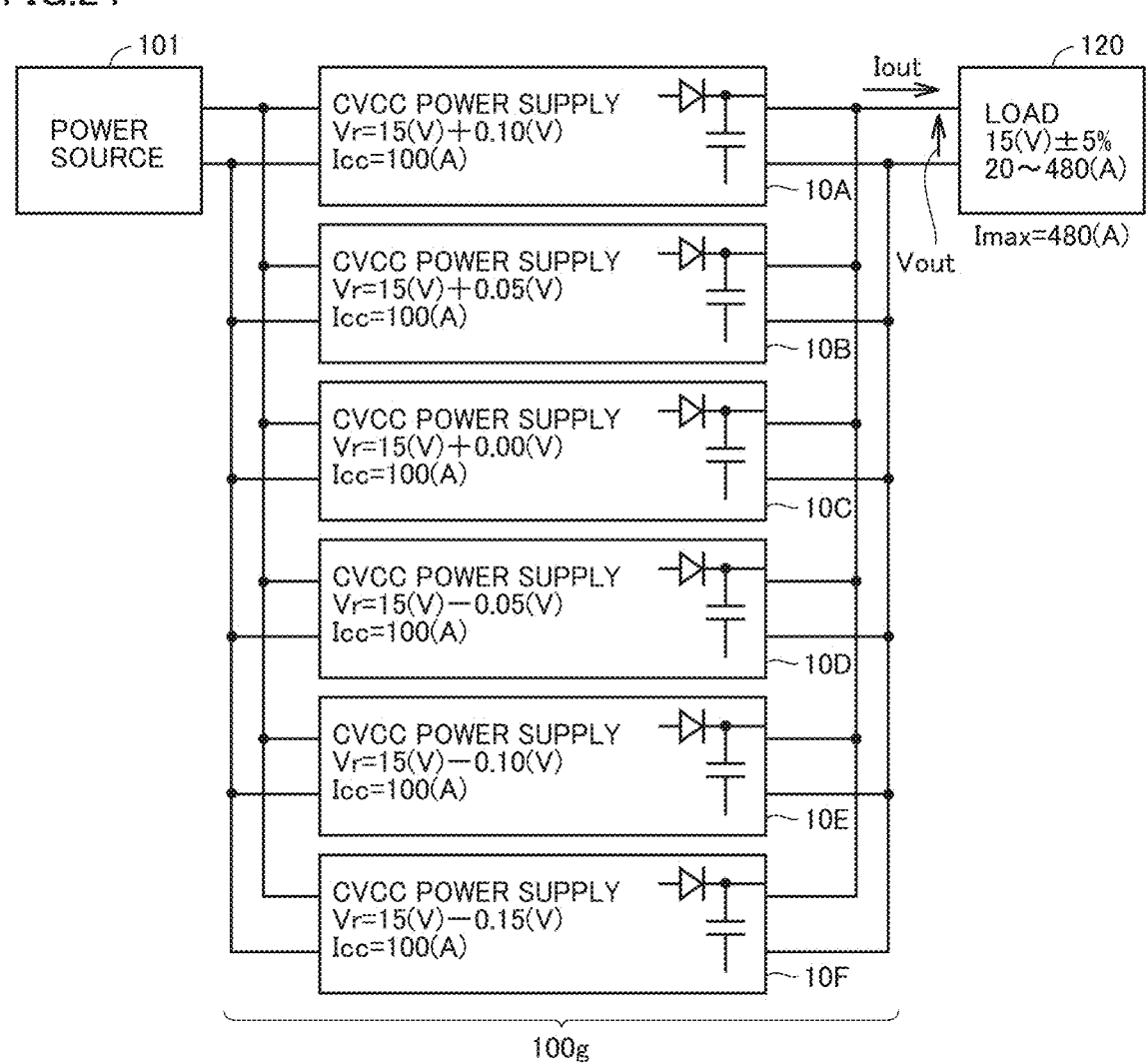
FIG. 24 is a block diagram illustrating a configuration of a DC power supply system according to a seventh embodiment.

FIG. 24 is a block diagram illustrating a configuration of a DC power supply system 100*g* according to the seventh embodiment.

As shown in FIG. 24, DC power supply system 100*g* according to the seventh embodiment is different in further including DC power supply apparatus 10F in addition to the configuration of DC power supply system 100*a* (FIG. 4) according to the first embodiment. DC power supply apparatus 10F has an output side connected in parallel to the output sides of DC power supply apparatuses 10A to 10E.

In DC power supply system 100*g*, upper limit current Icc of each of DC power supply apparatuses 10A to 10F is set to 100 (A). Therefore, in DC power supply system 100*g*, six DC power supply apparatuses 10A to 10F in total, with one extra DC power supply apparatus for the number (N=5) of DC power supply apparatuses for securing Imax=480 (A), are connected in parallel and supply electric power to load 120.

In other words, in DC power supply system 100*g*, the number of DC power supply apparatuses connected in parallel is determined such that the sum of upper limit currents Icc of only some of DC power supply apparatuses is larger than maximum load current Imax to load 120. FIG. 24 shows as a preferred example, a configuration in which one extra DC power supply apparatus is provided.

Reference voltages Vr of DC power supply apparatuses 10A to 10E are set as in the first embodiment and set stepwise to values different from one another. Reference voltage Vr of extra DC power supply apparatus 10F arranged for redundancy is set to a value smaller than reference voltages Vr of DC power supply apparatuses 10A to 10E, which is Vr=15-0.15=14.85 (V) in the example in FIG. 24. Reference voltage Vr of DC power supply apparatus 10F is also set within the allowable range of load 120 such as a range of 15 (V)+5%. Since aspects of DC power supply system 100*g* are otherwise similar to those in the first embodiment (FIG. 4) inclusive of power source 101 and load 120, detailed description will not be repeated.

FIG. 25 shows a diagram for illustrating operations of each DC power supply apparatus in the DC power supply system according to the seventh embodiment.

FIG. 25(*a*) shows operations of each DC power supply apparatus when none of DC power supply apparatuses 10A to 10F has failed. In this case, five DC power supply apparatuses 10A to 10E in the descending order of magnitude of reference voltage Vr supply output currents Iout. Consequently, as in FIG. 5(*b*), the operating state of each of DC power supply apparatuses 10A to 10E in each current region of output current Iout and output voltage Vout to load 120 are determined.

In the state in FIG. 25(*a*), redundant DC power supply apparatus 10F is in the inactive state in which output is 0% even in the current region where output current Iout is from 400 to 500 (A). This is because DC power supply apparatuses 10A to 10E can secure output current Iout also in supply of the maximum current of 480 (A) to load 120, and hence output voltage Vout is set to 14.90 (V) lowest among reference voltages Vr of DC power supply apparatuses 10A to 10E, whereas reference voltages Vr of DC power supply apparatus 10F is lower than that. In other words, the DC power supply apparatus lowest in reference voltage Vr among the plurality of DC power supply apparatuses 10A to 10F connected in parallel is automatically constantly in the inactive state for redundancy.

FIG. 25(b) shows operations when any one of DC power supply apparatuses 10A to 10E, DC power supply apparatus 10C here, has failed.

As shown in FIG. 25(b), output from DC power supply apparatus 10C (Vr=15.00 (V)) that has failed is 0% in all current regions. Operations of DC power supply apparatuses 10A and 10B higher in reference voltage Vr than DC power supply apparatus 10C do not change from those in FIG. 25 (a).

In contrast, DC power supply apparatus 10D (Vr=14.95 (V)) highest in reference voltage Vr next to DC power supply apparatus 10C operates similarly to DC power supply apparatus 10C. In other words, output from DC power supply apparatus 10D in each current region in FIG. 25(b) is equivalent to output from DC power supply apparatus 10C in FIG. 25(a). Similarly, output from DC power supply apparatus 10E (Vr=14.90 (V)) in FIG. 25(b) is equivalent to output from DC power supply apparatus 10D in FIG. 25(a). In other words, DC power supply apparatus 10E operates similarly to DC power supply apparatus 10D.

Furthermore, DC power supply apparatus 10F in the inactive state (output being 0(%)) in FIG. 25(a) operates similarly to DC power supply apparatus 10E in FIG. 25(a) in the current region (400 to 500 (A)) where DC power supply apparatus 10E has outputted the current within the range from 0 to 100% in FIG. 25(a).

Thus, five DC power supply apparatuses 10A, 10B, and 10D to 10F can secure output current Iout in each current region as in FIG. 25(a). In FIG. 25(b), in the current regions where DC power supply apparatus 10C has outputted the current, that is, each current region under the condition of Iout≥200 (A), output voltage Vout becomes lower than in FIG. 25(a). As described above, however, in DC power supply apparatus 10F lowest in reference voltage Vr as well, reference voltage Vr is set within the allowable voltage range (+5%) of load 120. Therefore, even in the state in FIG. 25(b) where DC power supply apparatus 10C has failed, with output voltage Vout within the allowable voltage range of load 120, output current Iout up to Imax=480 (A) can be supplied to load 120. In other words, it is understood that the redundant design to address the failure of any DC power supply apparatus is realized.

Thus, in the DC power supply system according to the seventh embodiment, the redundant design can be realized simply by increasing by one, the number of DC power supply apparatuses connected in parallel from the number necessary for supply of maximum load current Imax to load 120. The redundant design of a general power supply system is realized by arranging in parallel, two power supply apparatuses to supply rated currents with which the maximum current to the load can be addressed. In contrast, according to the present embodiment, the redundant design can be realized with (M+1) DC power supply apparatuses in total, simply by additional connection of one extra DC power supply apparatus to M DC power supply apparatuses for supply of the maximum current in an allocated manner.

Consequently, cost for the redundant configuration can be suppressed as compared with the general power supply system described above. For example, the general redundant design requires power supply apparatuses twice as many, whereas the present embodiment requires only power supply apparatuses (M+1)/M times as many and cost can be reduced. The apparatus (system) can thus also be reduced in size.

In the seventh embodiment again, DC power supply apparatus 11 in the second embodiment can be employed as each DC power supply apparatus. The third embodiment (active time period monitoring unit 20) and/or the fourth embodiment (balancing of life based on upper limit current Icc) can be combined with the seventh embodiment.

Furthermore, DC power supply apparatuses 10A to 10F included in DC power supply system 100g according to the seventh embodiment can also be attached to power supply slot 105 in the fifth or sixth embodiment. In this case, DC power supply apparatus 10C that has failed from the state in FIG. 25(b) can be removed from power supply slot 105 without supply of the current to load 120 being stopped, that is, by hot swapping at any timing.

Eighth Embodiment

In an eighth embodiment, an exemplary configuration of a DC power supply system including a DC power supply apparatus to which a wide band gap semiconductor such as gallium nitride (GaN) or silicon carbide (SiC) has recently been applied will be described.

A wide band gap semiconductor element composed of a wide band gap semiconductor such as GaN is capable of high-frequency switching. A DC power supply apparatus including such a wide band gap semiconductor element as a switching element is effective in suppression of an output ripple voltage, reduction in size of a magnetic component owing to high-frequency drive, suppression of power loss in the magnetic component with reduction in size, and suppression of power loss by a low on resistance of the semiconductor switching element, and greatly advantageous in terms of reduction in size and higher efficiency. In contrast, in general, the wide band gap semiconductor element is generally lower in current capacity than a semiconductor element composed of an ordinary semiconductor material.

Therefore, in the eighth embodiment, a large number of DC power supply apparatuses including the wide band gap semiconductor element of GaN or the like and being relatively low in capacity are connected in parallel to implement a DC power supply system.

Figure 26:
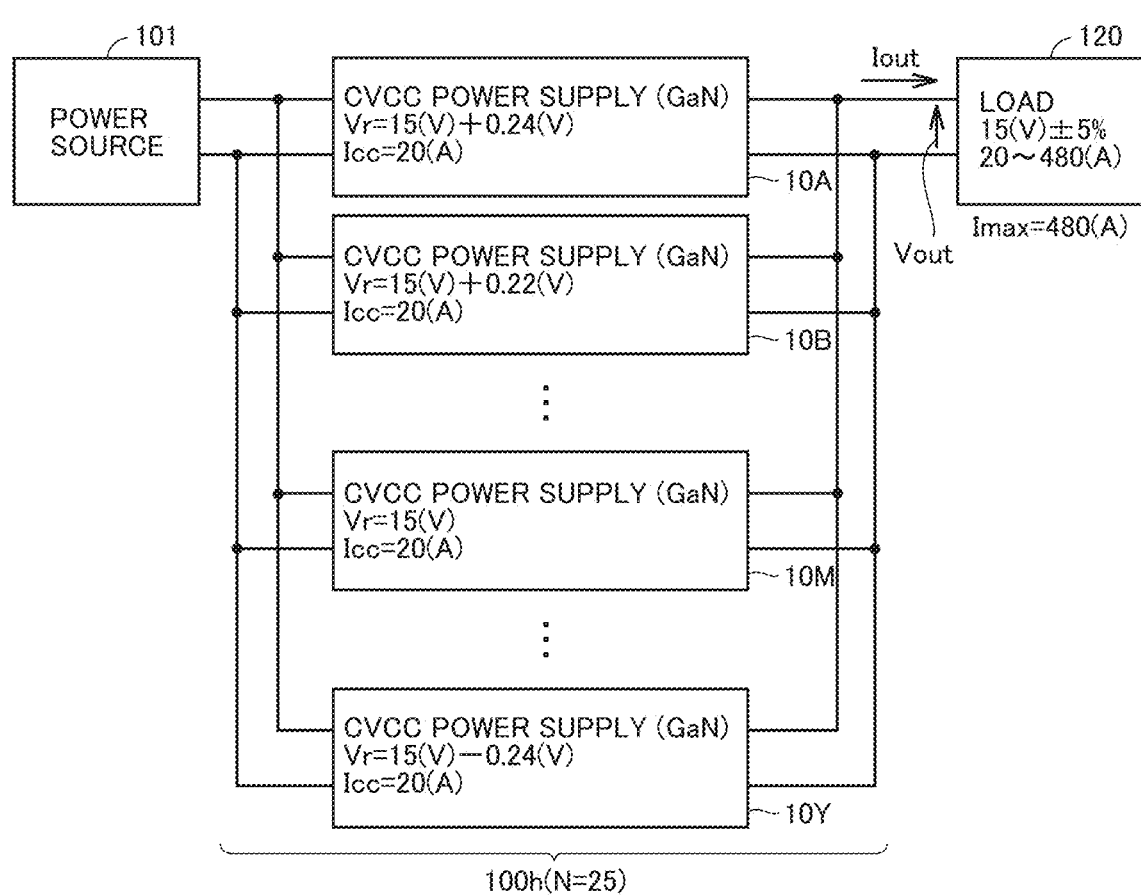
FIG. 26 is a block diagram illustrating a configuration of a DC power supply system according to an eighth embodiment.

FIG. 26 is a block diagram illustrating the configuration of the DC power supply system according to the eighth embodiment.

Referring to FIG. 26, a DC power supply system 100h according to the eighth embodiment is different from DC power supply system 100a according to the first embodiment in that there are a large number (N) of DC power supply apparatuses connected in parallel and the output current from a single power supply apparatus is lower than that in the first embodiment. It is assumed also in FIG. 26 that characteristics of load 120 are similar to those in the first embodiment; Imax is set to Imax=480 (A) and the allowable voltage range is set to 15 (V)+5% (that is, 14.25 to 15.75 (V)).

In the exemplary configuration in FIG. 26, twenty-five DC power supply apparatuses 10A to 10Y (N=25) are arranged for Imax=480 (A). DC power supply apparatuses 10A to 10Y are CVCC power supplies having the drooping characteristics (FIG. 3) similar to those of power supply apparatuses 10A to 10E in the first embodiment, and Icc thereof is set to Icc=20 (A). In other words, DC power supply apparatuses 10A to 10Y operate as the CVCC power supplies of Vr×20 (A).

Each of DC power supply apparatuses 10A to 10Y is implemented, for example, by application of the wide band gap semiconductor element as semiconductor switching element 112 in the configuration of the flyback or forward converter shown in FIG. 7 or 8. As described above, however, each of DC power supply apparatuses 10A to 10Y can be implemented by a configuration of a semiconductor switching element subjected to on/off control with the wide band gap semiconductor element in any insulating or non-insulating circuit configuration.

The reference voltages of twenty-five DC power supply apparatuses 10A to 10Y are also set to different values in constant increments within the allowable voltage range of load 120. In the example in FIG. 26, reference voltages Vr of twenty-five DC power supply apparatuses 10A to 10Y are set stepwise in 0.02 (V) increments within a range from 14.76 to 15.24 (V).

Specifically, in the first DC power supply apparatus 10A, reference voltage Vr is set to 15+0.24=15.24 (V) which is the maximum value. In the thirteenth DC power supply apparatus 10M, reference voltage Vr is set to Vr=15.00 (V) which is equivalent to the specification voltage of load 120. Furthermore, in the twenty-fifth DC power supply apparatus 10Y, reference voltage Vr is set to 15−0.24=14.76 (V) which is the minimum value.

The increments of 0.02 (V) are set to be larger than a rated ripple voltage of each of DC power supply apparatuses 10A to 10Y. In addition, the number N of DC power supply apparatuses should be determined such that a value calculated by dividing a width (15 (V)×5%×2=1.5 (V) here) of the allowable voltage range of load 120 by (N-1) is larger than the increments.

Figure 27:
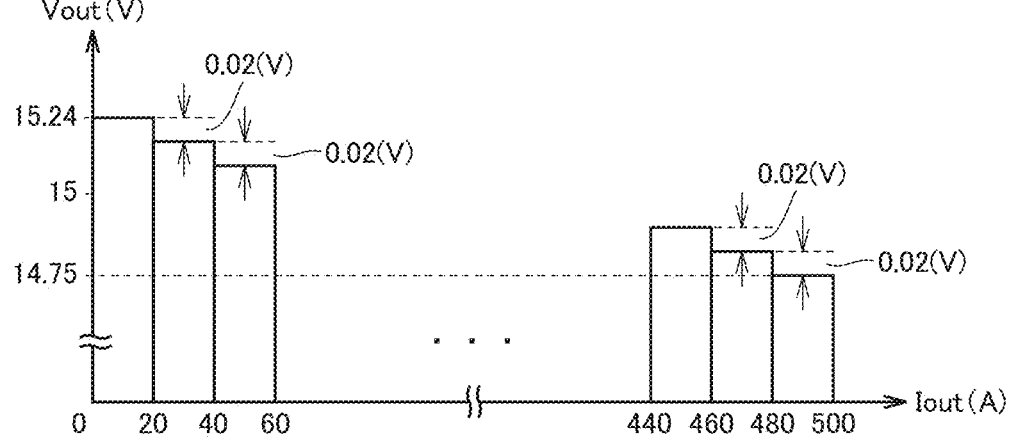
FIG. 27 is a conceptual diagram illustrating operations of the DC power supply system according to the eighth embodiment.

FIG. 27 shows a conceptual diagram illustrating operations of the DC power supply system according to the eighth embodiment.

Referring to FIG. 27, as in the first embodiment, in the current region of Iout=0 to 20 (A) where output current Iout can be secured only with DC power supply apparatus 10A, the output current only from DC power supply apparatus 10A is supplied to load 120. Therefore, output voltage Vout attains to Vr=15.24 (V) equivalently to the reference voltage of DC power supply apparatus 10A, and DC power supply apparatuses 10B to 10Y, reference voltages Vr of which are lower than 15.24 (V), are in the inactive state and do not output the currents.

When output current Iout becomes higher than 20 (A), DC power supply apparatus 10A outputs 20 (A) in the CC mode so that output voltage Vout becomes lower than 15.24 (V). In response, DC power supply apparatus 10B and other subsequent DC power supply apparatuses are successively in the active state in the descending order of magnitude of reference voltages Vr thereof and output the currents.

For example, in the current region of Iout=20 to 40 (A), DC power supply apparatus 10A operates in the CC mode to output 20 (A), and DC power supply apparatus 10B operates in the CV mode to supply the current from 0 to 20 (A) (0 to 100%). Therefore, output voltage Vout is controlled to 15.22 (V) corresponding to reference voltage Vr of DC power supply apparatus 10B.

In the current region of Iout=40 to 60 (A), DC power supply apparatuses 10A and 10B operate in the CC mode to each output 20 (A), and DC power supply apparatus 10C operates in the CV mode to supply the current from 0 to 20 (A) (0 to 100%). Therefore, output voltage Vout is controlled to 15.20 (V) corresponding to reference voltage Vr of DC power supply apparatus 10C.

Furthermore, in the current region of Iout=460 to 480 (A), twenty-three DC power supply apparatuses 10A to 10W operate in the CC mode to each output 20 (A), and twenty-fourth DC power supply apparatus 10X operates in the CV mode to supply the current from 0 to 20 (A) (0 to 100%). Therefore, output voltage Vout is controlled to 14.78 (V) corresponding to reference voltage Vr of twenty-fourth DC power supply apparatus 10X.

In the current region of Iout=480 to 500 (A) higher in current than maximum load current Imax, twenty-four DC power supply apparatuses 10A to 10X operate in the CC mode to each output 20 (A) and twenty-fifth DC power supply apparatus 10Y operates in the CV mode to supply the current from 0 to 20 (A) (0 to 100%). Therefore, output voltage Vout is controlled to 14.76 (V) corresponding to reference voltage Vr of twenty-fifth DC power supply apparatus 10Y.

Thus, in the DC power supply system according to the eighth embodiment, each DC power supply apparatus including the wide band gap semiconductor element of GaN, SiC, or the like can operate at the high frequency as an effect specific to the present embodiment, in addition to the effect described in the first embodiment. Ripple of the output voltage from each DC power supply apparatus can consequently be made smaller. Therefore, since the increments of reference voltage Vr between the DC power supply apparatuses can be smaller, the configuration in which a large number of low-capacity DC power supply apparatuses are connected in parallel can readily be implemented.

In a conventional high-current DC power supply apparatus, it has been difficult to avoid design including wiring where loss due to the skin effect and the proximity effect is likely or a high-current magnetic path great in iron loss. In contrast, in the DC power supply system according to the eighth embodiment, a large number of DC power supply apparatuses low in capacity and capable of high-frequency operations are connected in parallel. Therefore, in each DC power supply apparatus, reduction in size of a circuit owing to reduction in size of the magnetic component and reduction in thickness of wiring in view of relation with the skin effect and the proximity effect can be achieved. Furthermore, reduction in size of the circuit can lead to operation at a higher frequency, which can lead to further reduction in size of the magnetic component, so that a synergistic effect in circuit design can be obtained.

Since the wide band gap semiconductor element of GaN, SiC, or the like is employed in each DC power supply apparatus, owing to the effect of a higher turn-on and turn-off speed in switching and a low on resistance, power loss (switching loss and conduction loss) can be reduced. Consequently, the power supply can be higher in efficiency, which can lead to suppression of radiation noise.

Furthermore, as a large number of DC power supply apparatuses operate in parallel, drive frequencies of semiconductor switching elements in the DC power supply apparatuses are slightly different and timing of switching does not coincide either. Therefore, suppression of superimposition of noise generated by synchronized operations of a plurality of DC power supply apparatuses in parallel can also be expected.

It is understood that, in the configuration in FIG. 26, twenty-four DC power supply apparatuses 10A to 10X can secure output current Iout for maximum load current Imax=480 (A). In contrast, with arrangement of twenty-fifth DC power supply apparatus 10Y, with the use of DC power supply apparatus 10Y lowest in reference voltage Vr, redundant design as in the seventh embodiment (FIG. 24) where extra DC power supply apparatus 10F is arranged can be realized. In other words, the seventh embodiment can be combined with DC power supply system 100*h* according to the eighth embodiment. In particular, since the number of DC power supply apparatuses connected in parallel is large in the eighth embodiment, increase in cost for the redundant configuration is significantly suppressed. Thus, while increase in cost is suppressed, the redundant configuration for higher reliability can efficiently be realized.

In the eighth embodiment again, DC power supply apparatus 11 in the second embodiment can be employed as each DC power supply apparatus. The third embodiment (active time period monitoring unit 20) and/or the fourth embodiment (balancing of life based on upper limit current Icc) can be combined with the eighth embodiment. DC power supply system 100*h* can also be configured by attaching a large number of DC power supply apparatuses to power supply slot 105 described in the fifth and sixth embodiments.

Ninth Embodiment

In a ninth embodiment, a further modification of output characteristics (CVCC control) of the DC power supply apparatuses that operate in parallel will be described. In other words, the ninth embodiment shows a variation of DC power supply apparatus 10 according to the first embodiment.

FIG. 28 is a conceptual diagram illustrating first and second examples of output characteristics of each DC power supply apparatus in a DC power supply system according to the ninth embodiment.

With FIG. 28(*a*) being compared with FIG. 3, in the ninth embodiment, overcurrent protection to further restrict the current when the output voltage lowers from reference voltage Vr to a predetermined drooping voltage Vcc in the CC mode where upper limit current Icc is maintained is added to the drooping characteristics of each DC power supply apparatus. Output characteristics (drooping characteristics) in FIG. 28(*a*) are also referred to as "fold back protection." In an overcurrent protection region, in proportion to lowering in output voltage, a current reference in current feedback is lowered from Icc to Is (starting current).

FIG. 28(*b*) shows a modification of the fold back protection in FIG. 28(*a*). In the output characteristics in FIG. 28(*b*), in addition to overcurrent protection as in FIG. 28(*a*), load short-circuit protection to further restrict the output current at the time of further lowering in output voltage is added.

In FIG. 28(*b*), as in FIG. 28(*a*), overcurrent protection is started when the output voltage lowers from reference voltage Vr to drooping voltage Vcc in the CC mode. In the overcurrent protection region, in proportion to lowering in output voltage, a current target value in current feedback is lowered from Icc to a protection current Ip.

When the output voltage further lowers to a predetermined protection voltage Vp under overcurrent protection, load short-circuit protection is started. In a load short-circuit protection region, in proportion to lowering in output voltage, a current target value in current feedback is lowered from protection current Ip to a starting current Is.

By providing the fold back protection as in FIGS. 28(*a*) and (*b*), when the current that flows to load 120 abnormally increases in load short-circuit or the like, the output current can be restricted to protect the DC power supply apparatus. Starting current Is can be set to secure a current required in unloaded operation or at the time of start of load 120 or a current required for control or stand-by of load (DC electric equipment) 120.

Figure 29:
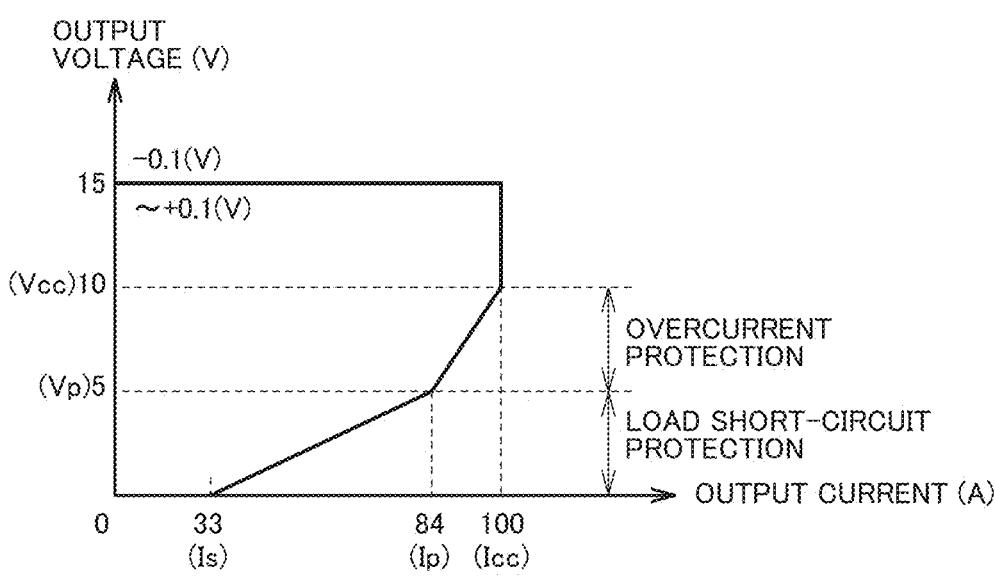
FIG. 29 is a conceptual diagram illustrating a specific example of the output characteristics of each DC power supply apparatus to which FIG. 28(*b*) is applied.

FIG. 29 is a conceptual diagram illustrating a specific example of output characteristics of DC power supply apparatus 10 to which the fold back protection in FIG. 28(*b*) is applied.

As shown in FIG. 29, in DC power supply apparatus 10, as in the first embodiment, reference voltage Vr in the CV mode can be set to 15 (V)+0.1 (V) and upper limit current Icc in the CC mode can be set to Icc=100 (A). Furthermore, Vcc=10 (V), Vp=5 (V), Ip=84 (A), and Is=33 (A) shown in FIG. 28(*b*) can be set.

Thus, with Vcc in the CC mode being set to Vcc=10 (V), when the output voltage becomes lower than 10 (V), the current target value in current feedback control is lowered from 100 (A) to 84 (A) for overcurrent protection.

When the output voltage lowers to 5 (V) under overcurrent protection, load short-circuit protection is started, and in proportion to lowering in output voltage, the current target value in current feedback control is lowered from 84 (A) to 33 (A).

Figure 30:
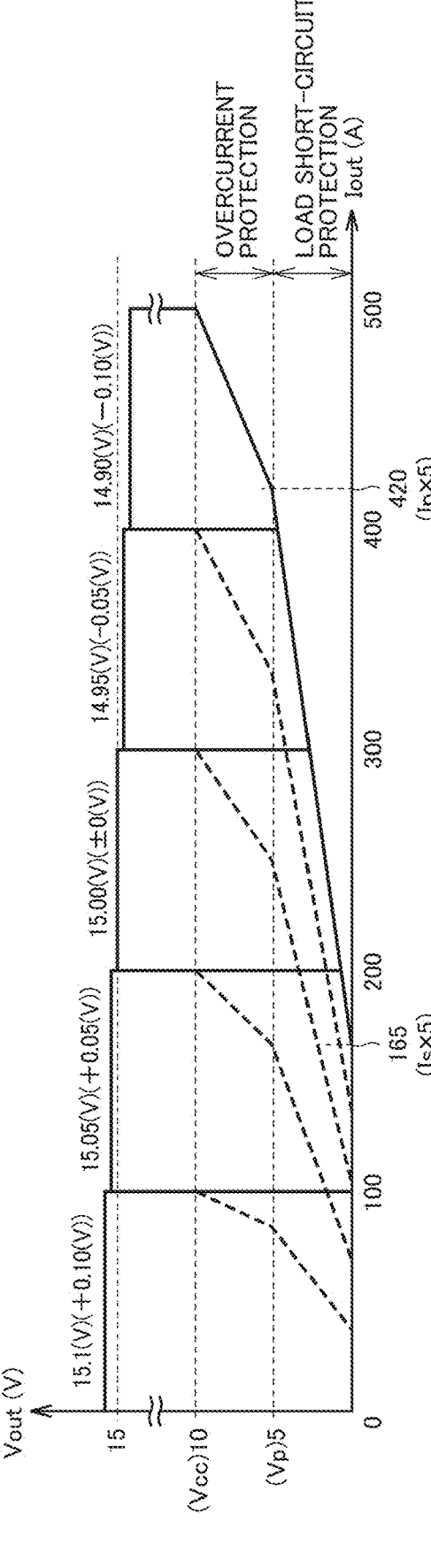
FIG. 30 is a conceptual diagram illustrating operations of the DC power supply system according to the ninth embodiment.

FIG. 30 is a conceptual diagram illustrating operations of the DC power supply system according to the ninth embodiment.

FIG. 30 shows operations when output characteristics of DC power supply apparatuses 10A to 10E are changed from FIG. 3 to FIG. 29 in the DC power supply system shown in FIG. 4.

When output current Iout from the DC power supply system is from 0 to 500 (A) in response to the current request from load 120, DC power supply apparatuses 10A to 10E operate as in FIG. 5 in the first embodiment so as to secure output current Iout.

Specifically, in the current region where Iout is set to Iout=0 to 100 (A), only DC power supply apparatus 10A (Vr=15.10 (V)) set to be highest in reference voltage Vr supplies output current Iout, and hence output voltage Vout is 15.1 (V). In contrast, with increase in output current Iout, DC power supply apparatuses 10B to 10E are also successively activated in the descending order of magnitude of reference voltages Vr thereof, so that output current Iout is secured while output voltage Vout lowers stepwise.

Until Iout exceeds a maximum current of 480 (A) to load 120 and attains to Iout=500 (A), all of DC power supply apparatuses 10A to 10E operate in the CC mode, so that the current can be supplied to load 120. When the current request from load 120 increases from this value, output voltage Vout lowers under the condition of Iout=500 (A) in accordance with the drooping characteristics (CC mode) of DC power supply apparatuses 10A to 10E.

DC power supply apparatuses 10A to 10E keep operating at the output voltages lowered in accordance with the drooping characteristics, in a range where the current requested from load 120 is not higher than 500 (A) corresponding to the sum of upper limit currents Icc of DC power supply apparatuses 10A to 10E. When the output voltage that lowers in accordance with the drooping characteristics becomes lower than drooping voltage Vcc (=10V), on the other hand, in order to address an overcurrent due to overload, the output current from each of DC power supply apparatuses 10A to 10E is reduced with lowering in output voltage (the overcurrent protection region in FIG. 29).

When output voltage Vout further lowers and becomes lower than protection voltage Vp (=5 (V)) in response to the current request from load 120, the output current from each of DC power supply apparatuses 10A to 10E is further reduced with lowering in output voltage, in accordance with the load short-circuit protection in FIG. 29. Finally, output current Iout is reduced to the sum (in the example in FIG. 29, 33×5=165 (A)) of starting currents Is of DC power supply apparatuses 10A to 10E. The current can thus be restricted after output current Iout reaches 500 (A) at the time of generation of an abnormal current in load short-circuit or the like.

According to the DC power supply system according to the ninth embodiment, in addition to the effect described in the first embodiment, output current Iout can be reduced on the occurrence of abnormality due to load short-circuit or the like, in accordance with the drooping characteristics (the fold back protection) of each DC power supply apparatus. Consequently, secondary break can be suppressed by suppression of the current that continues to flow to load 120. In addition, in protective control by operations of a not-shown DC current breaker or the like, arc discharge generated in the breaker can be suppressed.

Modification of Ninth Embodiment

The fold back protection described in the ninth embodiment can also be combined with the second embodiment. In other words, a modification of the ninth embodiment shows a variation of DC power supply apparatus 11 according to the second embodiment.

Figure 31:
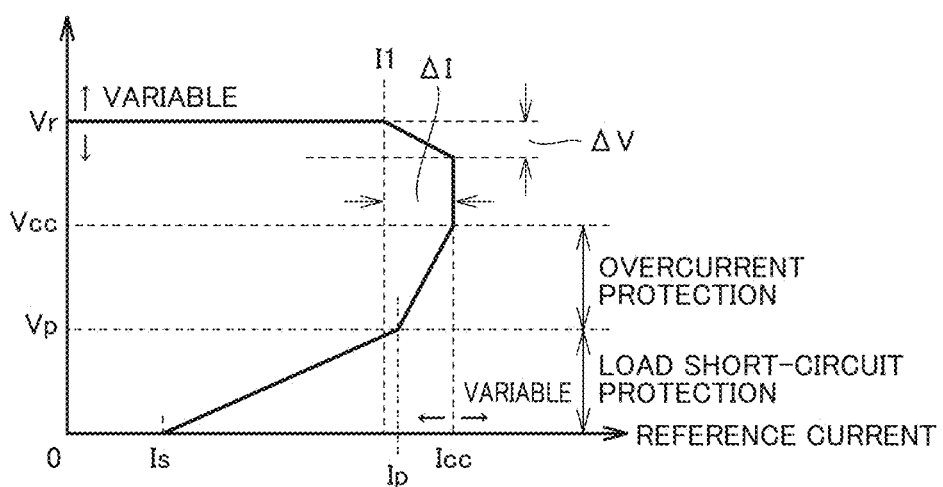
FIG. 31 is a conceptual diagram illustrating output characteristics of DC power supply apparatuses in a DC power supply system according to a modification of the ninth embodiment.

FIG. 31 is a conceptual diagram illustrating output characteristics of each DC power supply apparatus in a DC power supply system according to the modification of the ninth embodiment.

With FIG. 31 being compared with FIG. 9, in the modification of the ninth embodiment, the output characteristics of DC power supply apparatus 11 according to the second embodiment are combined with overcurrent protection and load short-circuit protection as in FIG. 28(*b*).

Therefore, also in the modification of the ninth embodiment, as in FIG. 9, the drooping characteristics of each DC power supply apparatus 11 are provided with the region exhibiting the derating characteristics where the output voltage is lowered with increase in output current in transition from the CV mode to the CC mode.

Furthermore, the output characteristics are designed such that overcurrent protection and load short-circuit protection as in FIG. 28(*b*) are performed when the output voltage lowers from reference voltage Vr to predetermined drooping voltage Vcc in the CC mode where upper limit current Icc is maintained.

In other words, the output characteristics (drooping characteristics) of each DC power supply apparatus in the DC power supply system according to the modification of the ninth embodiment are the modified "fold back protection," with the derating characteristics in FIG. 9 and the fold back protection in FIG. 28(*b*) being combined with the drooping characteristics in FIG. 3.

Consequently, in transition from the CV mode to the CC mode, voltage feedback control is carried out such that the output voltage becomes lower than reference voltage Vr at the constant rate −(ΔV/ΔI) in a region where the output current is higher than criterion current I1 (I1=Icc−ΔI).

Furthermore, when the output voltage becomes lower than drooping voltage Vcc while the output current is maintained at upper limit current Icc after transition to the CC mode, such overcurrent protection that the output current is reduced from upper limit current Icc to protection current Ip in proportion to lowering in output voltage is performed. Furthermore, when the output voltage becomes lower than protection voltage Vp under overcurrent protection, load short-circuit protection to reduce the output current from protection current Ip to starting current Is in proportion to lowering in output voltage is performed.

In FIG. 31, the fold back protection in FIG. 28(*a*) can be applied to exhibit the drooping characteristics under which load short-circuit protection is not carried out.

Figure 32:
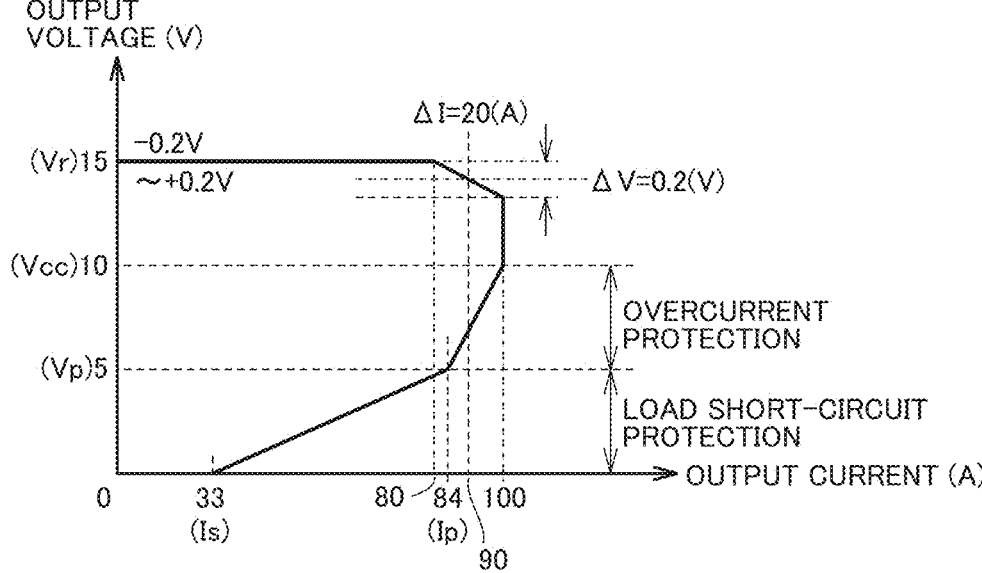

FIG. 32 is a conceptual diagram illustrating a specific example of output characteristics of DC power supply apparatus 11 to which the modified "fold back protection" in FIG. 31 is applied.

As shown in FIG. 32, in DC power supply apparatus 10, as in the second embodiment, reference voltage Vr in the CV mode is set to 15 (V)+0.2 (V) and upper limit current Icc=100 (A) in the CC mode is set. As in FIG. 9, ΔV=0.2 (V) and ΔI=20 (A) that define the derating characteristics are set.

Furthermore, as in FIG. 29, drooping voltage Vcc=10 (V), protection voltage Vp=5 (V), Ip=84 (A), and Is=33 (A) that define overcurrent protection and load short-circuit protection can be set. In other words, also in the modification of the ninth embodiment, operations of each DC power supply apparatus under overcurrent protection and load short-circuit protection are the same as in the ninth embodiment.

Figure 33:
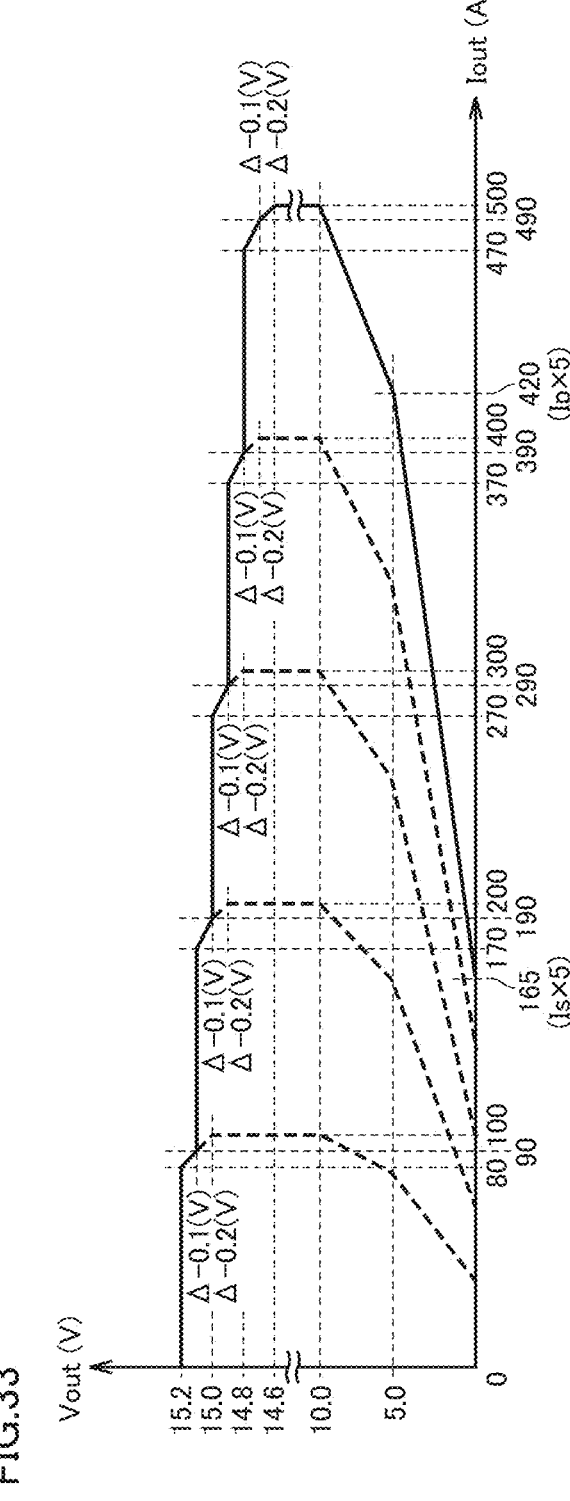
FIG. 33 is a conceptual diagram illustrating operations of a DC power supply system according to the modification of the ninth embodiment.

FIG. 33 is a conceptual diagram illustrating operations of the DC power supply system according to the modification of the ninth embodiment.

FIG. 33 shows operations when the output characteristics of each of DC power supply apparatuses 11A to 11E are changed from FIG. 9 to FIG. 32 in the DC power supply system shown in FIG. 10.

When output current Iout from the DC power supply system is from 0 to 500 (A) in response to the current request from load 120, DC power supply apparatuses 10A to 10E operate as in FIG. 12 in the second embodiment so as to secure output current Iout.

Specifically, when DC power supply apparatuses 10B to 10E are also successively activated in the descending order of magnitude of reference voltages Vr thereof with increase in output current Iout from the current region (Iout=0 to 80 (A)) where only DC power supply apparatus 10A (Vr=15.10 (V)) highest in reference voltage Vr supplies output current Iout, change in output voltage Vout and output current Iout is gently controlled in accordance with the derating characteristics.

Until Iout attains to Iout=500 (A), all of DC power supply apparatuses 10A to 10E operate in the CC mode, so that the current can be supplied to load 120. When the current request from load 120 increases from this value, output voltage Vout lowers under the condition of Iout=500 (A) in accordance with the drooping characteristics (CC mode) of DC power supply apparatuses 10A to 10E.

DC power supply apparatuses 10A to 10E keep operating at the drooping output voltage within a range where the current requested from load 120 is not higher than 500 (A) corresponding to the sum of upper limit currents Icc of DC power supply apparatuses 10A to 10E. When the output voltage that lowers in accordance with the drooping characteristics becomes lower than drooping voltage Vcc (=10V), on the other hand, output current Iout is reduced to 420 (A) corresponding to Ip×5, with lowering in output voltage, owing to overcurrent protection as in FIG. 29.

Furthermore, when output voltage Vout lowers and becomes lower than protection voltage Vp (=5 (V)) in response to the current request from load 120 in overcurrent protection operations, load short-circuit protection as in FIG. 30 is performed, and output current Iout is reduced to 165 (A) corresponding to Is×5 with lowering in output voltage. Thus, also in the modification of the ninth embodiment, at the time of generation of an abnormal current in load short-circuit or the like, the current can be restricted after output current Iout reaches 500 (A).

Thus, according to the DC power supply system according to the modification of the ninth embodiment, in addition to the effect described in the second embodiment, output current Iout can be reduced on the occurrence of abnormality due to load short-circuit or the like, in accordance with the drooping characteristics (the modified "fold back protection") of each DC power supply apparatus. Consequently, by suppressing the current that continues to flow to load 120, secondary break can be suppressed and arc discharge at the time of operation of the DC current breaker can be suppressed as in the ninth embodiment.

Tenth Embodiment

In a tenth embodiment, a configuration in which reference voltage Vr of each of a plurality of DC power supply apparatuses connected in parallel can be changed with simplified input operation in the DC power supply apparatuses according to the first to ninth embodiments will be described.

Figure 34:
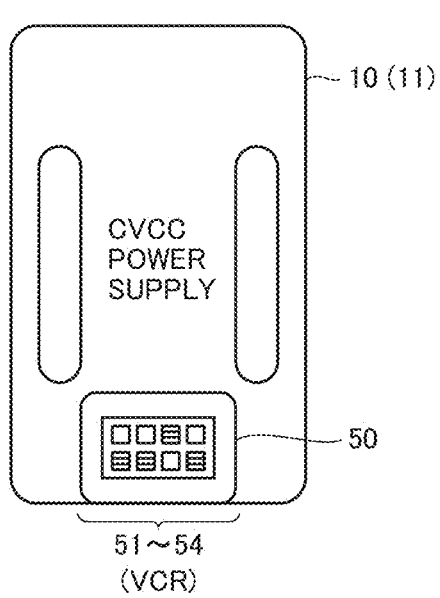
FIG. 34 is an external view of each DC power supply apparatus included in a DC power supply system according to a tenth embodiment.

FIG. 34 is an external view of each DC power supply apparatus included in a DC power supply system according to the tenth embodiment.

Referring to FIG. 34, in the DC power supply system according to the tenth embodiment, a panel 50 for adjustment input of reference voltage Vr is provided on a surface of each DC power supply apparatus 10(11). For example, panel 50 is provided with a plurality of switches 51 to 54. Each of switches 51 to 54 is implemented, for example, by a dip switch with which one of two values can be designated and input of positive/negative and setting of eight levels by using three bits can be made. A voltage setting instruction VCR for reference voltage Vr can thus variably be set in fifteen levels from "−7" to "+7". Panel 50 corresponds to one example of the "input apparatus."

In order to designate voltage setting instruction VCR, panel 50 can be implemented by a mechanism with which a numerical value can directly be set, such as a rotary switch or a toggle switch, other than the dip switch. Alternatively, an "input apparatus" to input voltage setting instruction VCR for reference voltage Vr in place of panel 50 can also be configured to allow external setting of voltage setting instruction VCR through communication through a wire or wirelessly or with the use of infrared rays or the like.

Figure 35:
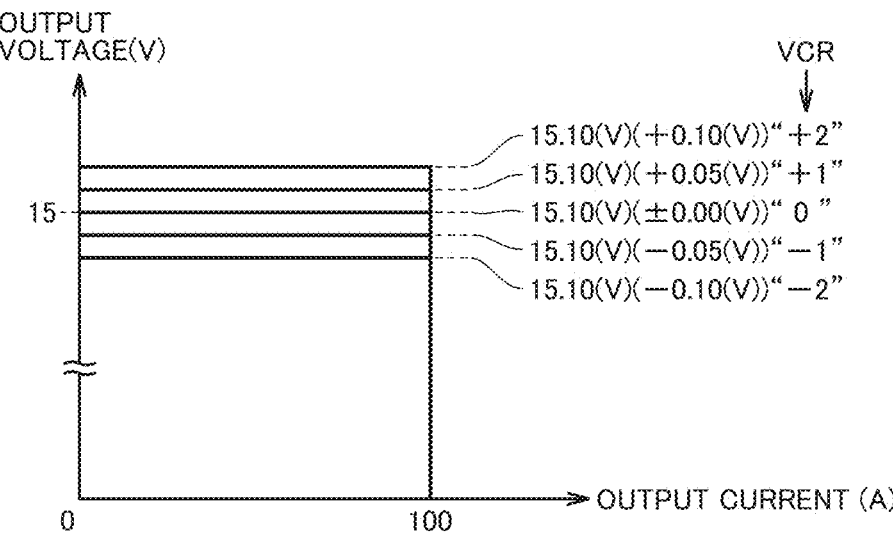
FIG. 35 is a conceptual diagram illustrating change in output characteristics of each DC power supply apparatus in response to a voltage setting instruction in FIG. 34.

FIG. 35 shows a conceptual diagram illustrating change in output characteristics of each DC power supply apparatus in response to the voltage setting instruction in FIG. 34.

Referring to FIG. 35, reference voltage Vr in the output characteristics shown in FIG. 3 can be changed stepwise, in response to voltage setting instruction VCR.

For example, in response to input to panel 50, when VCR is set to VCR="0", Vr is set to Vr=15.00 (V) in the CV mode. In contrast, with increase in VCR by one in a positive direction, reference voltage Vr is increased, for example, in 0.05 (V) increments. In contrast, with increase in VCR by one in a negative direction, reference voltage Vr is lowered, for example, in 0.05 (V) decrements.

Therefore, when VCR can be set stepwise from "−7" to "+7", reference voltage Vr is set in 0.05 (V) increments within a range from 14.65 to 15.35 (V), with 15.00 (V) being defined as the center.

For example, voltage setting instruction VCR is inputted to control IC 117 (FIGS. 7 and 8) implemented by a digital IC, and control IC 117 can control the on duty ratio of semiconductor switching element 112 in the CV mode in accordance with reference voltage Vr determined by voltage setting instruction VCR. Change in output characteristics on which voltage setting instruction VCR in each DC power supply apparatus is reflected as shown in FIG. 35 is thus realized.

Figure 36:
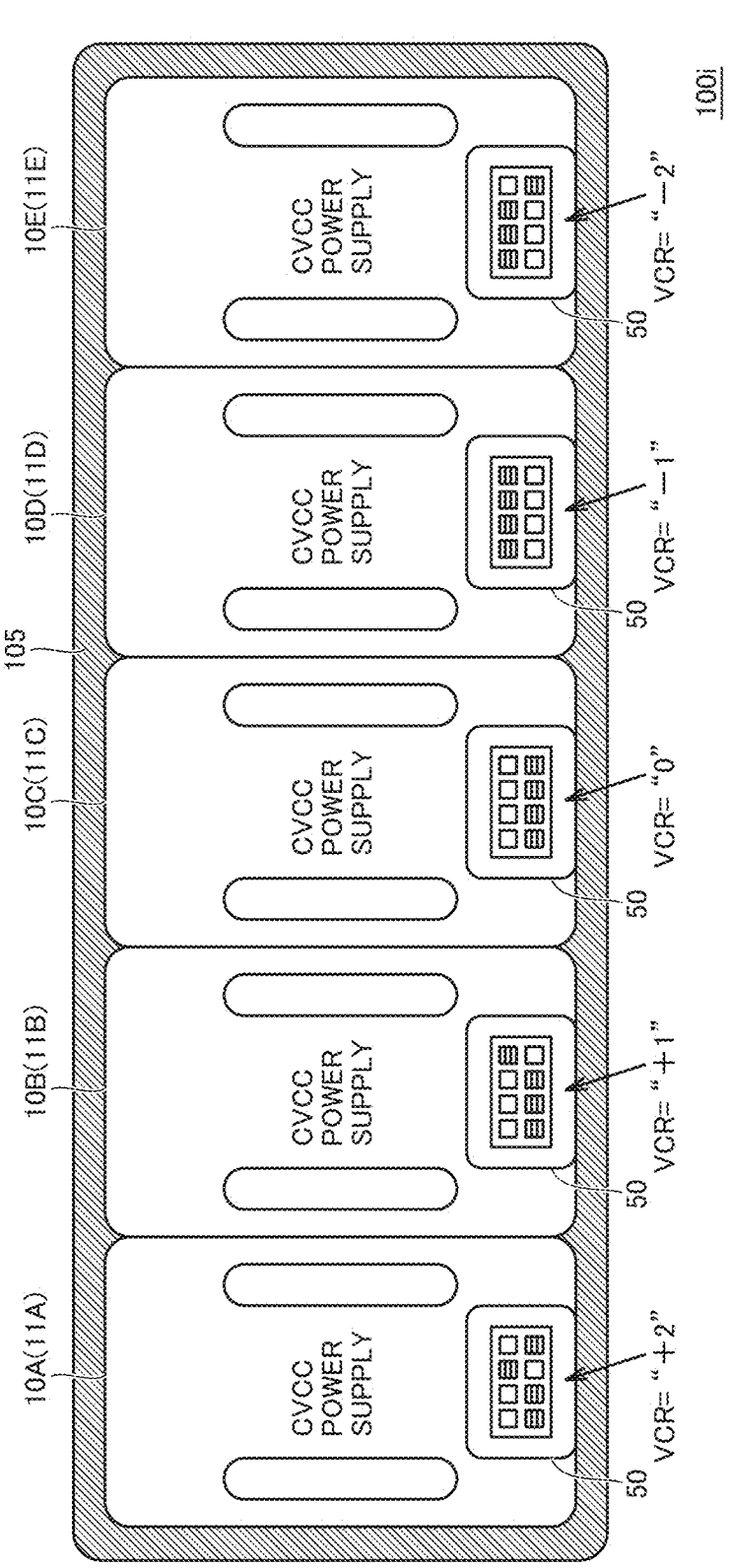
FIG. 36 is an external view of the DC power supply system according to the tenth embodiment.

FIG. 36 shows an external view of the DC power supply system according to the tenth embodiment.

In the example in FIG. 36, a DC power supply system 100i according to the tenth embodiment includes five DC power supply apparatuses 10A to 10E as in the first embodiment. DC power supply apparatuses 10A to 10E have the output sides (the sides of load 120) connected in parallel, for example, by being attached to power supply slot 105 described in the fifth and sixth embodiments.

Each of DC power supply apparatuses 10A to 10E is provided with panel 50 shown in FIG. 34. Reference voltages Vr of DC power supply apparatuses 10A to 10E are variably set in accordance with voltage setting instructions VCR in accordance with input to panel 50.

In the example in FIG. 36, voltage setting instruction VCR is set to "+2" in DC power supply apparatus 10A, and voltage setting instruction VCR is set to "+1" in DC power supply apparatus 10B. Voltage setting instruction VCR is set to "0" in DC power supply apparatus 10C. Voltage setting instructions VCR are set to "−1" and "−2" in respective DC power supply apparatuses 10D and 10E.

Reference voltages Vr of DC power supply apparatuses 10A to 10E are thus set as in the first embodiment (FIG. 4). DC power supply apparatuses 10A to 10E are assumed to have the drooping characteristics under the condition of Icc=100 (A) as in the first embodiment.

FIG. 37 is a diagram illustrating exemplary operations of the DC power supply system according to the tenth embodiment.

FIG. 37(a) shows a diagram showing a list of active time period planned values of DC power supply apparatuses 10A to 10E at a time point of lapse of 65760 (h) which is half expected life (Tlm=131520 (h)) since start of operation of DC power supply system 100i.

The power application profile of load 120 in the tenth embodiment is also the same as in the first embodiment. As described above, reference voltages Vr of DC power supply apparatuses 10A to 10E in accordance with voltage setting instruction VCR in FIG. 36 are also the same as in the first embodiment. Therefore, a value of the active time period in each field in FIG. 37(a) at the time point of lapse of 65760 (h) corresponds to half the value in each field in FIG. 6.

As shown in the lowermost field in FIG. 37(a), the cumulative active time periods of DC power supply apparatuses 10A to 10E are longer in the descending order of magnitude of reference voltages Vr thereof.

In the tenth embodiment, at this time point, input to panel 50 changes reference voltages Vr of DC power supply apparatuses 10A to 10E.

In the example in FIG. 37(b), in contrast to the initial setting in FIG. 36, DC power supply apparatuses 10E to 10A are set to be higher in reference voltage Vr in this order.

Specifically, in DC power supply apparatuses 10A and 10B, voltage setting instructions VCR are set to "−2" and "−1", respectively. Furthermore, in DC power supply apparatuses 10D and 10E, voltage setting instructions VCR are set to "+1" and "+2", respectively. In DC power supply apparatus 10C, voltage setting instruction VCR remains at "0".

FIG. 37(b) shows a list of active time period planned values of DC power supply apparatuses 10A to 10E at the time point of further 65760 (h) of DC power supply system 100i and expiration of the expected life (Tlm=131520 (h)) since start of operation.

Among periods shown in FIG. 37(b), in contrast to FIG. 37(a), DC power supply apparatus 10A is shortest in active time period and DC power supply apparatus 10E is longest in active time period. Therefore, as compared with the example in FIG. 6, the cumulative value of the active time period at the time point of lapse of 131520 (h) is balanced among DC power supply apparatuses 10A to 10E. Specifically, in the example in FIG. 6, the difference between the maximum value (DC power supply apparatus 10A) and the minimum value (DC power supply apparatus 10E) of the cumulative active time period is approximately 130000 (h), whereas in FIG. 37(b), the difference between the maximum value (DC power supply apparatus 10C) and the minimum value (DC power supply apparatuses 10A and 10E) of the cumulative active time period is reduced to 23500 (h).

As described above, according to the DC power supply system according to the tenth embodiment, reference voltages Vr of the DC power supply apparatuses that operate in parallel can readily be set by providing input to panel 50. Workability in maintenance can thus be improved; an unexpected maintenance request can also flexibly be met.

Furthermore, reference voltage Vr can flexibly be changed with the use of panel 50. Therefore, by changing reference voltage Vr of the DC power supply apparatus in maintenance during the designed life as in the example in FIG. 37(b), the active time period can be balanced among the DC power supply apparatuses. Flexible system operation such as extension of time before appearance of the DC power supply apparatus reaching its life can thus be performed.

In DC power supply system 100i according to the tenth embodiment as well, instead of the plurality of DC power supply apparatuses 10 described above, DC power supply apparatus 11 according to the second embodiment or the DC power supply apparatus having the output characteristics according to the ninth embodiment or the modification thereof can also be employed.

The third embodiment (active time period monitoring unit 20) and/or the fourth embodiment (balancing of life based on upper limit current Icc) can be combined with the tenth embodiment. In particular, by combination with the third embodiment, timing to change reference voltage Vr can be appropriate based on an estimated value of the cumulative active time period of the DC power supply apparatus.

As described above, the DC power supply system according to the tenth embodiment can be configured by combining the tenth embodiment with the fifth and sixth embodiments and attaching each DC power supply apparatus to power supply slot 105 described in the fifth and sixth embodiments. Alternatively, in combination with the eighth embodiment, DC power supply apparatus 10 or 11 can be implemented by the wide bandgap semiconductor element and then a large number of DC power supply apparatuses 10 or 11 can be connected in parallel.

Eleventh Embodiment

As exemplified in FIG. 36 (the tenth embodiment), a DC power supply system according to the present embodiment is generally implemented in such a manner that a plurality of DC power supply apparatuses 10 or 11 are sequentially aligned and arranged. In an eleventh embodiment, arrangement to suppress increase in temperature of such a plurality of juxtaposed DC power supply apparatuses will be described.

Figure 38:
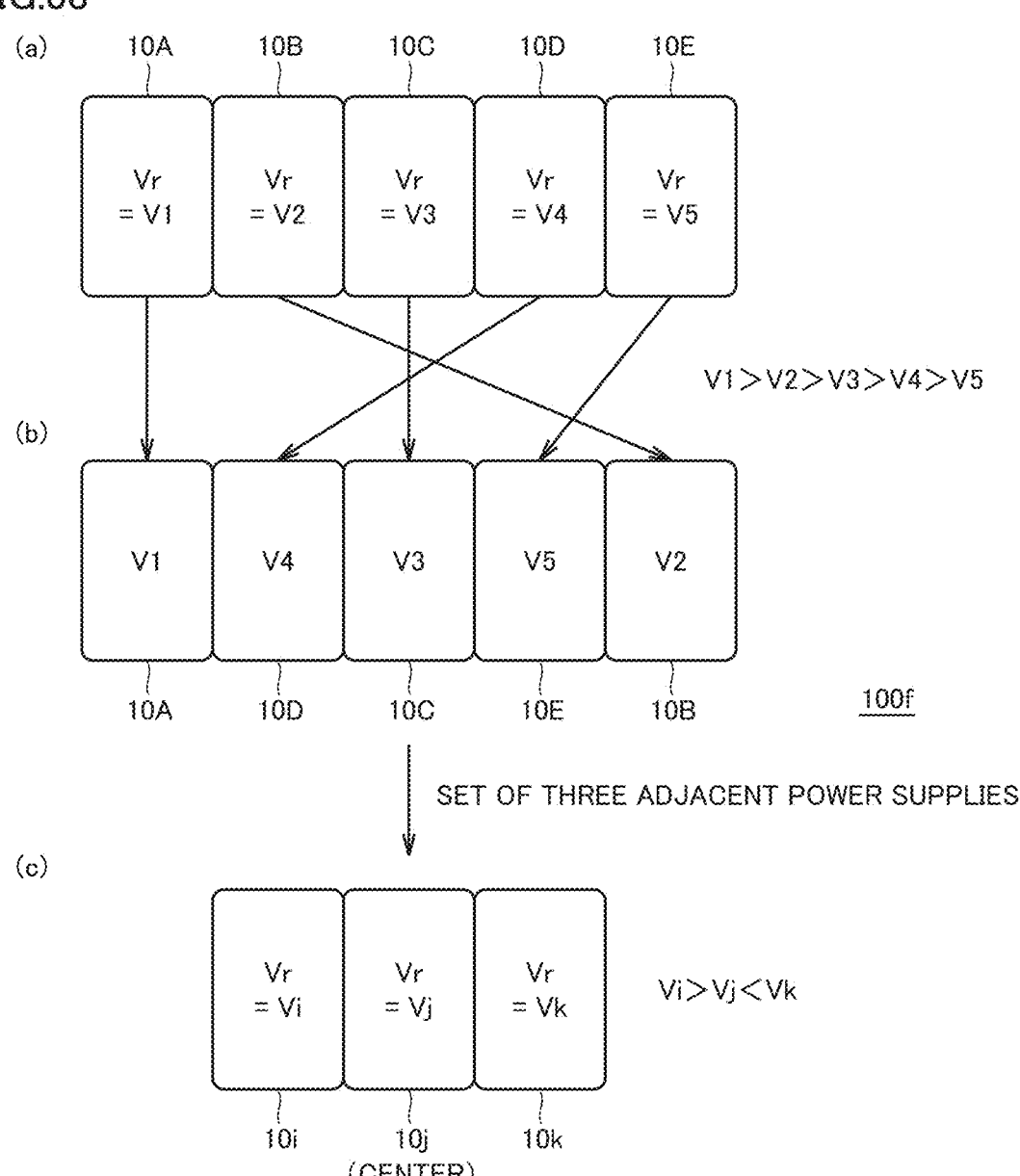
FIG. 38 is a block diagram illustrating a configuration of a DC power supply system according to an eleventh embodiment.

FIG. 38 is a block diagram illustrating a configuration of the DC power supply system according to the eleventh embodiment.

FIG. 38(a) shows an order of arrangement of DC power supply apparatuses 10A to 10E in DC power supply system 100i (FIG. 36) according to the tenth embodiment, as a comparative example.

In the comparative example in FIG. 38(a), DC power supply apparatuses 10A to 10E different in reference voltage Vr in CV control are disposed in the order in accordance with magnitude of reference voltages Vr thereof. As described so far, DC power supply apparatus 10 (or 11) higher in reference voltage Vr is longer in active time period, and hence the amount of increase in temperature of a constituent component is large. Therefore, DC power supply apparatuses 10A to 10E are expected to be higher in temperature also in the descending order of magnitude of reference voltages Vr thereof.

FIG. 38(b) shows the order of arrangement of DC power supply apparatuses 10A to 10E in DC power supply system 100f according to the eleventh embodiment.

As shown in FIG. 38(b), in DC power supply system 100f, the order of arrangement of DC power supply apparatuses 10A to 10E is changed from that in FIG. 38(a) such that the DC power supply apparatuses high in reference voltage Vr, that is, long in active time period and high in temperature, are not adjacent to each other.

The order of arrangement in FIG. 38(b) is by way of example. By arranging DC power supply apparatus 10D (Vr=V4) between DC power supply apparatus 10A (Vr=V1) and DC power supply apparatus 10C (Vr=V3) and arranging DC power supply apparatus 10E (Vr=V5) between DC power supply apparatus 10B (Vr=V2) and DC power supply apparatus 10C, such arrangement that the DC power supply apparatuses high in reference voltage Vr are not adjacent to each other can be achieved.

DC power supply system 100f is configured with at least three DC power supply apparatuses 10(11) being juxtaposed in such an order of arrangement that at least one set of three adjacent DC power supply apparatuses shown in FIG. 38(c) is present.

In FIG. 38(c), in the set of three adjacent DC power supply apparatuses 10i, 10j, and 10k, a reference voltage Vj of DC power supply apparatus 10j located in the center is lower than both of reference voltages Vi and Vk of DC power supply apparatuses 10i and 10k adjacent to DC power supply apparatus 10j (Vi>Vj<Vk). By determining the order of arrangement of at least three DC power supply apparatuses 10 (11) such that at least one set of such three adjacent DC power supply apparatuses is present, such an order of arrangement that the DC power supply apparatuses high in reference voltage Vr are not adjacent to each other can be achieved.

Thus, according to the DC power supply system according to the eleventh embodiment, intensive arrangement of DC power supply apparatuses relatively large in amount of heat generation is avoided to distribute positions of heat generation, and an effect of distribution and dissipation of heat by thermal conduction through a housing of each DC power supply apparatus can be improved.

Consequently, the temperature of each DC power supply apparatus can be lowered so that life of individual DC power supply apparatuses can be designed to be longer. For example, an electrolyte and an enamel coating included in an electrolytic capacitor, a transformer, an inductor, and the like which are generally limited-life components in many power supply apparatuses can be estimated to be twice longer in life when the temperature is lower by 10° C. Therefore, in the DC power supply system according to the eleventh embodiment, through suppression of increase in temperature of a specific DC power supply apparatus long in active time period, increase in temperature of each DC power supply apparatus 10 or 11 can be suppressed to extend life of a product.

Figure 39:
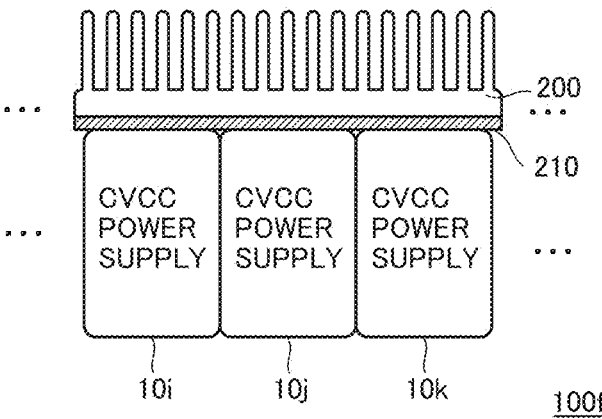
FIG. 39 is a conceptual diagram illustrating a first example of a cooling structure to cool the DC power supply apparatus in the DC power supply system according to the eleventh embodiment.
Figure 40:
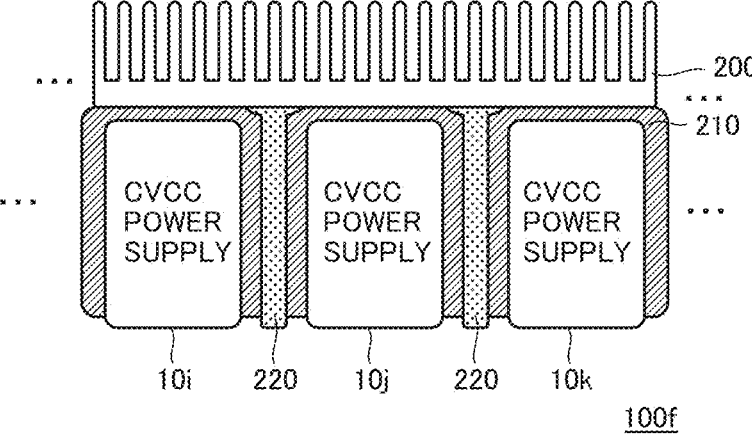
FIG. 40 is a conceptual diagram illustrating a second example of the cooling structure to cool the DC power supply apparatus in the DC power supply system according to the eleventh embodiment.

FIGS. 39 and 40 further show an exemplary cooling structure to suppress increase in temperature of the DC power supply apparatuses.

In a first example shown in FIG. 39, a thermal connection member such as a heat sink 200 provided with a heat dissipation fin and a thermal interface material (TIM) 210 is arranged for each of the plurality of DC power supply apparatuses including DC power supply apparatuses 10*i* to 10*k*. In the example in FIG. 39, housings of DC power supply apparatuses including DC power supply apparatuses 10*i* to 10*k* come in thermal contact with common heat sink 200 with TIM 210 being interposed, which dissipates heat from heat sink 200 and in addition helps making temperatures uniform among the DC power supply apparatuses with heat sink 200 being interposed.

In a product to which a housing cooling structure as in FIG. 39 is applied, housings of the DC power supply apparatuses are brought in contact with each other so as to also dissipate heat generated in a DC power supply apparatus long in active time period through the housing of a DC power supply apparatus short in active time period. Therefore, by setting the order of arrangement described with reference to FIGS. 38(*b*) and (*c*), an effect of longer life of the DC power supply system through uniform increase in temperature of the DC power supply apparatuses can be enhanced.

In a second example shown in FIG. 40, in addition to the cooling structure in FIG. 39, a cooling member 220 is further arranged between housings of adjacent DC power supply apparatuses. Cooling member 220 can be formed from a highly thermally conductive partition plate or heat pipe provided to extend from heat sink 200. An effect of heat dissipation from side surfaces of each DC power supply apparatus (surfaces opposed to other DC power supply apparatuses) can thus be enhanced.

The arrangement (order of arrangement) of the plurality of DC power supply apparatuses described in connection with the DC power supply system according to the eleventh embodiment can be combined with any one of the first to tenth embodiments described above. In particular, the effect of the DC power supply system according to the eleventh embodiment is higher as a larger number of DC power supply apparatuses are connected in parallel. Therefore, longer life by avoidance of increase in temperature in a specific DC power supply apparatus, for example, in combination with the eighth embodiment can be achieved.

Similarly, the cooling structure in FIGS. 39 and 40 is applicable not only to the DC power supply system according to the eleventh embodiment but also to the DC power supply apparatuses in each of the DC power supply systems according to the first to tenth embodiments. In particular, the cooling structure can efficiently be realized by making power supply slot 105 from a metallic housing and providing heat sink 200 in FIGS. 39 and 40 in the fifth and sixth embodiments.

In connection with the plurality of embodiments described above, for confirmation purpose, combination as appropriate of features described in the plurality of embodiments including combination not mentioned in the specification is also originally intended within the scope where there is no inconsistency or contradiction.

Though the example in which the plurality of DC power supply apparatuses 10 and 11 connected in parallel are identical in upper limit current Icc in the CC mode is described in the present embodiment, upper limit current Icc may be set to different values among at least some DC power supply apparatuses so long as the upper limit current is equal to or lower than the rated current. Since such a similar manner of operations that DC power supply apparatuses are successively activated in the descending order of magnitude of reference voltages Vr thereof is implemented also in this case, an equivalent effect can be enjoyed.

It should be understood that the embodiments disclosed herein are illustrative and non-restrictive in every respect. The scope of the present disclosure is defined by the terms of the claims rather than the description above and is intended to include any modifications within the scope and meaning equivalent to the terms of the claims.

REFERENCE SIGNS LIST 10, 10A to 10Y, 10*i*, 10*j*, 10*k*, 11, 11A to 11E DC power supply apparatus; 14 module portion; 14*x* grip portion; 15N, 15P output connection terminal; 16N, 16P input connection terminal; 20 active time period monitoring unit; 50 panel; 51 to 54 switch; 100, 100*a* to 100*i* DC power supply system; 101 power source; 105 power supply slot; 106A to 106E, 106X slot; 107 guide rail; 108N, 108P, 109N, 109P connector; 110 transformer; 112 semiconductor switching element; 113 diode; 114 capacitor; 115 feedback (FB) circuit; 116 current detection resistor; 117 control IC; 118 flywheel diode; 119 reactor; 120 load; 200 heat sink; 210 thermal interface material (TIM); 220 cooling member; I1 criterion current; IR1 to IR11, IRa to IRe current region; Icc upper limit current; Imax maximum load current; Iout output current (DC power supply system); Is starting current; NA to NE counter value; NL, PL power line; Nin, Nip input node; Nth alarm criterion value; Tlim limit active time period; VCR voltage setting instruction; Vcc drooping voltage; Vout output voltage (DC power supply system); Vp protection voltage; Vr reference voltage; Vrt specification voltage; kc life coefficient.

The invention claimed is:

1. A DC power supply system to supply a DC voltage and a DC current to a DC load, the DC power supply system comprising:

a plurality of DC power supply apparatuses having output sides connected in parallel, the output sides being electrically connected to the DC load, wherein each of the plurality of DC power supply apparatuses is configured to be in an inactive state in which each of the plurality of DC power supply apparatuses does not output a current when the DC voltage supplied to the DC load is higher than a reference voltage set for each of the plurality of DC power supply apparatus, and on the other hand to be in an active state in accordance with a predetermined output characteristic when the DC voltage is equal to or lower than the reference voltage, the output characteristic is set such that, in each of the DC power supply apparatuses, when an output current is lower than an upper limit current set for each of the plurality of DC power supply apparatuses, each of the DC power supply apparatuses operates in a constant voltage mode in which feedback control of an output voltage for maintaining the output voltage at the reference voltage is carried out, whereas when the output current reaches the upper limit current, each of the DC power supply apparatuses operates in a constant current mode in which feedback control of the output current for maintaining the output current at the upper limit current is carried out, and among at least some of the plurality of DC power supply apparatuses, reference voltages are set to be different in value from one another within an allowable voltage range of the DC load.

2. The DC power supply system according to claim 1, wherein in each of the DC power supply apparatuses, the upper limit current is set to be equal to or lower than a rated current of that DC power supply apparatus.

3. The DC power supply system according to claim 1, wherein a voltage target value in feedback control of the output voltage is set to the reference voltage when the output current is lower that a criterion current set to be lower than the upper limit current, and is set such that feedback control of the output voltage is carried out by lowering the voltage target value from the reference voltage with increase in the output current, when the output current is intermediate between the criterion current and the upper limit current.

4. The DC power supply system according to claim 1, wherein a voltage target value in feedback control of the output voltage is set to the reference voltage while the output current is lower than a criterion current set to be lower than the upper limit current, the output characteristic is further set to provide a region of a derating characteristic in midway through transition of the DC power supply apparatus from the constant voltage mode to the constant current mode, and the derating characteristic is set such that feedback control of the output voltage is carried out by gradually lowering the voltage target value from the reference voltage with increase in output current while the output current is intermediate between the criterion current and the upper limit current.

5. The DC power supply system according to claim 1, wherein a current target value in feedback control of the output current is set to the upper limit current while the output voltage is higher than a predetermined voltage in the constant current mode, and the output characteristic is further set such that the current target value becomes lower than the upper limit current when the output voltage becomes lower than the predetermined voltage in the constant current mode.

6. The DC power supply system according to claim 1, wherein each of the plurality of DC power supply apparatuses includes an input apparatus to input a voltage setting instruction to variably set the reference voltage, and the reference voltage of each of the plurality of DC power supply apparatuses is set in accordance with the voltage setting instruction to the input apparatus.

7. The DC power supply system according to claim 1, further comprising a monitor to monitor an active time period of each of the plurality of DC power supply apparatuses based on output from the DC power supply system to the DC load, wherein the monitor calculates a cumulative active time period of each of the plurality of DC power supply apparatuses based on the DC voltage or the DC current supplied to the DC load at each time point, in light of corresponding information to determine in which of the active state and the inactive state each of the plurality of DC power supply apparatuses is in for each range of the DC voltage or the DC current to the DC load set in advance based on the reference voltage of each of the plurality of DC power supply apparatuses.

8. The DC power supply system according to claim 7, wherein the monitor is configured to output, when the cumulative active time period reaches a predetermined alarm criterion value in a DC power supply apparatus of the plurality of DC power supply apparatuses, a warning aimed at that DC power supply apparatus.

9. The DC power supply system according to claim 1, wherein the plurality of DC power supply apparatuses are identical in specifications, and the upper limit current is set equivalently among the plurality of DC power supply apparatuses.

10. The DC power supply system according to claim 1, wherein among at least some of the plurality of DC power supply apparatuses, the upper limit current is set to different values.

11. The DC power supply system according to claim 1, wherein the plurality of DC power supply apparatuses are identical in specifications, and the upper limit current of the DC power supply apparatus higher in reference voltage among the DC power supply apparatuses set to have different values of the reference voltage is set to be lower than the upper limit current of the DC power supply apparatus lower in reference voltage.

12. The DC power supply system according to claim 1, further comprising a power supply slot electrically connected to a power source and the DC load, the power supply slot being provided with a plurality of slots having a fitting structure for attachment of each of the plurality of DC power supply apparatuses, wherein the plurality of DC power supply apparatuses start operating in any of the active state and the inactive state upon attachment of the plurality of DC power supply apparatuses to the slots, and the plurality of DC power supply apparatuses are removable from the power supply slot by cancellation of fitting by the fitting structure during operation of the DC power supply system, and at least two of the DC power supply apparatuses attached to the power supply slot have the output sides connected in parallel in the power supply slot.

13. The DC power supply system according to claim 12, wherein the fitting structure is provided in correspondence with each of the output side and an input side of each of the DC power supply apparatuses, the input side being electrically connected to the power source, and the fitting structure is in such a shape that the input side is fitted before the output side in attachment of each of the DC power supply apparatuses to the slot.

14. The DC power supply system according to claim 12, wherein in the power supply slot, at least one of the plurality of slots is defined as a spare slot to which the DC power supply apparatus has not been attached.

15. The DC power supply system according to claim 1, wherein the number of DC power supply apparatuses is determined such that a sum of upper limit currents of some DC power supply apparatuses of the plurality of DC power supply apparatuses is larger than a maximum load current to the DC load.

16. The DC power supply system according to claim 1, wherein the plurality of DC power supply apparatuses are configured to control the output voltage or the output current by switching by a wide band gap semiconductor element.

17. The DC power supply system according to claim 1, wherein the reference voltages of the plurality of DC power supply apparatuses are set to different voltage values in constant increments, and the increments are set to be smaller than a value calculated by dividing a width of the allowable voltage range of the DC load by a number smaller by one than the number of the DC power supply apparatuses and larger than a rated ripple voltage of each of the DC power supply apparatuses.

18. The DC power supply system according to claim 1, wherein the plurality of DC power supply apparatuses are identical in specifications, and the number of DC power supply apparatuses is determined such that a sum of upper limit currents of DC power supply apparatuses except for one of the plurality of DC power supply apparatuses is larger than a maximum load current to the DC load.

19. The DC power supply system according to claim 1, being configured in a layout in which three or more of the plurality of DC power supply apparatuses are juxtaposed, wherein the plurality of DC power supply apparatuses are disposed in such an order that, in at least one of three adjacent DC power supply apparatuses among the plurality of DC power supply apparatuses, the reference voltage of the DC power supply apparatus located in a center is lower than the reference voltages of the DC power supply apparatuses on opposing sides.

20. The DC power supply system according to claim 1, wherein the plurality of DC power supply apparatuses are arranged such that a housing of each of the DC power supply apparatuses is thermally connected to a common heat sink with a thermal interface material being interposed.

\* \* \* \* \*